United States Patent
Oshima

(10) Patent No.: US 8,208,017 B2
(45) Date of Patent: Jun. 26, 2012

(54) IMAGING DEVICE, PRODUCT PACKAGE, AND SEMICONDUCTOR INTEGRATED CIRCUIT

(75) Inventor: Mitsuaki Oshima, Kyoto (JP)

(73) Assignee: Panasonic Corporation, Osaka (JP)

( * ) Notice: Subject to any disclaimer, the term of this patent is extended or adjusted under 35 U.S.C. 154(b) by 1383 days.

(21) Appl. No.: 10/596,819

(22) PCT Filed: Dec. 24, 2004

(86) PCT No.: PCT/JP2004/019403
§ 371 (c)(1),
(2), (4) Date: Jul. 12, 2007

(87) PCT Pub. No.: WO2005/064921

PCT Pub. Date: Jul. 14, 2005

(65) Prior Publication Data

US 2007/0291114 A1    Dec. 20, 2007

(30) Foreign Application Priority Data

Dec. 26, 2003 (JP) ................................. 2003-435934
Dec. 17, 2004 (JP) ................................. 2004-366913

(51) Int. Cl.
*H04N 7/18* (2006.01)
*G03B 17/00* (2006.01)
(52) U.S. Cl. ......................................... 348/126; 396/52
(58) Field of Classification Search .................. 348/126, 348/208.15; 396/52, 266, 49
See application file for complete search history.

(56) References Cited

U.S. PATENT DOCUMENTS

| | | | | | |
|---|---|---|---|---|---|
| 5,218,442 | A | * | 6/1993 | Hamada et al. | .......... 348/208.15 |
| 5,237,365 | A | * | 8/1993 | Miyazawa | ........................ 396/49 |
| 5,689,737 | A | * | 11/1997 | Kanbara | ......................... 396/52 |
| 5,825,415 | A | | 10/1998 | Kaneda et al. | |
| 5,956,528 | A | * | 9/1999 | Tanaka | ............................ 396/52 |
| 6,067,418 | A | * | 5/2000 | Sato | ................................ 396/52 |

FOREIGN PATENT DOCUMENTS

| | | |
|---|---|---|
| EP | 0481230 | 4/1992 |
| JP | 11-015035 | 1/1999 |
| JP | 11-134481 | 5/1999 |
| JP | 2001-346093 | 12/2001 |
| JP | 2002-027326 | 1/2002 |

(Continued)

OTHER PUBLICATIONS

International Search Report dated May 17, 2005.

(Continued)

*Primary Examiner* — Gims Philippe
(74) *Attorney, Agent, or Firm* — Snell & Wilmer L.L.P.

(57) ABSTRACT

The image pickup apparatus (1) of the present invention includes: a shaking motion detecting section (101a and 101b) for detecting a shaking motion of the image pickup apparatus (1) and for outputting a shaking motion detection signal indicating the shaking motion of the image pickup apparatus (1); an image forming section (2, 2a, and 2b) for forming an optical image by focusing light incident to the image pickup apparatus (1); an image pickup section (5) for converting the optical image formed by the image forming section (2, 2a, and 2b) into electric video information; and a locus calculating section (91) for obtaining locus information indicating a locus of the shaking motion of the image pickup apparatus (1) based on at least the shaking motion detection signal output from the shaking motion detecting section (101a and 101b).

45 Claims, 36 Drawing Sheets

FOREIGN PATENT DOCUMENTS

| | | |
|---|---|---|
| JP | 2002-300460 | 10/2002 |
| JP | 2004-186901 | 7/2004 |
| JP | 2004-239962 | 8/2004 |
| JP | 2004-354878 | 12/2004 |
| WO | WO98/41818 | 9/1998 |

OTHER PUBLICATIONS

The European Search Report from corresponding European App. No. 04807759.8 dated Jan. 17, 2011.

* cited by examiner

FIG.16
(a) Vertical addition
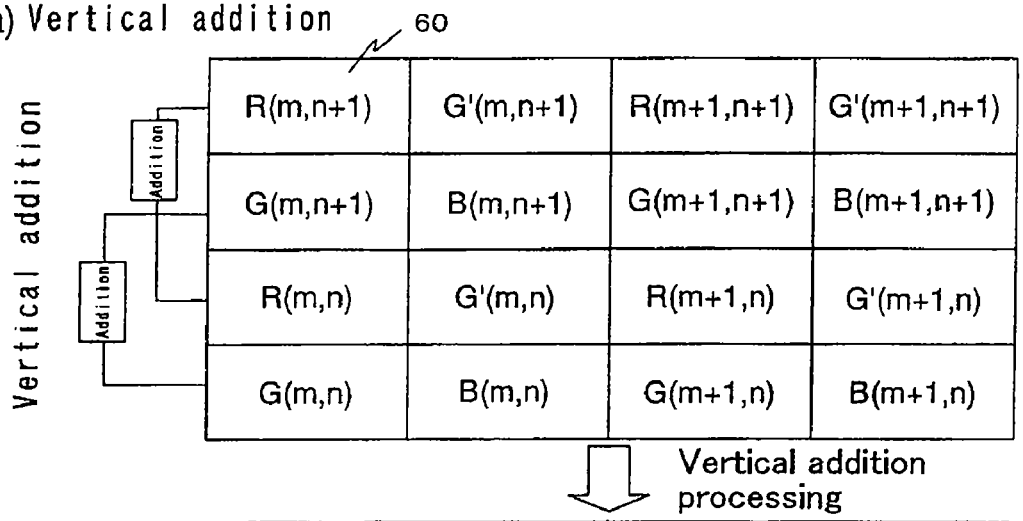
(b) Horizontal addition
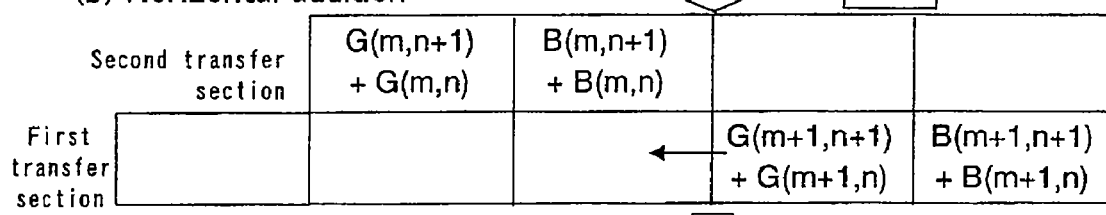
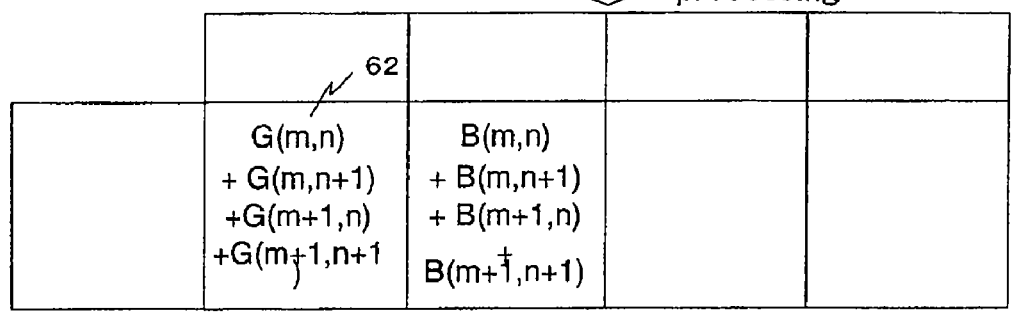

FIG.18
(a) Principle of interpolation (Reduction)
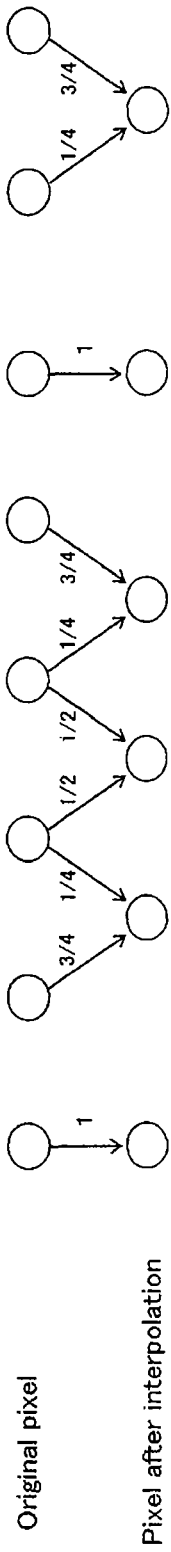
(b) Principle of interpolation (Enlargement)
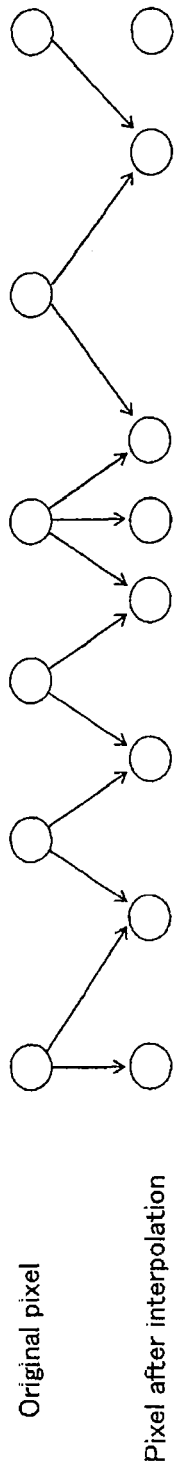
(c) Shaking motion correction with high resolution
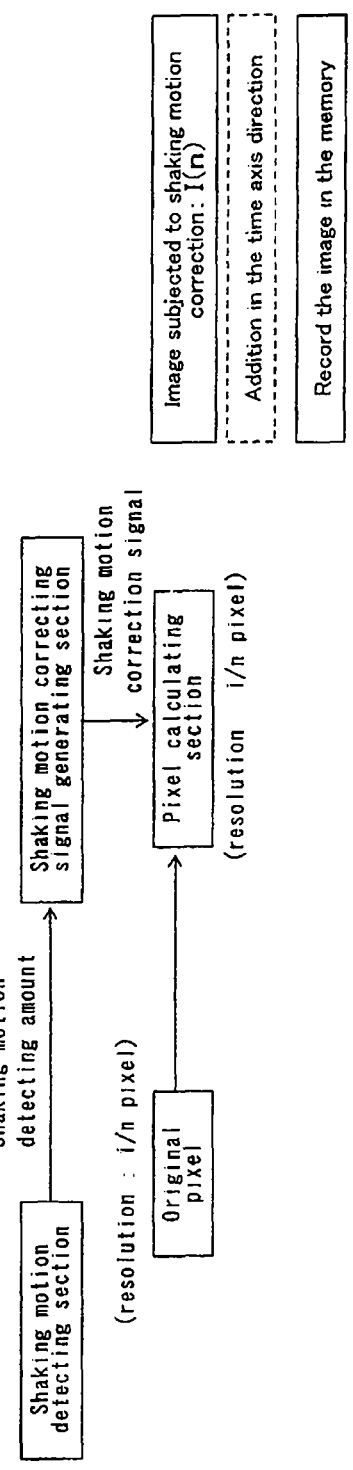

FIG.23
(a) 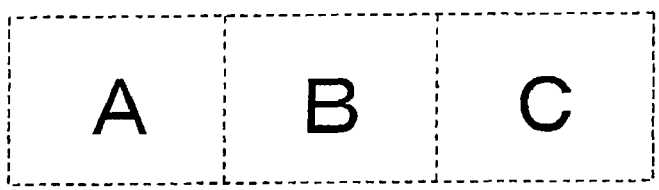
(b) 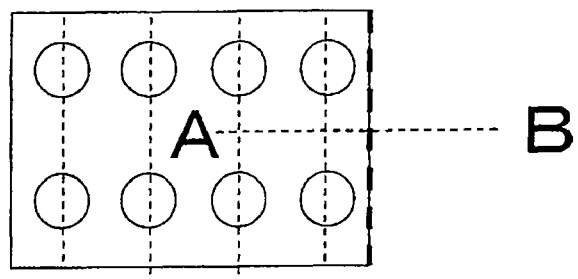
(c) 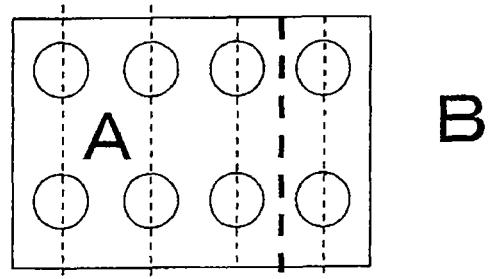
(d) 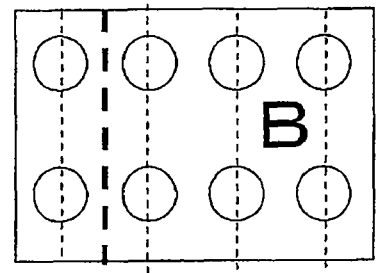
(e) 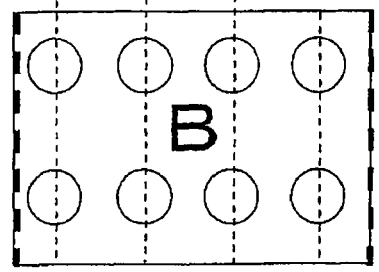

FIG.27
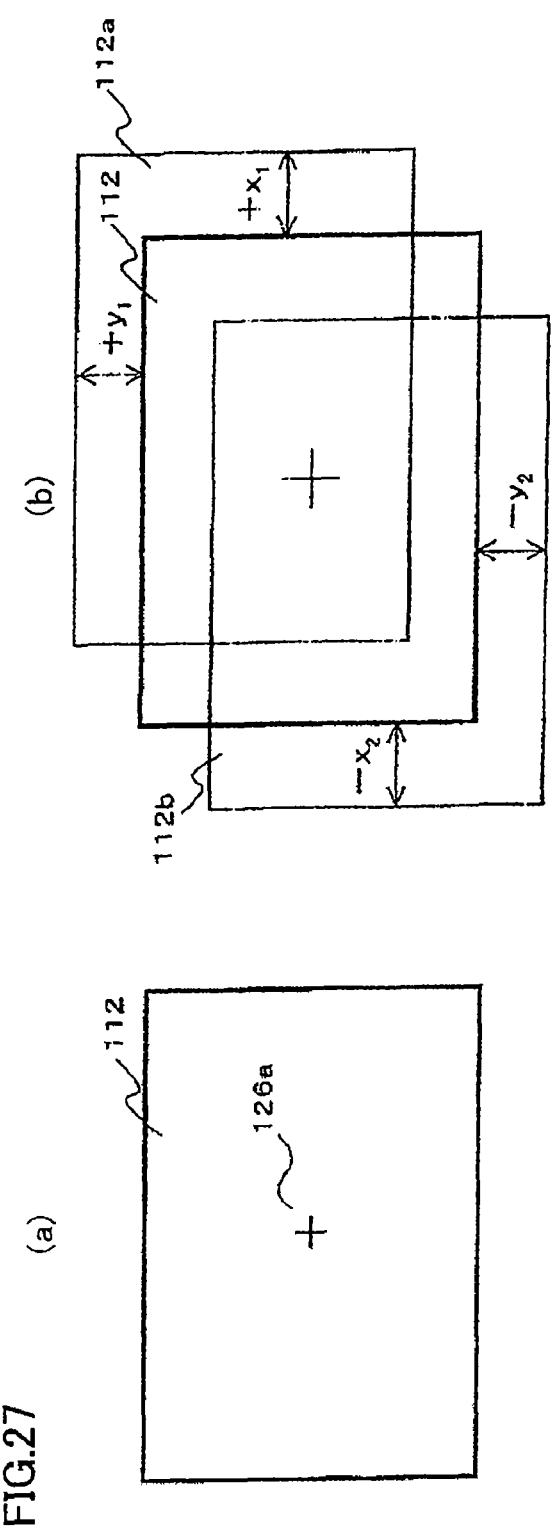
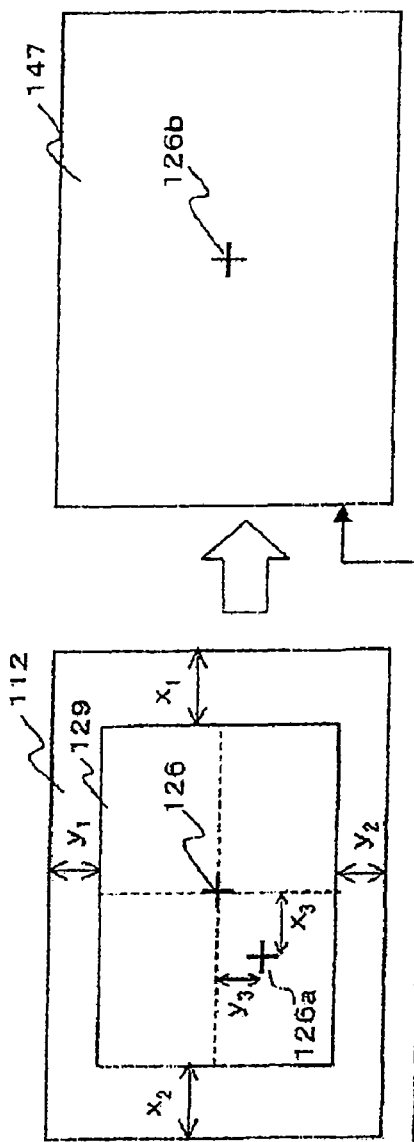
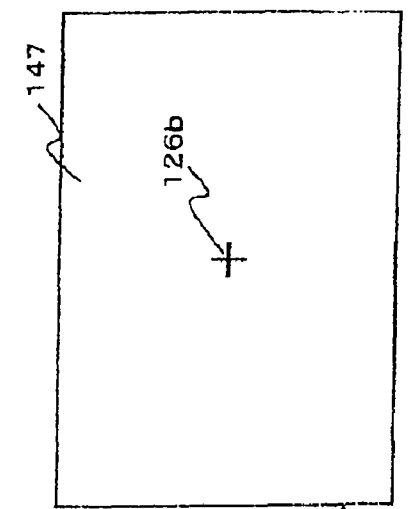
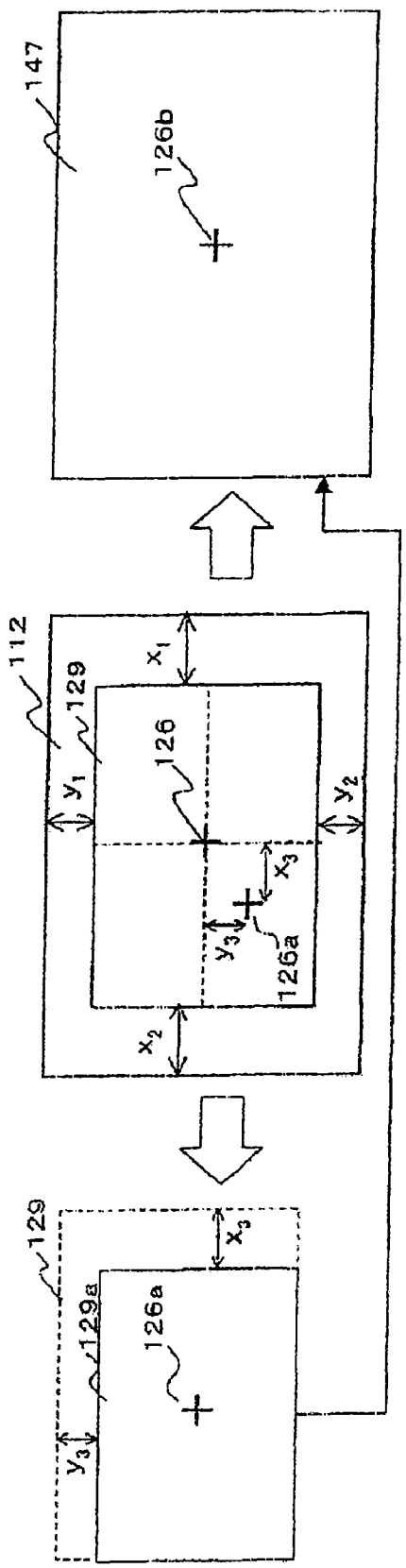

IMAGING DEVICE, PRODUCT PACKAGE, AND SEMICONDUCTOR INTEGRATED CIRCUIT

TECHNICAL FIELD

The present invention relates to an image pickup apparatus capable of obtaining locus information required for the correction of the shaking motion, a product package including the image pickup apparatus and a recording medium having a program recorded thereon, and a semiconductor integrated circuit.

BACKGROUND ART

As a method for correcting the camera shaking of an image, an optical camera shaking correction method and an electronic shaking motion correction method are known (see, for example, Reference 1 below).

The technique using the optical camera shaking correction method is known as a technique for correcting the camera shaking of a static image.

The technique using the electronic camera shaking correction method is known as a technique for correcting the camera shaking of a moving image. This technique does not require any optical driving section. Therefore, it is possible to reduce the size of the apparatus.

Reference 1: Japanese Laid-Open Publication No. 60-143330

DISCLOSURE OF THE INVENTION

The technique using the optical camera shaking correction method is effective for taking a static image without degrading the quality of the image. However, it requires an optical driving section. For this reason, a reduction in the size of the apparatus is limited.

The technique using the electronic camera shaking correction method does not require any optical driving section. Therefore, it is possible to reduce the size of the apparatus. However, it has been considered that this technique is not effective for correcting the camera shaking of a static image. This is because this technique performs only a correction between a plurality of frames and it is impossible in principle to perform the camera shaking correction for a static image consisting of a single frame.

The object of the present invention is to provide an image pickup apparatus capable of obtaining locus information required for the correction of the shaking motion, a product package including the image pickup apparatus and a recording medium having a program recorded thereon, and a semiconductor integrated circuit.

An image pickup apparatus of the present invention includes: a shaking motion detecting section for detecting a shaking motion of the image pickup apparatus and for outputting a shaking motion detection signal indicating the shaking motion of the image pickup apparatus; an image forming section for forming an optical image by focusing light incident to the image pickup apparatus; an image pickup section for converting the optical image formed by the image forming section into electric video information; and a locus calculating section for obtaining locus information indicating a locus of the shaking motion of the image pickup apparatus based on at least the shaking motion detection signal output from the shaking motion detecting section.

The locus calculating section may obtain, as the locus information, information indicating a change in the shaking motion detection signal during a predetermined period of time.

The shaking motion detecting section may include an angle velocity sensor, and the locus calculating section may obtain angle information by integrating an output from the angle velocity sensor, and may obtain, as the locus information, information indicating a change in the angle information during a predetermined period of time.

The angle velocity sensor may be a vibration gyroscope having a plurality of vibration frequencies which are different from each other.

The locus calculating section may obtain, as the locus information, information indicating a locus weighted by the shaking motion of the image pickup apparatus.

The locus calculating section may obtain, as the locus information, a point spread function PSF.

The locus calculating section may determine whether or not an amount of temporal change in the shaking motion of the image pickup apparatus is larger than a predetermined threshold value, and may determine a number of samples in accordance with the determination result.

The image pickup apparatus may further include: an output section for generating data in an Exif format by adding the locus information to the video information, and for outputting the data in the Exif format.

The locus calculating section may obtain the locus information based on at least focus information, zoom information, and the shaking motion detection signal.

The image pickup apparatus may further includes: an electronic shaking motion correcting section for performing a calculation processing on the locus information and the video information, so as to obtain corrected video information which is subjected to the correction of the shaking motion.

The electronic shaking motion correcting section may determine whether or not the shaking motion detection signal is larger than a predetermined threshold value, and when it is determined that the shaking motion detection signal is larger than the predetermined threshold value, the electronic shaking motion correcting section may not correct the shaking motion in the video information.

The calculation processing may include a Fourier transform, a Fourier inverse transform, or a processing using a two-dimensional filter.

The locus information may include a locus function h, and the calculation processing may include a calculation of a Fourier transform of h or a calculation using a result of the Fourier transform of h, or the calculation processing may include a calculation of a Fourier inverse transform which is a reciprocal of the Fourier transform of h or a calculation using a result of the Fourier inverse transform which is the reciprocal of the Fourier transform of h.

The image pickup apparatus may further include: a processing amount calculating section for calculating a calculation processing amount required for correcting the shaking motion in the video information.

When the calculation processing amount or a shaking motion amount exceeds a predetermined value, a display indicating an exceeding situation may be made on a display section and/or a sound indicating an exceeding situation may be generated from a speaker.

When the calculation processing amount exceeds a predetermined value, the video information which is not subjected to the correction of the shaking motion may be output, and when the calculation processing amount is within a predetermined range, corrected video information which is subjected to the correction of the shaking motion in the video information may be output.

At a specific time after displaying the video information on a display section, the corrected video information may be displayed on the display section.

Time at which the calculation processing for the correction of the shaking motion in the electronic shaking motion correcting section is completed may be used as the specific time.

The image pickup apparatus may further includes: a maximum shaking motion amount calculating section for receiving the corrected video information from the shaking motion correcting section, and for calculating a maximum shaking motion amount of the shaking motion in each direction; and a trimming section for trimming the corrected video information in accordance with the maximum shaking motion amount, so as to generate trimmed corrected video information.

The image pickup apparatus may further include: a setting section capable of setting a first trimming mode or a second trimming mode, wherein in the first trimming mode, the trimming section may trim the corrected video information in accordance with the maximum shaking motion amount, so as to generate a first trimmed corrected video information, and in the second trimming mode, the trimming section may trim the first trimmed corrected video information, as a center of a pixel corresponding to a center pixel of the first trimmed corrected video information, so as to generate a second trimmed corrected video information, the center pixel being a pixel located at a center of the video information in each direction.

The image pickup apparatus may further include: a mechanical shaking motion correcting section for mechanically correcting the shaking motion of the image pickup apparatus in accordance with the shaking motion detection signal, so as to obtain corrected video information which is subjected to the correction of the shaking motion in the video information by an actual shaking motion correction amount, wherein the locus calculating section may obtain, as the locus information, information indicating a change during a predetermined period of time in a difference between the shaking motion detection signal and the actual shaking motion correction amount.

The locus information may be in an Exif format.

The mechanical shaking motion correcting section may mechanically correct the shaking motion of the image pickup apparatus in accordance with the shaking motion detection signal, so as to obtain a first corrected video information which is subjected to the correction of the shaking motion in the video information by a first shaking motion correction amount, the locus calculating section may obtain, as the locus information, information indicating a change in a remaining shaking motion amount during a predetermined period of time, the remaining shaking motion amount indicating a difference between the actual shaking motion correction amount and the first shaking motion correction amount, and the image pickup apparatus may further include: an electronic shaking motion correcting section for performing a calculation processing on the locus information and the first corrected video information, so as to obtain a second corrected video information which is subjected to the correction of the shaking motion in the first corrected video information by a second shaking motion correction amount.

The calculation processing may include a Fourier transform, a Fourier inverse transform, or a processing using a two-dimensional filter.

The locus information may include a locus function h, and the calculation processing may include a calculation of a Fourier transform of h or a calculation using a result of the Fourier transform of h, or the calculation processing may include a calculation of a Fourier inverse transform which is a reciprocal of the Fourier transform of h or a calculation using a result of the Fourier inverse transform which is the reciprocal of the Fourier transform of h.

The mechanical shaking motion correcting section may calculate the first shaking motion correction amount based on positional information of a lens which is a part of the image forming section.

The mechanical shaking motion correcting section may calculate the first shaking motion correction amount based on the shaking motion detection signal and a shaking motion control characteristic of the mechanical shaking motion correcting section.

The shaking motion detecting section may include: a first shaking motion detecting section for detecting a shaking motion in a pitch direction and a shaking motion in a yaw direction among the shaking motions of the image pickup apparatus; and a second shaking motion detecting section for detecting a shaking motion in a roll direction among the shaking motions of the image pickup apparatus, the locus calculating section may obtain, as the locus information, information indicating a change during a predetermined period of time in a detection signal output from the second shaking motion detecting section, and the image pickup apparatus may further include: a mechanical shaking motion correcting section for obtaining a first corrected video information which is subjected to the correction of the shaking motion in the pitch direction and the correction of the shaking motion in the yaw direction in accordance with a detection signal output from the first shaking motion detecting section.

The image pickup apparatus may further include: a section for adding the locus information to the corrected video information for output, or for recording the locus information onto a recording medium.

The locus information may be in an Exif format or a format similar to the Exif format.

The image pickup apparatus may further include: an electronic shaking motion correcting section for obtaining a second corrected video information, which is subjected to the correction of the shaking motion in the first corrected video information, by performing a calculation processing on locus information in the roll direction and the first corrected video information.

The calculation processing may include a Fourier transform, a Fourier inverse transform, or a processing using a two-dimensional filter.

The locus information may include a locus function h, and the calculation processing may include a calculation of a Fourier transform of h or a calculation using a result of the Fourier transform of h, or the calculation processing may include a calculation of a Fourier inverse transform which is a reciprocal of the Fourier transform of h or a calculation using a result of the Fourier inverse transform which is the reciprocal of the Fourier transform of h.

A method of the present invention includes: receiving image information including locus information indicating a locus of a shaking motion of an image pickup apparatus and video information; separating the image information into the locus information and the video information; and obtaining corrected video information, which is subjected to the correction of the shaking motion in the video information, by performing a calculation processing on the locus information and the video information.

The locus information may be in an Exif format.

The calculation processing may include a Fourier transform or a Fourier inverse transform.

The locus information may be a weighted locus or a point spread function.

A product package of the present invention includes an image pickup apparatus and a recording medium, wherein the image pickup apparatus includes: a shaking motion detecting section for detecting a shaking motion of the image pickup apparatus and for outputting a shaking motion detection signal indicating the shaking motion of the image pickup apparatus; an image forming section for forming an optical image by focusing light incident to the image pickup apparatus; an image pickup section for converting the optical image formed by the image forming section into electric video information; a locus calculating section for obtaining locus information indicating a locus of the shaking motion of the image pickup apparatus based on at least the shaking motion detection signal output from the shaking motion detecting section; and an outputting section for adding the locus information to the video information to output image information, and the recording medium has a program recorded therein, the program is for causing a computer to execute a processing, the processing includes: receiving the image information; separating the image information into the locus information and the video information; and obtaining corrected video information, which is subjected to the correction of the shaking motion in the video information, by performing a calculation processing on the locus information and the video information.

The locus information may be in an Exif format.

The calculation processing may include a Fourier transform, a Fourier inverse transform, or a processing using a two-dimensional filter.

The locus information may include a locus function h, and the calculation processing may include a calculation of a Fourier transform of h or a calculation using a result of the Fourier transform of h, or the calculation processing may include a calculation of a Fourier inverse transform which is a reciprocal of the Fourier transform of h or a calculation using a result of the Fourier inverse transform which is the reciprocal of the Fourier transform of h.

The locus information may be a weighted locus or a point spread function.

A product package of the present invention includes an image pickup apparatus and a recording medium, wherein the image pickup apparatus includes: a shaking motion detecting section for detecting a shaking motion of the image pickup apparatus and for outputting a shaking motion detection signal indicating the shaking motion of the image pickup apparatus; an image forming section for forming an optical image by focusing light incident to the image pickup apparatus; an image pickup section for converting the optical image formed by the image forming section into electric video information; a locus calculating section for obtaining locus information indicating a locus of the shaking motion of the image pickup apparatus based on at least the shaking motion detection signal output from the shaking motion detecting section; a mechanical shaking motion correcting section for mechanically correcting the shaking motion of the image pickup apparatus in accordance with the shaking motion detection signal, so as to obtain corrected video information which is subjected to the correction of the shaking motion in the video information by an actual shaking motion correction amount; and an outputting section for adding the locus information to the video information to output image information, the locus calculating section obtains, as the locus information, information indicating a change during a predetermined period of time in a difference between the shaking motion detection signal and the actual shaking motion correction amount, and the recording medium has a program recorded therein, the program is for causing a computer to execute a processing, the processing includes: receiving the image information; separating the image information into the locus information and the video information; and obtaining corrected video information which is subjected to the correction of the shaking motion in the video information, by performing a calculation processing on the locus information and the video information.

The locus information may be in an Exif format.

The calculation processing may include a Fourier transform, a Fourier inverse transform, or a processing using a two-dimensional filter.

The locus information may be a weighted locus or a point spread function.

A semiconductor integrated circuit of the present invention includes: a locus calculating section for obtaining locus information indicating a locus of a shaking motion of an image pickup apparatus based on at least a shaking motion detection signal output from a shaking motion detecting section for detecting the shaking motion of the image pickup apparatus.

The semiconductor integrated circuit may further include: an electronic shaking motion correcting section for obtaining corrected video information which is subjected to the correction of the shaking motion in the video information, by performing a calculation processing on the locus information and the video information.

The semiconductor integrated circuit may further include: a mechanical shaking motion correcting section for mechanically correcting the shaking motion of the image pickup apparatus in accordance with the shaking motion detection signal, so as to obtain corrected video information which is subjected to the correction of the shaking motion in the video information by an actual shaking motion amount, wherein the locus calculating section may obtain, as the locus information, information indicating a change during a predetermined period of time in a difference between the shaking motion detection signal and the actual shaking motion correction amount.

The shaking motion detecting section may include: a first shaking motion detecting section for detecting a shaking motion in a pitch direction and a shaking motion in a yaw direction among the shaking motions of the image pickup apparatus; and a second shaking motion detecting section for detecting a shaking motion in a roll direction among the shaking motions of the image pickup apparatus, the locus calculating section may obtain, as the locus information, information indicating a change during a predetermined period of time in a detection signal output from the second shaking motion detecting section, and the semiconductor integrated circuit may further include: a mechanical shaking motion correcting section for obtaining a first corrected video information which is subjected to the correction of the shaking motion in the pitch direction and the correction of the shaking motion in the yaw direction in accordance with a detection signal output from the first shaking motion detecting section.

According to the image pickup apparatus of the present invention, it is possible to obtain the locus information required for the correction of the shaking motion. The locus information may be output to a device external to the image pickup apparatus (e.g., a computer). With this arrangement, it is possible to perform the correction of the shaking motion, which requires a large amount of processing, in the device external to the image pickup apparatus (e.g., a computer).

The same effect can be obtained with the product package and the semiconductor integrated circuit of the present invention.

BRIEF DESCRIPTION OF THE DRAWINGS

FIG. 16 is a diagram showing a method for adding pixels in an in-plane direction.

FIG. 18 is a diagram showing a principle for the reducing interpolation, a principle of the enlarging interpolation and a principle of correcting the shaking motion with a high resolution.

FIG. 23 is a diagram showing a display of the boundary indicator 97 for taking a picture in a panning manner or in a panoramic manner.

FIG. 27 is a diagram showing trimming and enlargement of a captured image according to an embodiment of the present invention.

Figure 1:
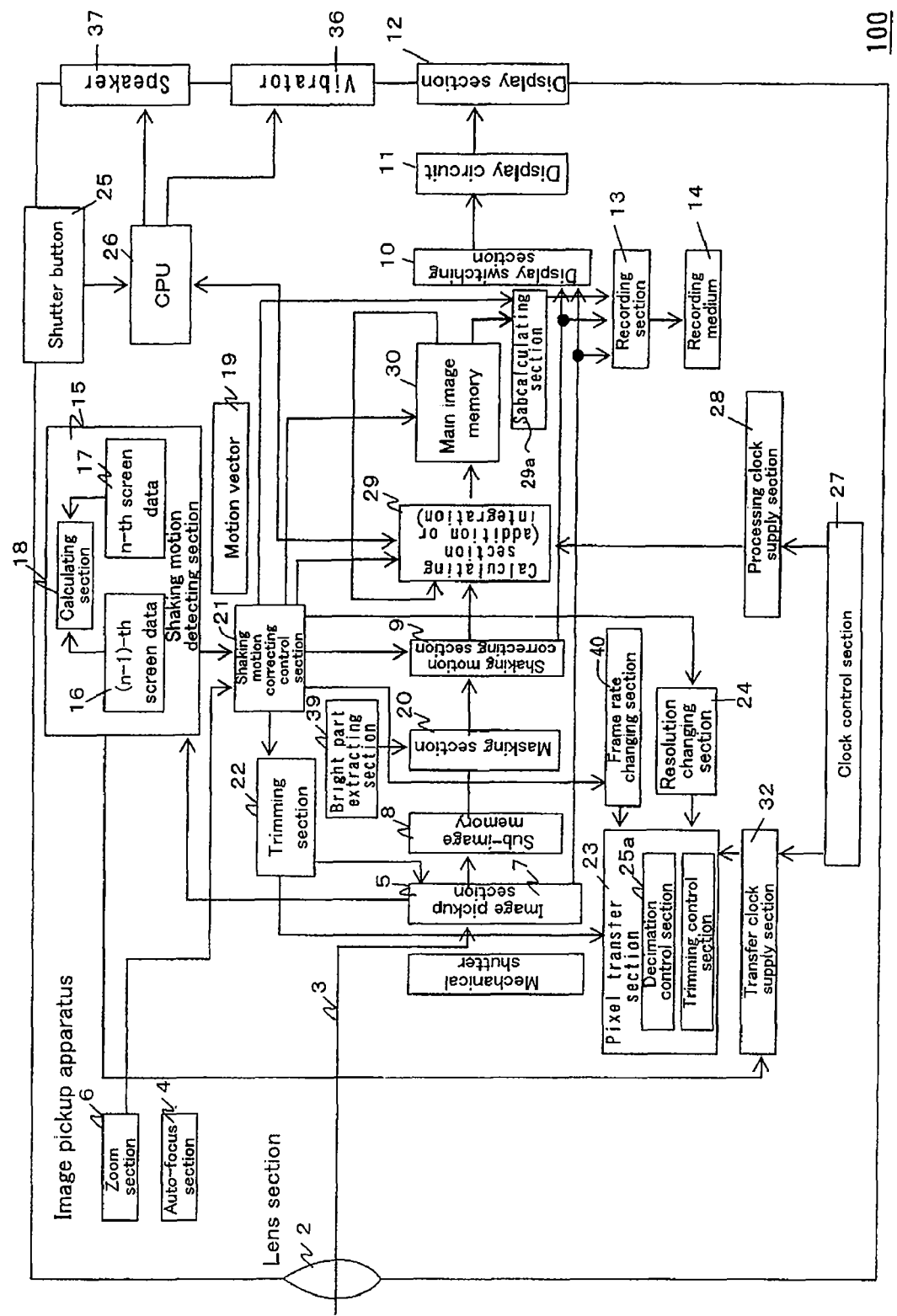
FIG. 1 is a diagram showing an image pickup apparatus 100 according to an embodiment of the present invention.

2 Lens section
4 Auto-focusing section
5 Image pickup section
6 Zoom section
8 Sub-image memory
9 Shaking motion correcting section
10 Display switching section
11 Display circuit
12 Display section
13 Recording section
14 Recording medium
15 Shaking motion detecting section
16 First memory
17 Second memory
18 Calculating section
20 Masking section
21 Shaking motion correcting control section
22 Trimming section
23 Pixel transfer section
24 Resolution changing section
25 Shutter button
25a Decimation control section 26 CPU
27 Clock control section
28 Processing clock supply section
29 Calculating section
29a Sub-calculating section
30 Main image memory
32 Transfer clock supply section
36 Vibrator
37 Speaker
39 Bright part extracting section
40 Frame rate changing section
100 Image pickup apparatus
101 Angle velocity detecting section
102 Sampling circuit
103 Point
104 Sample frequency generation section
105 Data compression section
106 Image pickup information addition section
107 Exif data
108 Corrected image output section
109 Switching section
110 Output data generation section
111 Shaking motion amount measurement section
112 Captured image
113 Locus data
114 External storage medium
115 Shaking motion correction section
116 Processing amount calculating section
117 Shutter
118 Shutter-open period control section
119 Shutter button
120 Image memory
121 Fourier inverse transform section
122 Enlarging section (The main text needs to be corrected)
123 Trimming section
125 Reducing section
126 Center (After trimming)
126a Center. (Original image)
127 Step (FIG. 28)
128 Step (FIG. 29)
129 Trimmed image
130 Processing status indicator
131 Mark (during correction processing)
132 Display screen of display section 12
133 Display of "Wait"
134 Locus mark
135 Two-dimensional filter
136 Integrator
137 Focus adjustment section
140 Lens driving section
141 Shaking motion correction control section
142 Shaking motion correction amount calculating section
143 Difference section
145 Alarm section
146 Data output section
147 Output image
148 Calculating section
150 Computer
151 Recording medium
152 Package
153 Correction processing program
155 Shaking motion correcting lens
156 Driving motor
157 Lens position detecting section
158 Hall element
159 Shaking motion correction amount
160 Control frequency characteristic of shaking motion correcting section
161 transfer function
162 Shaking motion correction amount

BEST MODE FOR CARRYING OUT THE INVENTION

Hereinafter, embodiments of the present invention will be described below with reference to the drawings.

1. Image Pickup Apparatus

FIG. 1 shows an image pickup apparatus 100 according to an embodiment of the present invention.

The image pickup apparatus 100 takes a static image (i.e. a still image) during a predetermined exposure period. The image pickup apparatus 100 includes a lens section 2 for receiving light incident on the image pickup apparatus 100 from the outside of the image pickup apparatus 100; an auto-focusing section 4 for automatically adjusting a focus of the light 3; a zoom section 6 for setting a zoom ratio of the lens section 2; and an image pickup section 5. An optical image is formed on the image pickup section 5. The image pickup section 5 outputs data indicating the formed optical image. The image pickup section 5 is, for example, a CCD or a MOS type imaging device. The focus of the light 3 from the lens section 2 is automatically adjusted by the auto-focusing section 4. The zoom ratio of the lens section 2 is set by the zoom section 6. An optical image 7 is formed on the image pickup section 5.

The image pickup apparatus 100 further includes a display switching section 10; a display circuit 11; a display section 12; a recording section 13 and a recording medium 14 0 When a static image is taken without correcting any shaking motion in static image data representing the static image, the output data output from the image pickup section 5 is directly sent to the display switching section 10. When the static image is displayed, the output data output from the image pickup section 5 is displayed on the display section 12 by the display circuit 11. When the static image is recorded, the output data output from the image pickup section 5 is recorded on the recording medium 14 by the recording section 13.

The image pickup apparatus 100 further includes a shutter button 25; a sub-image memory 8 for storing data; a shaking motion detecting section 15 for detecting an amount of the shaking motion between a plurality of images (frames) representing a static image taken; a shaking motion correcting section 9 for correcting a plurality of image information indicating the plurality of images (frames) in accordance with the amount of the detected shaking motion; a shaking motion correcting control section 21; a trimming section 22 to be controlled to remove a shaking motion in a longitudinal direction; a resolution changing section 24 for changing a resolution of an image indicated by screen data; a decimation control section 25a; a pixel transfer section 23; and a frame rate changing section 40 for changing a frame rate in accordance with the amount of the shaking motion. The shaking motion detecting section 15 includes a calculating section 18 for calculating data input to the shaking motion detecting section 15, a first memory 16 and a second memory 17. The shaking motion correcting control section 21 controls each of the components in order to correct the output data output from the image pickup section 5 in accordance with the amount of the detected shaking motion.

When a static image is taken while correcting the shaking motion in static image data representing the static image (i.e. a shaking motion correcting mode is set to ON), the output data output from the image pickup section 5 is accumulated in the sub-image memory 8 before the shutter button 25 is pressed down. The output data output from the image pickup section 5 is input to the shaking motion detecting section 15. The calculating section 18 calculates a plurality of output data which are input to the shaking motion detecting section 15 (for example, the (n−1)-th image data (i.e. previous screen data) and the n-th image data (i.e. current screen data)) so as to obtain shaking motion information indicating the shaking motion. The shaking motion information is a motion vector 19. When the image pickup apparatus 100 includes a longitudinal oscillating gyro and a lateral oscillating gyro, it is also possible to detect an amount of the shaking motion in the longitudinal direction and an amount of the shaking motion in the lateral direction. In this case, the shaking motion information is an amount of the shaking motion in the longitudinal direction and an amount of the shaking motion in the lateral direction.

The shaking motion correcting control section 21 controls the trimming section 22 and the pixel transfer section 23, such that the shaking motion in the longitudinal direction can be removed. The shaking motion correcting control section 21 controls the shaking motion correcting section 9, such that the shaking motion in the lateral direction can be removed. Thus, it is possible to correct the shaking motion in the longitudinal direction in the image data and the shaking motion in the lateral direction in the image data. As a result, image data subjected to the correction of the shaking motion can be obtained.

The image data subjected to the correction of the shaking motion is sequentially output to the display section 12 via the display switching section 10. On the display section 12, a user can visually recognize continuous images which are subjected to the correction of the shaking motion at a predetermined frame rate.

On the display section 12, it is also possible to display an image corresponding to a part of the entire image represented by the image data which is subjected to the correction of the shaking motion. Accordingly, it is possible to accurately perform a framing of an object. In this case, the resolution is set to a resolution which is lower than a resolution when a static image is taken, by the resolution changing section 24 and the decimation control section 25a. Accordingly, it is possible to increase the frame rate, thereby increasing the number of frames to be displayed per second. As a result, the user can visually recognize the image of the object more smoothly.

The recording section 13 may record a plurality of images having a high frame rate on the recording medium 14 as a moving image.

The resolution changing section 24 changes the resolution of a plurality of frames in accordance with at least one of a brightness, an amount of the shaking motion, and a zoom rate, for example.

The image pickup apparatus 100 further includes a clock control section 27; a transfer clock supply section 32; a processing clock supply section 28; and a CPU 26. When the user presses down the shutter button 25 halfway, the CPU 26 provides an instruction to the clock control section 27, such that the processing clock supply section 28 starts the operation of a clock (e.g. a clock of a calculating section 29 and the like) or increases a clock speed.

The image pickup apparatus 100 further includes a main image memory 30 for storing a plurality of image information subjected to the correction of the shaking motion; a calculating section 29 for generating static image information indicating a static image based on the plurality of image information stored in the storage section; and a sub-calculating section 29a. The detailed description of the functions of the calculating section 29, the main image memory 30 and the sub-calculating section 29a will be provided later.

The image pickup apparatus 100 further includes a masking section 20 and a bright part extracting section 39. The detailed description of the functions of the masking section 20 and the bright part extracting section 39 will be provided later.

The image pickup apparatus 100 further includes a vibrator 36 and a speaker 37. The detailed description of the functions of the vibrator 36 and the speaker 37 will be provided later.

Figure 2:
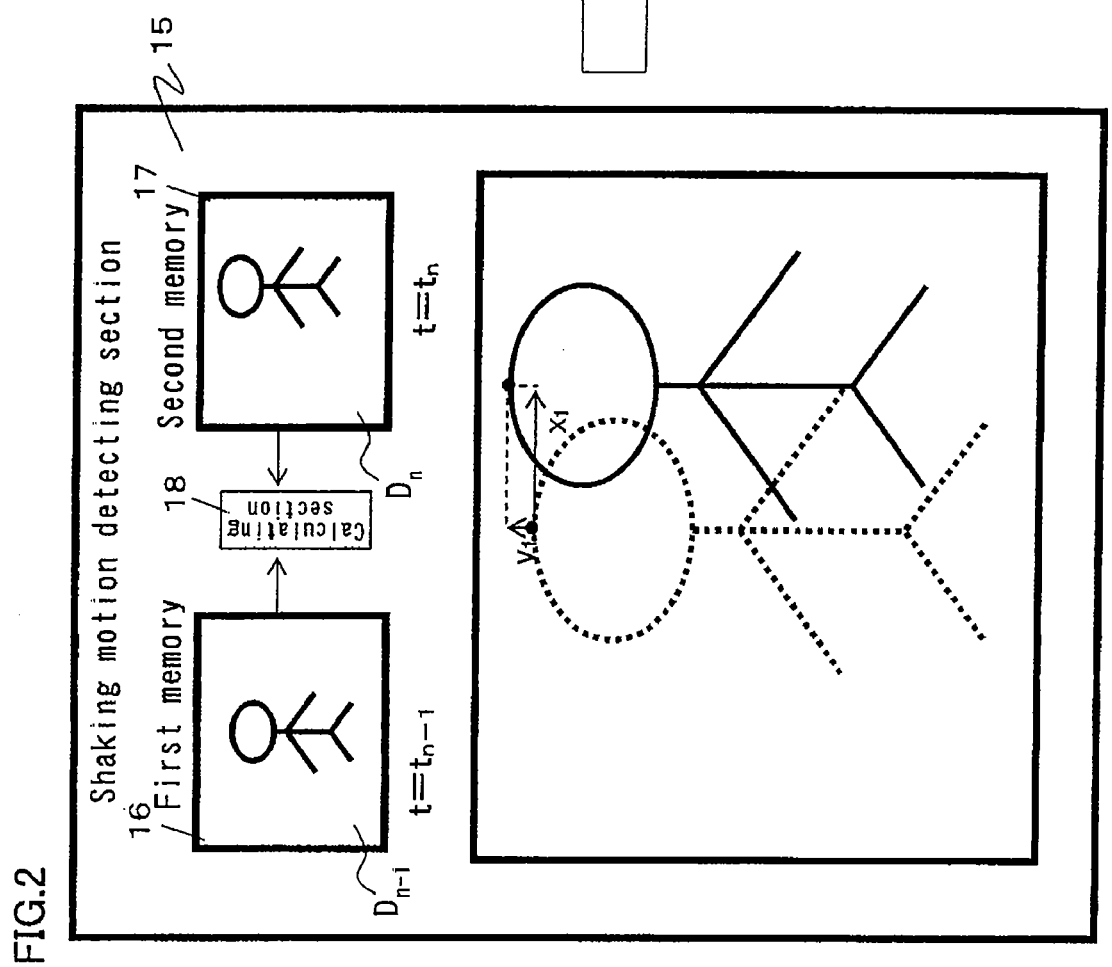
FIG. 2 is a view showing a structure of the shaking motion detecting section 15.

FIG. 2 shows a structure of the shaking motion detecting section 15. The shaking motion detecting section 15 includes the calculating section 18, the first memory 16 and the second memory 17.

In the first memory 16, image data indicating image $D_{n-1}$ taken at time $t=t_{n-1}$ is stored. In the second memory 17, image data indicating image $D_n$ taken at time $t=t_n$, is stored. The amount of shaking motion (e.g. a motion vector $(x_1, y_1)$) between the two image data (i.e. the image data indicating image $D_{n-1}$ and the image data indicating image $D_n$) is detected based on data indicating two images (image data indicating the image $D_{n-1}$ and image data indicating the image data $D_n$), and data indicating the amount of the shaking motion is output.

2. Operation for Correcting Shaking Motion

Figure 3:
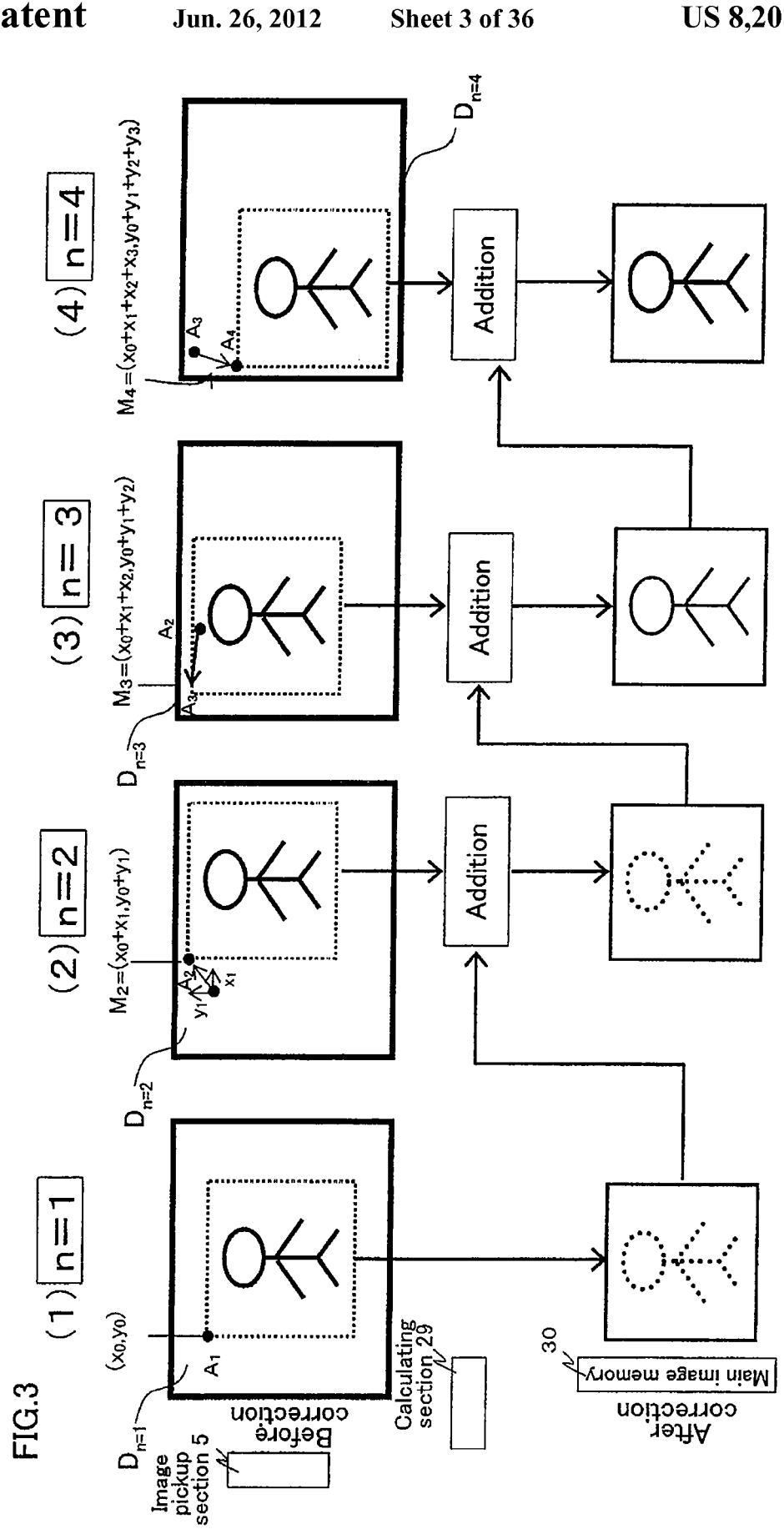
FIG. 3 is a view showing an operation for correcting the shaking motion according to an embodiment of the present invention.

FIG. 3 shows an operation for correcting the shaking motion according to an embodiment of the present invention. The shaking motion is caused by at least one hand of an operator.

Image $D_{n=1}$ indicates an image taken at time of n=1, image $D_{n=2}$ indicates an image taken at time of n=2, image $D_{n=3}$ indicates an image taken at time of n=3, and image $D_{n=4}$ indicates an image taken at time of n=4.

Image data indicating image Dn=1 is stored in the main image memory 30.

Image data indicating image $D_{n=2}$ is corrected in accordance with a shaking motion amount $M_2$ ($M_2=(x_0+x_1, y_0+y_1)$). The corrected image data is added to the image data indicating image $D_{n=1}$ stored in the main image memory 30 by the calculating section 29. Data indicating the result of the addition is stored in the main image memory 30. Since the corrected image data is added to image data indicating image $D_{n=1}$, the static part of an object is accurately overlapped. As a result, an SN ratio of the image is increased.

Image data indicating image $D_{n=3}$ is corrected in accordance with a shaking motion amount $M_3$ ($M_3=(x_0+x_1+x_2, y_0+y_1+y_2)$). The corrected image data is added to the data indicating the result of the addition stored in the main image memory 30 by the calculating section 29. Data indicating the result of the addition is stored in the main image memory 30.

Image data indicating image $D_{n=4}$ is corrected in accordance with a shaking motion amount $M_4$ ($M_4=(x_0+x_1+x_2+x_3, y_0+y_1+y_2+y_3)$). The corrected image data is added to the data indicating the result of the addition stored in the main image memory 30 by the calculating section 29. Data indicating the result of the addition is stored in the main image memory 30.

By repeating the addition of the data, the four image data which indicate almost identical images are stored in the main image memory 30, in which data indicating a static image is generated. When the shutter is 100% opened during an exposure period, it is possible to obtain an image having a brightness which is almost the same as the brightness of the image obtained when the shutter is continuously opened during a period from time of n=1 to time of n=4. It is also possible to correct a shaking motion for each screen.

By appropriately setting the parameters such as a shutter opening time (exposure time) and a frame rate in accordance with the degree of the shaking motion (i.e. a shaking motion amount) and the zoom ratio, it is possible to electronically correct the shaking motion without degrading the S/N. When the shutter opening time for taking each image is shortened, the degradation of the image due to the correction of the shaking motion is reduced, but the amount of light is also reduced. In this case, the number of frames to be taken should be increased.

In an embodiment of the present invention, it is possible to obtain an optimum frame rate by increasing the frequency of a transfer clock to increase the frame rate or by decreasing a resolution to increase the frame rate. As a result, an advantageous effect that there is a large applicable range can be obtained.

The calculation performed by the calculating section 29 is not limited to the addition. The calculation may be an integration, for example, as long as data indicating a static image can be generated based on a plurality of image data (frame information).

3. Masking Operation

Figure 4:
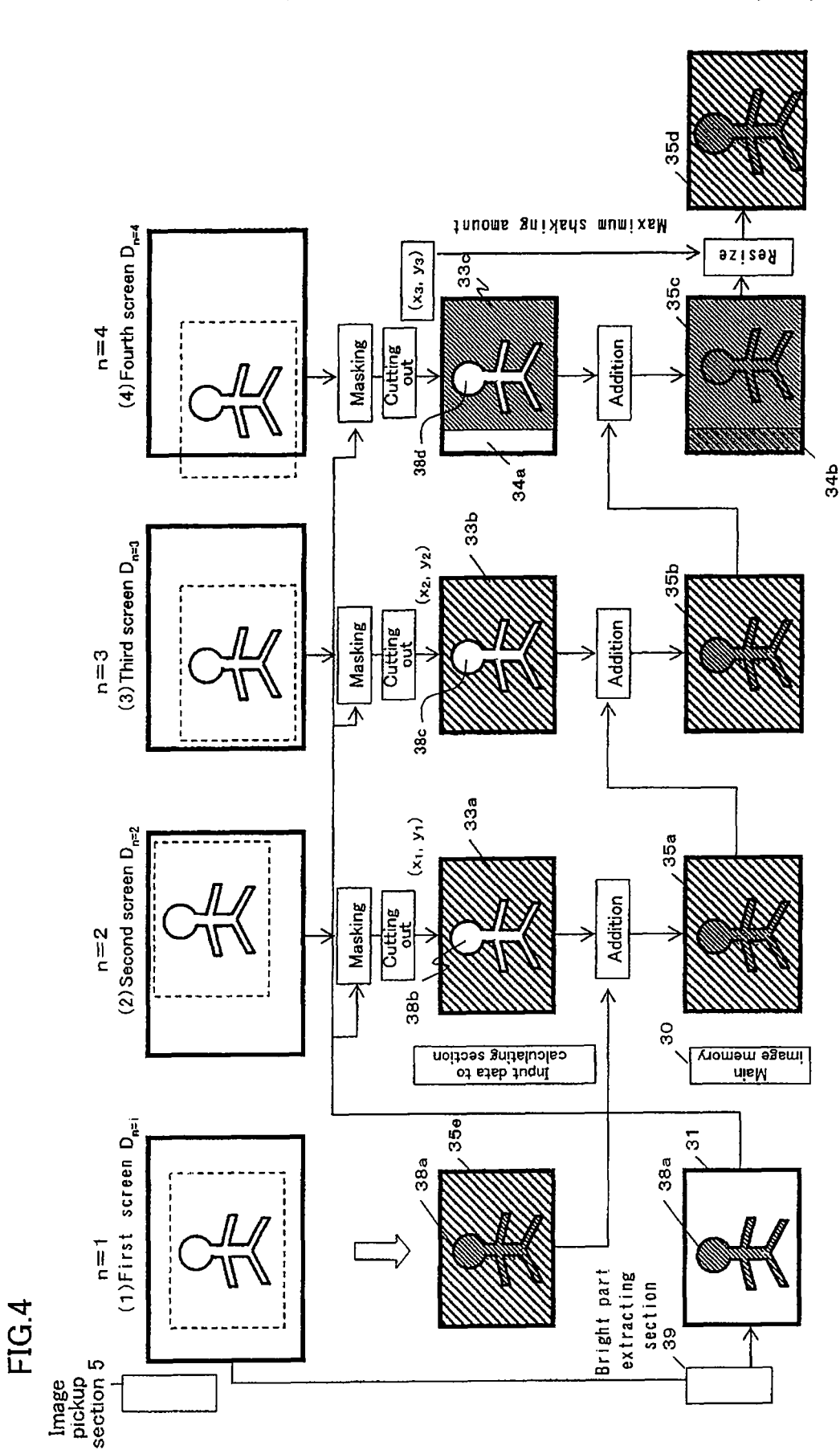
FIG. 4 is a view showing a masking operation according to an embodiment of the present invention.

FIG. 4 shows a masking operation according to an embodiment of the present invention.

Image $D_{n=1}$ indicates an image taken at time of n=1, image $D_{n=2}$ indicates an image taken at time of n=2, image $D_{n=3}$ indicates an image taken at time of n=3, and image $D_{n=4}$ indicates an image taken at time of n=4.

A stroboscope emits a light at the time of n=1. Accordingly, a person shown in image 35e is brighter than a background (e.g. a night scene), for example. Herein, the person shown in the image 35e is defined as a bright part 38a. The bright part extracting section 39 extracts data indicating the bright part 38a from data indicating the image 35e and generates masking data 31 based on the extracted data indicating the bright part.

At the time of n=2, the masking data 31 is cut out of the image data indicating image $D_{n=2}$. Data indicating a corrected image 33a is generated by deleting an image of the bright part 38b and correcting the shaking motion. The data indicating the corrected image 33a is added to the data indicating the image 35e, so as to generate data indicating an integrated image 35a.

At the time of n=3, the masking data 31 is cut out of the image data indicating image Dn=3. Data indicating a corrected image 33b is generated by deleting an image of the bright part 38c and correcting the shaking motion. The data indicating the corrected image 33b is added to the data indicating the integrated image 35a, so as to generate an integrated image 35b.

At the time of n=4, the masking data 31 is cut out of the image data indicating image Dn=4. Data indicating a corrected image 33c is generated by deleting an image of the bright part 38d and correcting the shaking motion. The data indicating the corrected image 33c is added to the data indicating the integrated image 35b, so as to generate data indicating an integrated image 35c.

The data indicating the integrated image 35c is resized so as to generate data indicating an integrated image 35d.

As described above, a bright part such as a person which becomes bright by the light emitted from the stroboscope is taken at the time of n=1, and an image of a region other than the bright part among the image is taken at the time of n=2, 3 and 4. When a picture of a person in a night scene and the like is taken at a slow shutter speed using the stroboscope, an image of a face of the person exposed during a period at the slow shutter speed is overlapped onto an image of the face of the person at the time when the stroboscope emits the light (double exposure) so that the overlapped image is blurred. However, according to the masking operation according to the embodiment of the present invention, the correction of the shaking motion allows that the bright part such as a face of the person is not subjected to the double exposure. As a result, the bright part can be taken clearly.

4. Change of Frame Rate

Figure 5:
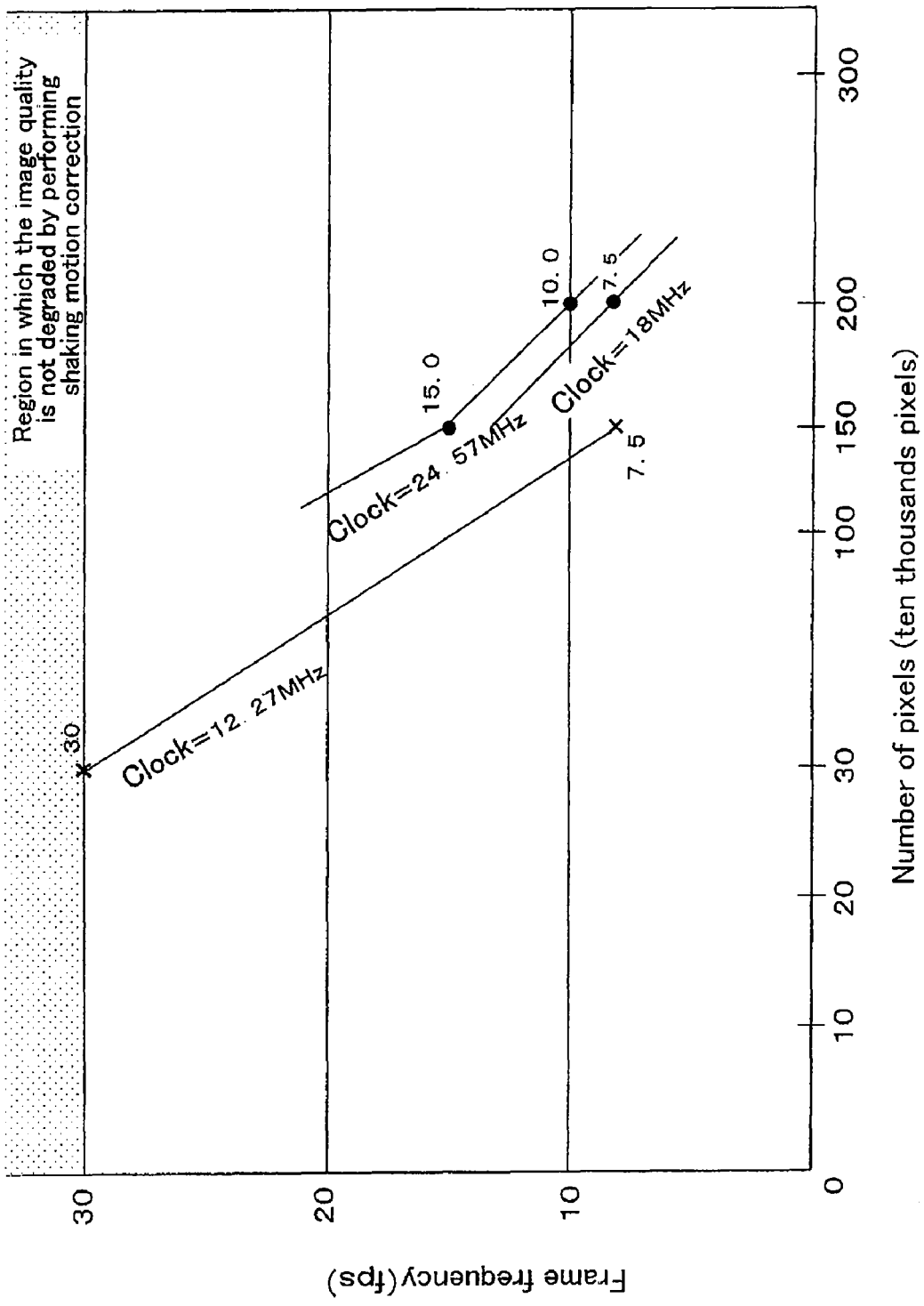
FIG. 5 is a chart showing a relationship between the number of pixels and the frame frequency.

FIG. 5 shows a relationship between the number of pixels and the frame frequency.

When the resolution in the image pickup section 5 (see FIG. 1) is reduced by the resolution changing section 24 (see FIG. 1), the frame rate (fps) can be increased. Further, when the transfer clock speed is increased by the clock control section 27, the processing clock supply section 28 and the transfer clock supply section 32, the frame rate (fps) can be increased.

In an embodiment according to the present invention, it is possible to substantially increase the frame rate by increasing the transfer clock or reducing the resolution at the time when the image is taken for the purpose of the correction of shaking motion, thereby eliminating an afterimage (image degradation) which is particularly caused by an electronic correction of the shaking motion. When a usual image pickup section having 2,000,000 pixels is used and the frame rate is approximately 7.5 fps, the influence of the afterimage is maintained. The frame rate should be higher than or equal to 20 fps. Otherwise, it is difficult to eliminate the afterimage which is particularly caused by the electronic correction of the shaking motion.

Figure 6:
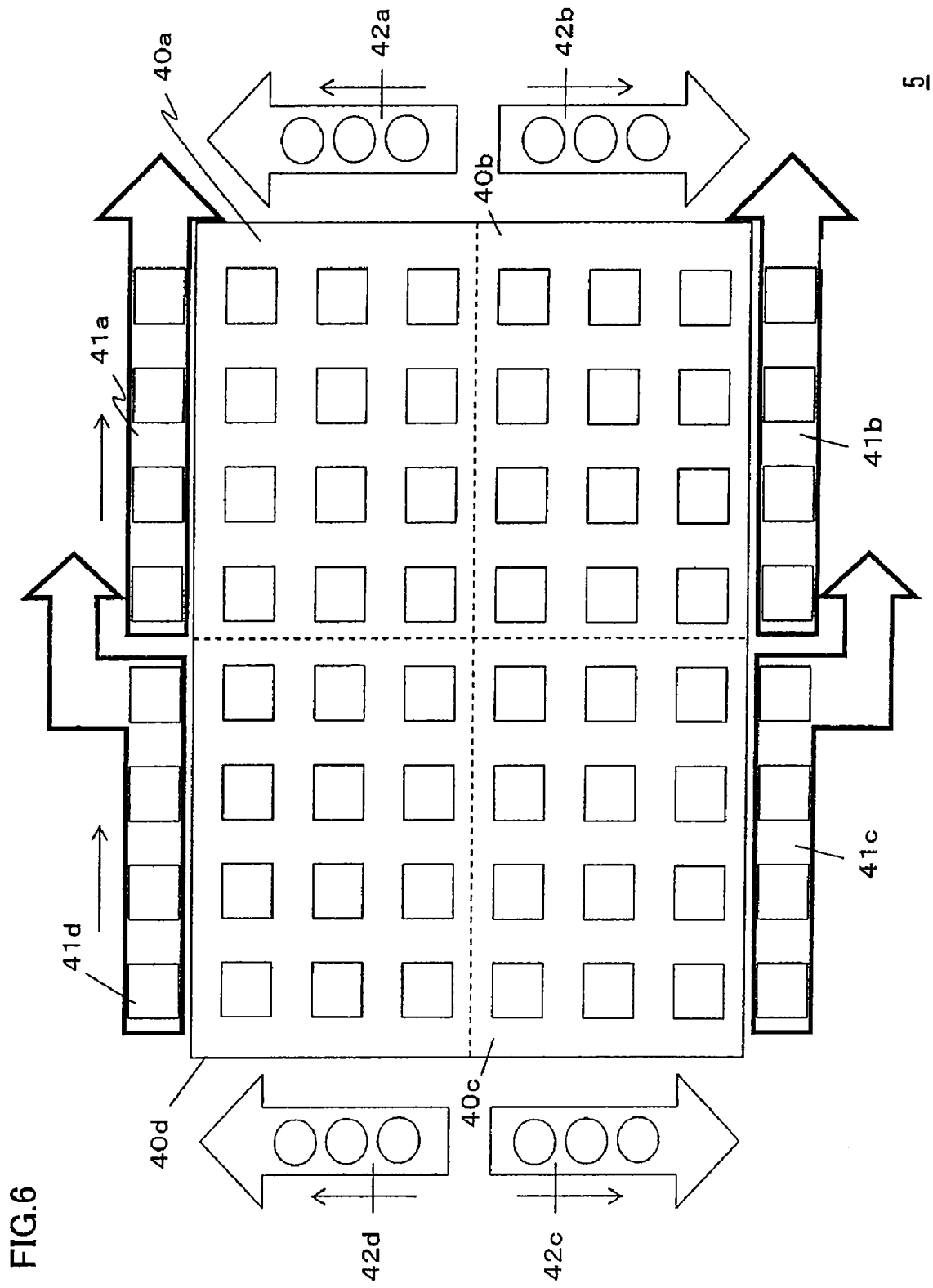
FIG. 6 is a view showing a structure of the image pickup section 5 including a pixel region divided into four parts.

FIG. 6 shows a structure of the image pickup section 5 including a pixel region divided into four parts.

The image pickup section 5 includes a pixel region 40. The pixel region 40 is divided into four pixel regions (i.e. pixel region 40a, pixel region 40b, pixel region 40c and pixel region 40d). The image pickup section 5 further includes a horizontal transfer section divided into four parts (i.e. horizontal transfer section 41a, horizontal transfer section 41b, horizontal transfer section 41c and horizontal transfer section 41d) and a vertical transfer section divided into four parts (i.e. vertical transfer section 42a, vertical transfer section 42b, vertical transfer section 42c and vertical transfer section 42d). Accordingly, time required for sweeping all pixels out is reduced to be ¼ of its original amount and the frame rate is increased to be fourfold its original amount. In this case, the frame rate is 30 fps under the condition that an image pickup device of a CCD type having 2,100,000 pixels is used and the clock speed is 18 MHz. As a result, it is possible to not observe image degradation due to the correction of the shaking motion. The image pickup section 5 may be divided into two parts in a transverse direction.

Figure 7:
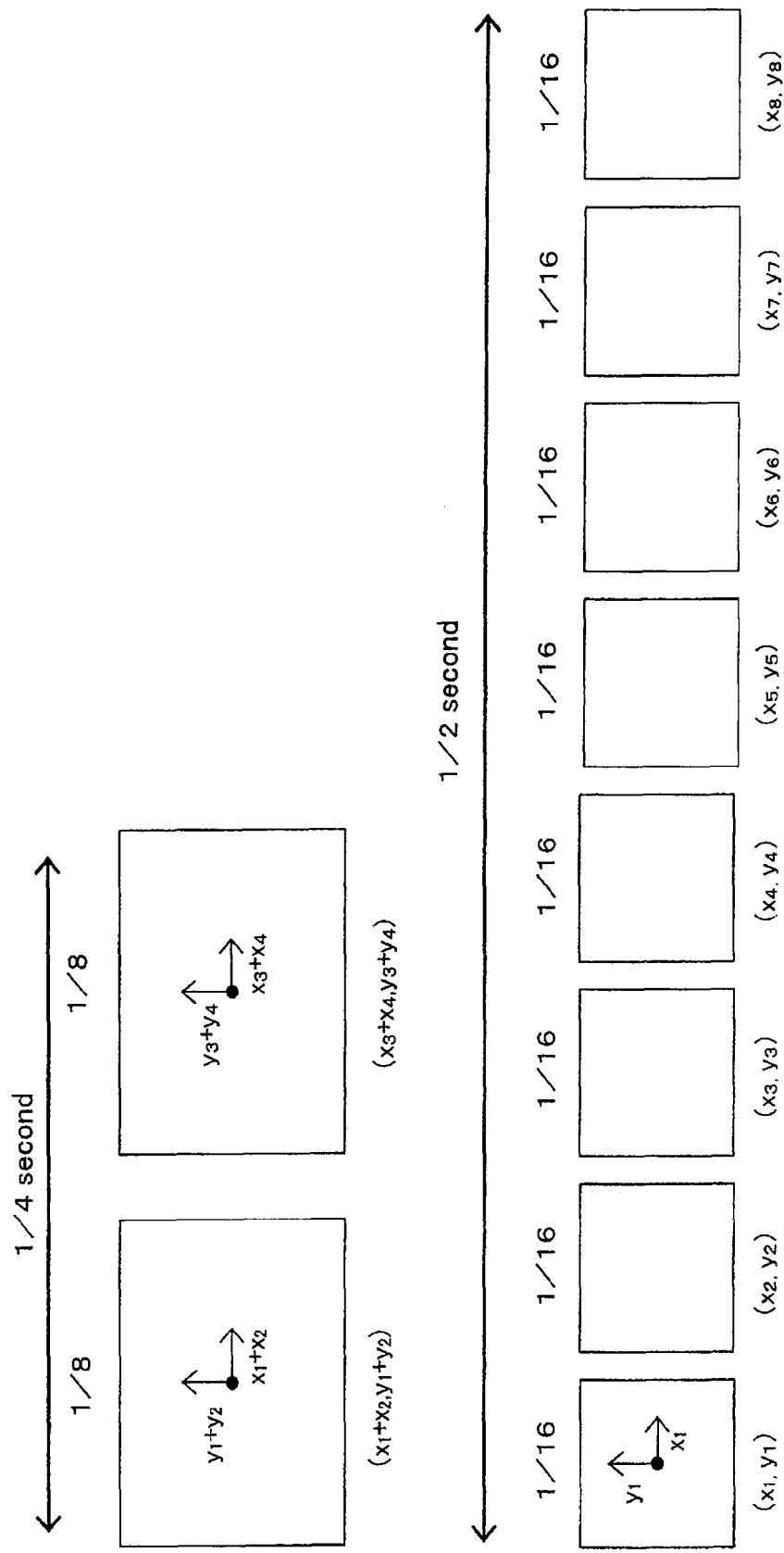
FIG. 7 is a view showing an operation in the case where the frame rate is increased according to an embodiment of the present invention.

FIG. 7 is a diagram showing an operation in the case where the frame rate is increased according to an embodiment of the present invention.

When the exposure time is ¼ second, a frame is obtained every ⅛ second. In this case, an amount of the shaking motion in the x-direction is represented by $\int_0^{}(x_i+x_{i+1})dt \approx ((x_1+x_2)+(x_3+x_4))/2$.

When the exposure time is ½ second, a frame is obtained every 1/16 second by increasing the frame rate. In this case, the amount of the shaking motion in the x-direction is represented by $(x_1+x_2+x_3+x_4+x_5+x_6+x_7+x_8)/8 \approx ((x_1+x_2+x_3+x_4)/2+(x_5+x_6+x_7+x_8)/2)/4$.

When the exposure time is long, the frame rate is increased to obtain a large number of frames. As a result, it is possible to detect the amount of the shaking motion in detail, and it is possible to decrease image degradation due to the correction of the shaking motion.

Thus, according to the image pickup apparatus of the present invention, it is possible to correct the shaking motion over information indicating a plurality of frames and to generate information indicating a static image. Therefore, it is possible to obtain a static image subjected to the correction of the shaking motion.

As described above, in the chapters titled (1. Image pickup apparatus) to (4. Change of frame rate), an exemplary embodiment of the present invention is described with reference to FIGS. 1 to 7.

In the embodiment shown in FIGS. 1 to 7, for example, the shaking motion detecting section 15 corresponds to "a shaking motion detecting section for detecting an amount of the shaking motion between a plurality of frames representing the static image which has been taken", the shaking motion correcting section 9 corresponds to "a shaking motion correcting section for correcting a plurality of frame information indicating the plurality of frames in accordance with the detected amount of the shaking motion", the main image memory 30 corresponds to "a storage section for storing the plurality of frame information subjected to the correction of the shaking motion", and the calculating section 29 corresponds to "an information generating section for generating static image information indicating a static image based on the plurality of frame information stored in the storage section".

However, the image pickup apparatus of the present invention is not limited to the embodiment shown in FIGS. 1 to 7. Each of the components included in the image pickup apparatus can have an arbitrary configuration as long as the image pickup apparatus has each function of the "the shaking motion detecting section for detecting an amount of the shaking motion between a plurality of frames representing a static image which has been taken", "the shaking motion correcting section for correcting a plurality of frame information indicating the plurality of frames in accordance with the detected amount of the shaking motion", "the storage section for storing the plurality of frame information subjected to the correction of the shaking motion", and "the information generating section for generating static image information indicating a static image based on the plurality of frame information stored in the storage section".

5. Image Pickup Method 1

Figure 8:
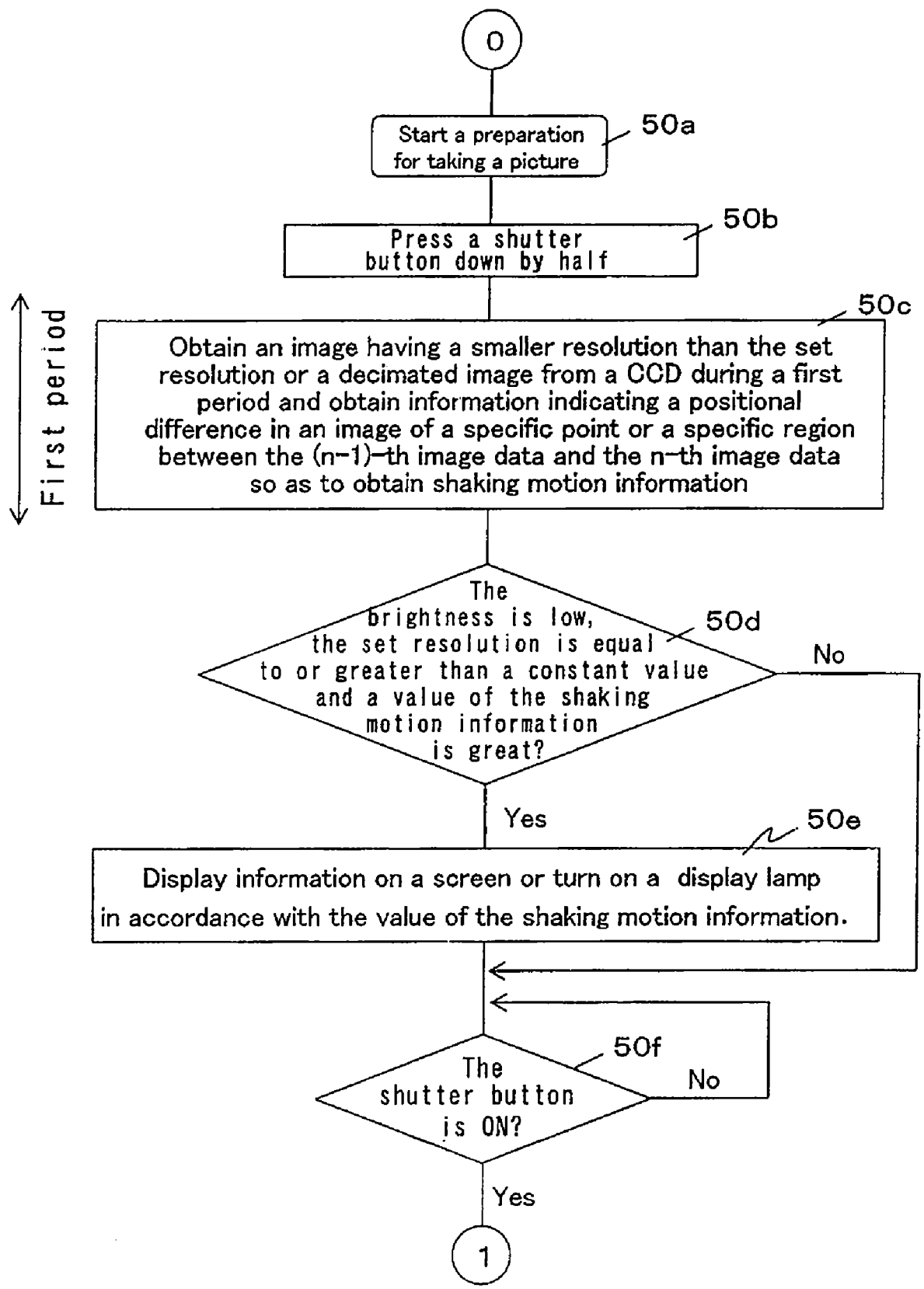
FIG. 8 is a flowchart showing a procedure of the image pickup process (steps 50a to 50f) according to an embodiment of the present invention.

FIG. 8 shows a procedure of an image pickup process (step 50*a* to Step 50*f*) according to an embodiment of the present invention.

Figure 9:
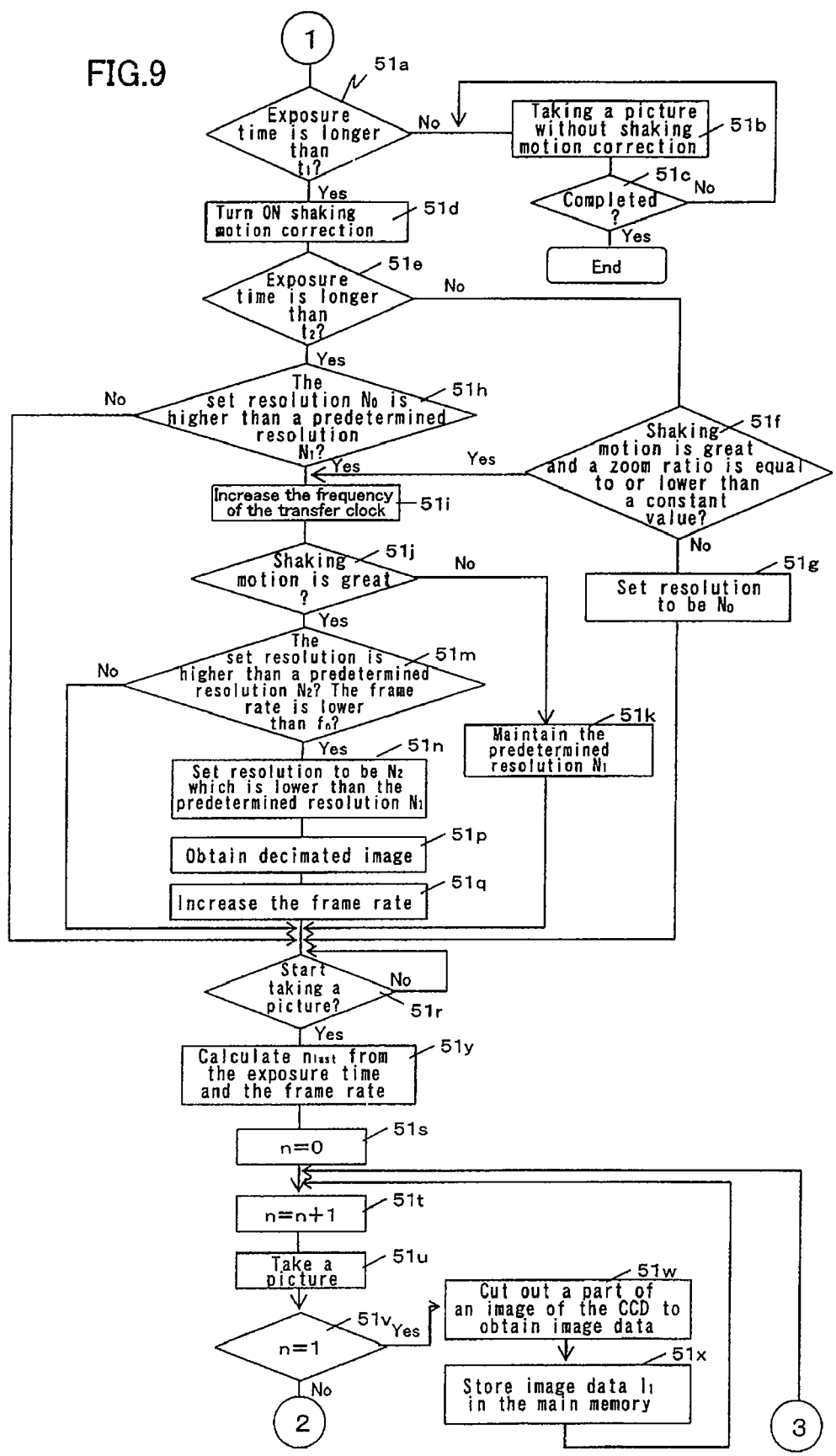
FIG. 9 is a flowchart showing a procedure of the image pickup process (steps 51a to 51f according to an embodiment of the present invention.

FIG. 9 shows a procedure of an image pickup process (step 51*a* to Step 51*y*) according to an embodiment of the present invention.

Figure 10:
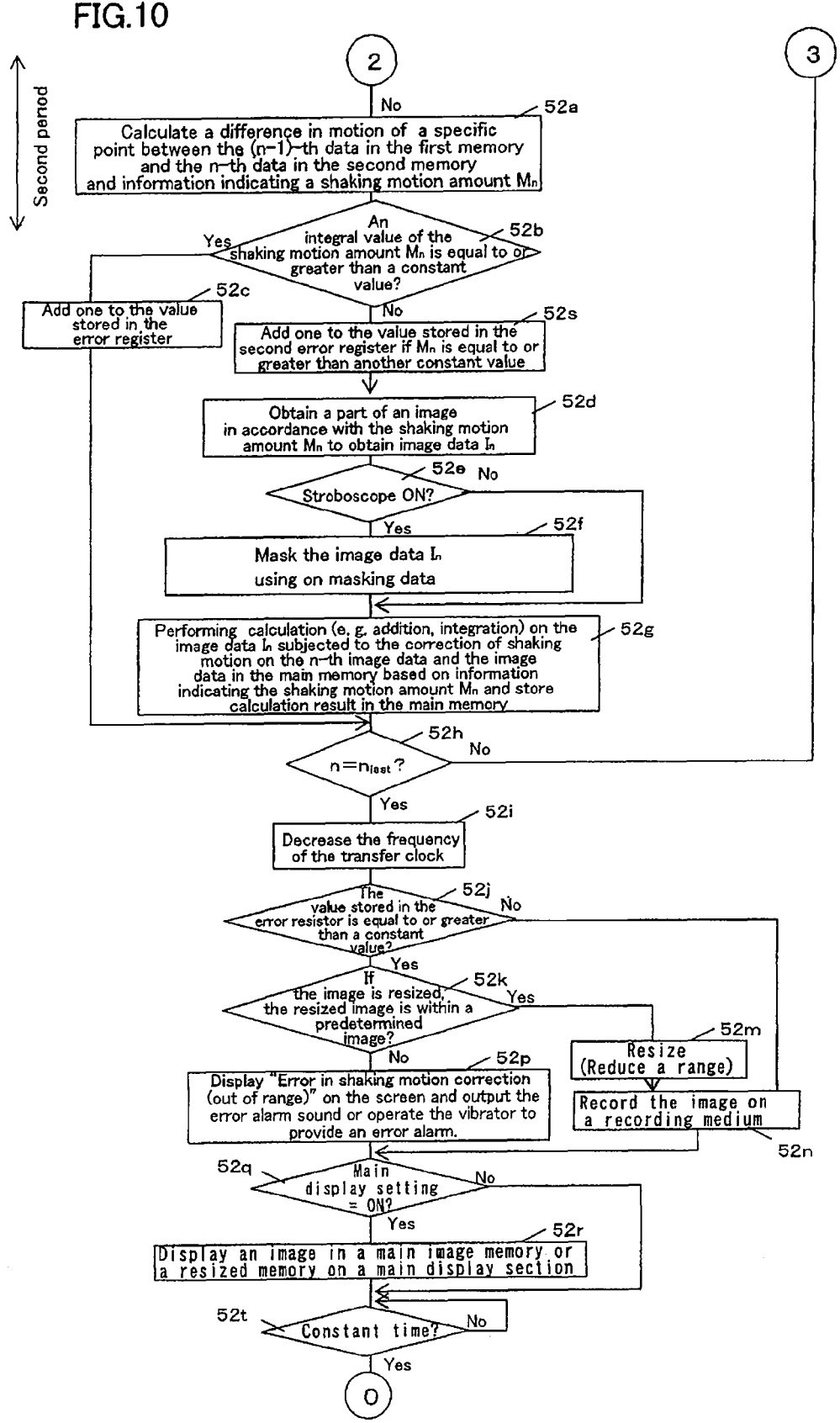
FIG. 10 is a flowchart showing a procedure of the image pickup process (steps 52a to 52t) according to an embodiment of the present invention.

FIG. 10 shows a procedure of an image pickup process (step 52*a* to Step 52*t*) according to an embodiment of the present invention.

With reference to FIG. 1 and FIGS. 8 to 10, the procedure of the image pickup process according to an embodiment of the present invention will be described below step by step.

With reference to FIG. 8, steps 50*a* to 50*f* will be described below.

Step 50*a*: An operator prepares to take a still picture.

Step 50*b*: When the operator presses the shutter button 25 halfway down, the CPU 26 provides an instruction to the clock control section 27, such that the processing clock supply section 28 starts the operation of a clock or increases a clock speed in the calculating section and the like. When the processing clock supply section 28 starts the operation of the clock or increases the clock speed in the calculating section 29 and the like, the process proceeds to step 50*c*.

Step 50*c*: The image pickup section 5 obtains an image having a smaller resolution than a set resolution or a decimated image. Information indicating a positional difference in a specific point or a specific region between the (n−1)-th image and the n-th image is generated based on the data indicating the (n−1)-th image and the data indicating the n-th image, so as to obtain shaking motion information (an amount of shaking motion).

Step 50*d*: It is determined whether or not the shaking motion information (the amount of shaking motion) is larger than a predetermined value under the condition that the brightness in the place where the still picture is to be taken is low and the set resolution is greater than or equal to a constant value. If the shaking motion information is larger than the predetermined value (Yes), then the process proceeds to step 50*e*. If the shaking motion information is smaller than or equal to the predetermined value (No), then the process proceeds to step 50*f*.

Step 50*e*: A warning of "Beware of shaking motion." is displayed on the display section 12 in accordance with the value of the shaking motion information.

Step 50*f*: The operator determines whether or not he/she presses the shutter button 25 down. If the operator presses the shutter button 25 down (Yes), then the process proceeds to step 51*a* (see FIG. 9). If the operator does not press the shutter button 25 down (No), the process of the step 50*f* is repeated.

With reference to FIG. 9, steps 51*a* to 51*y* will be described below.

Step 51*a*: It is determined whether or not a shutter speed (exposure time) is longer than $t_1$. For example, the CPU 26 determines whether or not the shutter speed (the exposure time) is longer than $t_1$.

If the shutter speed (the exposure time) is shorter than or equal to $t_1$ under the condition that the zoom ratio of the zoom section 6 is smaller than or equal to a constant value (No), then the process proceeds to step 51*b*. If the shutter speed (the exposure time) is longer than t1 (Yes), then the process proceeds to step 51*d*.

Step 51*b*: A picture is taken without correcting shaking motion (without correcting shaking motion).

Step 51*c*: Taking a picture is completed and the process is terminated.

Step 51*d*: The shaking motion correction priority switch is turned ON.

Step 51*e*: It is determined whether or not the shutter speed (the exposure time) is longer than $t_2$.

If the shutter speed (the exposure time) is shorter than or equal to $t_2$ (No), then the process proceeds to step 51*f*. If the shutter speed (the exposure time) is longer than $t_2$ (Yes), the process proceeds to step 51*h*.

Step 51*f*: It is determined whether or not the shaking motion occurs radically, and whether or not the zoom ratio is higher than or equal to a constant value.

If the shaking motion does not occur radically and the zoom ratio is higher than the constant value (No), then the process proceeds to step 51*g*. If the shaking motion occurs radically and the zoom ratio is lower than or equal to the constant value (Yes), then the process proceeds to step 51*i*.

Step 51*g*: The process proceeds to a routine for correcting the shaking motion (step 51*r*) while a resolution is set to be a preset resolution $N_0$.

Step 51*h*: It is determined whether or not the set resolution $N_0$ is higher than a predetermined resolution $N_1$.

If the set resolution $N_0$ is lower than or equal to the predetermined resolution $N_1$ (No), then the process proceeds to the step 51$r$. If the set resolution $N_0$ is higher than the predetermined resolution $N_1$ (Yes), then the process proceeds to step 51$i$.

Step 51$i$: The speed of the transfer clock of the pixel transfer section 23 is increased by the clock control section 27. Thus, the frame rate is increased.

Step 51$j$: It is determined whether or not the shaking motion occurs radically.

If the shaking motion does not occur radically and the zoom ratio is lower than or equal to the constant value, that is, the shaking motion is very small (No), then the process proceeds to step 51$k$. If the shaking motion occurs radically or the zoom ratio is higher than the constant value, that Is, the shaking motion occurs radically to some extent (Yes), then the process proceeds to step 51$m$.

Step 51$k$: The process proceeds to step 51$r$ while the resolution is set to be the predetermined resolution $N_1$.

Step 51$m$: It is determined whether or not the set resolution is higher than a predetermined resolution $N_2$, or it is determined whether or not the frame rate is lower than a predetermined value fn.

If the set resolution is lower than or equal to the predetermined resolution $N_2$, or the frame rate is higher than or equal to the predetermined value fn (No), then the process proceeds to step 51$r$.

If the set resolution is higher than the predetermined resolution $N_2$, or the frame rate is lower than the predetermined value fn (Yes), then the process proceeds to step 51$n$.

Step 51$n$: The process proceeds to step 51$p$ in order to set the resolution to be the resolution $N_2$ which is lower than the predetermined resolution $N_1$.

Step 51$p$: By the resolution changing section 24 and the decimation control section 25$a$, a pixel output from the image pickup section 5 is decimated or information indicating a plurality of pixels in the in-plane direction is added to each other to generate information indicating one pixel, thereby decreasing the number of pixels (i.e. decreasing the resolution) (the resolution is set to be the resolution $N_2$).

Step 51$q$: As a result of setting the resolution to be the resolution $N_2$ which is lower than the predetermined resolution $N_1$, a value of the highest speed of the frame rate is increased. The frame rate is increased.

Step 51$r$: It is determined whether or not an input of an image to the routine for correcting the shaking motion is started in order to take a plurality of frames (images) into the image pickup apparatus 100. If the input of the image is started (Yes), the process proceeds to step 51$y$.

Step 51$y$: The total number of frames $n_{last}$ required for a dividing exposure is calculated based on exposure time (i.e. a shutter time), a diaphragm value and a frame rate. When the shaking motion occurs radically, the shutter time is shortened for each still picture.

Step 51$s$: n is set be 0 (n=0).

Step 51$t$: n is incremented by one (n=n+1).

Step 51$u$: The n-th image is taken, and the n-th static image from the image pickup section 5 is stored into the sub-memory 8 (i.e., n-th static image data is obtained).

Step 51$v$: It is determined whether or not the static image data is the 1st static image data.

If the static image data is the 1st static image data (Yes), then the process proceeds to step 51$w$. If the static image data is not the 1st static image data (No), then the process proceeds to step 52$a$ (see FIG. 10).

Step 51$w$: A part of the image of the image pickup section 5 is cut out to obtain image data $I_1$.

Step 51$x$: The image data $I_1$ is stored in the main image memory 30.

With reference to FIG. 10, steps 52$a$ to 52$t$ will be described below.

Step 52$a$: The motion of a specific point between the first image data and the second image data is calculated by the shaking motion detecting section 15 so as to obtain a shaking motion amount Mn (see FIG. 2).

When image data indicating a first image $D_1$, taken at time of t=$t_1$, is stored in the first memory 16 included in the shaking motion detecting section 15 and image data indicating a second image $D_2$, taken at time of t=$t_2$, is stored in the second memory 17 included in the shaking motion detecting section 15, the shaking motion detecting section 15 detects a shaking motion amount $M_1$ (e.g. a motion vector (x1, y1)) between the image $D_1$ and the image $D_2$ based on the image data indicating two images (i.e. the image data indicating the image $D_1$ and the image data indicating the image $D_2$) and outputs data indicating the shaking motion amount.

Step 52$b$: It is determined whether or not the integral value of the shaking motion amount Mn is greater than or equal to a constant value.

If the integral value of the shaking motion amount Mn is greater than or equal to the constant value (Yes), then it is determined that the taken image gets out of a specific region and the process proceeds to step 52$c$. If the integral value of the shaking motion amount Mn is smaller than the constant value (No), then the process proceeds to step 52$s$.

Step 52$c$: A value of "1" (one) is added to the value stored in the error register. The n-th image is not stored in the main image memory 30, and the process proceeds to step 52$h$.

Step 52$s$: It is determined whether or not the integral value of the shaking motion amount Mn is greater than or equal to another constant value. If the integral value of the shaking motion amount Mn is greater than or equal to another constant value, then a value of "1" (one) is added to the value stored in the second error register.

Step 52$d$: Image data $I_n$, which is cut out from the image data output from the image pickup section 5 in the longitudinal direction in accordance with the shaking motion amount Mn, is stored in the sub-image memory 8.

Step 52$e$: It is determined whether or not the stroboscope is turned ON. If the stroboscope is turned ON (Yes), then the process proceeds to step 52$f$. If the stroboscope is not turned ON (No), then the process proceeds to step 52$g$.

Step 52$f$: The image data In is previously masked by the masking section 20 (see FIGS. 4 and 3. Masking operation).

Step 52$g$: The image data $I_n$, subjected to the correction of the shaking motion in the lateral direction and the correction of the shaking motion in the longitudinal direction, is obtained from the shaking motion correcting section 9.

For example, the image data In is sent to the calculating section 29 and a calculation (e.g. addition, integration) is performed on the image data stored in the main image memory 30 and the image data $I_n$, and the calculation result is stored back into the main image memory 30.

Step 52$h$: The shaking motion correcting control section 21 determines whether or not n is equal to $n_{last}$ (i.e. n=$n_{last}$ is satisfied), where $n_{last}$ denotes a last value for n.

If n=$n_{last}$ is satisfied (Yes), then the process proceeds to step 52$i$. If n=$n_{last}$ is not satisfied (No), then the process proceeds to step 51$t$ (see FIG. 9) in order to take another image data.

Step 52$i$: The frequency of the transfer clock of the image pickup section 5 is lowered by the clock control section 27. Alternatively, the transfer clock of the image pickup section 5 may be stopped in order to reduce power consumption.

Step 52*j*: It is determined whether or not the value stored in the second error register is greater than or equal to a constant value.

If the value stored in the second error register is smaller than the constant value (No), then the process proceeds to step 52*n*. If the value stored in the second error register is greater than or equal to the constant value (Yes), then the process proceeds to step 52*k*.

Step 52*k*: It is determined whether or not a lacking part can be eliminated (whether or not the range of the lacking part is within the range in which the lacking part can be eliminated) by resizing an integrated image.

For example, a lacking part 34*a* is generated in the corrected image 33*c* (see FIG. 4). In this case, a lacking part 34*b* is also generated in the integrated image 35*c*. Accordingly, it is necessary to resize the integrated image 35*c* in order to eliminate the lacking part 34*b*. In this case, it is determined whether or not the lacking part 34*b* can be eliminated (whether or not the range of the lacking part 34*b* is within the range in which the lacking part 34*b* can be eliminated) by resizing the integrated image 35*c*.

If the lacking part can be eliminated (Yes), then the process proceeds to step 52*m*. If the lacking part cannot be eliminated (No), then the process proceeds to step 52*p*.

Step 52*m*: The lacking part 34*b* is eliminated by resizing the integrated image 35*c*, so as to obtain an integrated image 35*d* having no lacking part (see FIG. 4).

Step 52*n*: The data indicating the integrated image 35*d* is recorded on the recording medium 14.

Step 52*p*: Even if the correction of the shaking motion is performed, the lacking part cannot be eliminated. Therefore, an operator is notified of the failure to correct the shaking motion. For example, the statement having the meaning of "Error in the shaking motion correction (out of range)" is displayed on the display section 12 (see FIG. 1). Further, an error warning sound is output from the speaker 37. Further, the vibrator 36 is vibrated.

Step 52*q*: It is determined whether or not the main display setting is turned ON.

If the main display setting is turned ON (Yes), then the process proceeds to step 52*r*. If the main display setting is not turned ON (No), then the process proceeds to step 52*t*.

Step 52*r*: The integrated image subjected to the correction of the shaking motion, which is stored in the main image memory 30, or the resized image is displayed on the display section 12.

Step 52*t*: The image subjected to the correction of the shaking motion is recorded on the recording medium 14. When another image subjected to the correction of the shaking motion is to be taken after a predetermined time passes, the process returns back to the initial step 50*a* (see FIG. 8).

Thus, according to the image pickup method of the present invention, information indicating a plurality of frames can be subjected to the correction of the shaking motion and information indicating a static image can be generated. As a result, it is possible to obtain one static image subjected to the correction of the shaking motion.

As described above, in the chapter titled (5. Image pickup method 1), the exemplary embodiment of the present invention has been described with reference to FIG. 1 and FIGS. 8 to 10.

For example, in the embodiment shown in FIGS. 8 to 10, step 52*a* corresponds to "the step of detecting an amount of shaking motion between a plurality of frames representing a static image which is taken", steps 52*b* to 52*g* correspond to "the step of correcting a plurality of frame information indicating the plurality of frames in accordance with the detected amount of the shaking motion", step 52*g* corresponds to "the step of staring the plurality of frame information subjected to the correction of the shaking motion", and step 52*g* or step 52*m* corresponds to "the step of generating static image information indicating a static image based on the plurality of frame information stored in the storage section".

However, the image pickup method of the present invention is not limited to the embodiment shown in FIGS. 8 to 10. Each of the steps included in the image pickup method can be processed in any arbitrary manner as long as the image pickup method has the functions of "detecting an amount of shaking motion between a plurality of frames representing a static image which is taken", "correcting a plurality of frame information indicating the plurality of frames in accordance with the detected amount of the shaking motion", "storing the plurality of frame information subjected to the correction of the shaking motion", and "generating static image information indicating a static image based on the plurality of frame information stored in the storage section".

For example, as described with reference to FIGS. 8 to 10, the calculating section 29 sequentially calculates each of a plurality of image data (frame information) stored in the main image memory 30, thereby generating static image information. Alternatively, the calculating section 29 may simultaneously calculate a plurality of image data (frame information) stored in the main image memory 30, thereby generating the static image information.

6. Image Pickup Method 1 (Sequential Calculation)

Figure 11:
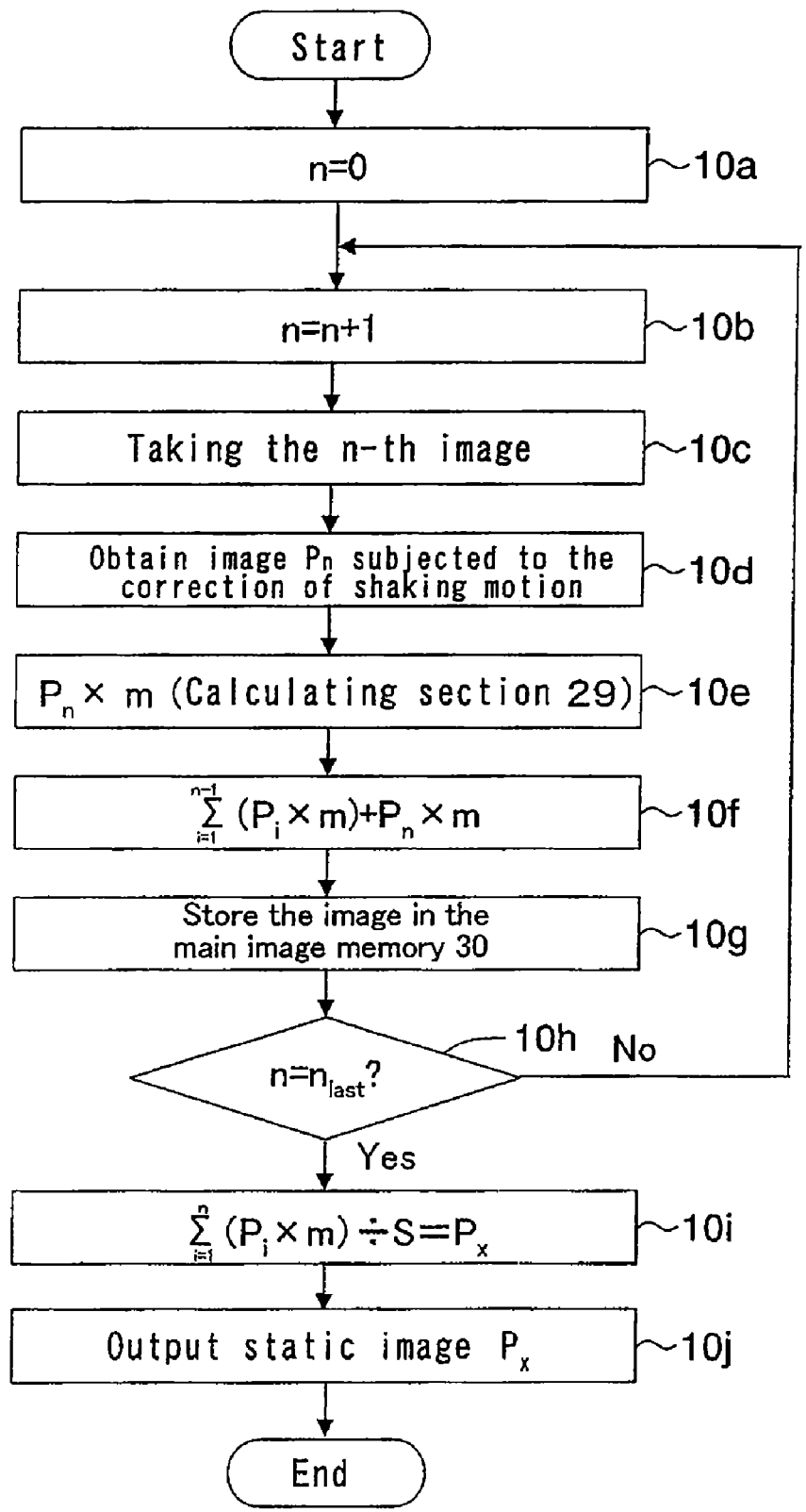
FIG. 11 is a flowchart showing a procedure of the sequential calculation process according to an embodiment of the present invention.

FIG. 11 shows a procedure of a sequential calculation process according to an embodiment of the present invention. In the procedure of the sequential calculation process, each of a plurality of image data (frame information) is sequentially calculated to generate static image information.

With reference to FIGS. 1 and 11, the procedure of the sequential calculation process after the preparation of taking a picture is completed (the process starting from step 51*s* in FIG. 9) will be described below step by step.

Step 10*a*: n is set to be 0 (n=0).

Step 10*b*: n is incremented by one (n=n+1).

Step 10*c*: The n-th image is taken, and the n-th image is stored into the sub-memory 8.

Step 10*d*: The n-th image is subjected to the correction of the shaking motion so as to obtain an image $P_n$ which has been subjected to the correction of the shaking motion.

Step 10*e*: The calculating section 29 multiplies the data indicating the image $P_n$ subjected to the correction of the shaking motion by m ($P_n \times m$).

Step 10*f*: The calculating section 29 adds the data indicating the image $P_n$ multiplied by m to the image data stored in the main image memory 30 ($\Sigma^{n-1}_{i=1}(P_i \times m) + (P_n \times m)$).

Step 10*g*: The result of the addition is stored in the main image memory 30.

Step 10*h*: It is determined whether or not n is equal to $n_{last}$ (n=$n_{last}$ is satisfied), where mast denotes the last value for n.

If n=$n_{last}$ is satisfied (Yes), then the process proceeds to step 10*i*. If n=$n_{last}$ is not satisfied (No), then the process proceeds to step 10*b* in order to take another image data.

Step 10*i*: The sub-calculating section 29*a* multiples, by 1/s, the image data multiplied by m and added sequentially, so as to generate image data $P_x$ indicating a static image ($P_x = (\Sigma^n_{i=1}(P_i \times m))/s$).

Step 10*j*: The generated image data $P_x$ is output to the recoding section 13.

After the generated image data $P_x$ is output to the recoding section 13, the process is completed.

Thus, according to the procedure of the sequential calculation process, each of the image data (frame information) is sequentially calculated to generate static image information. Therefore, it is possible to shorten the time required for generating the static image information.

Further, the calculating section 29 adds the data indicating the pixel $P_n$ multiplied by m to the image data stored in the main image memory 30 and the sub-calculating section 29a multiplies, by 1/s, the image data multiplied by m and added sequentially so as to generate image data $P_x$ indicating a static image. By setting the value of m and the value s to arbitrary values, it is possible to obtain a single still picture having a desired brightness.

7. Image Pickup Method 1 (Simultaneous Calculation)

Figure 12:
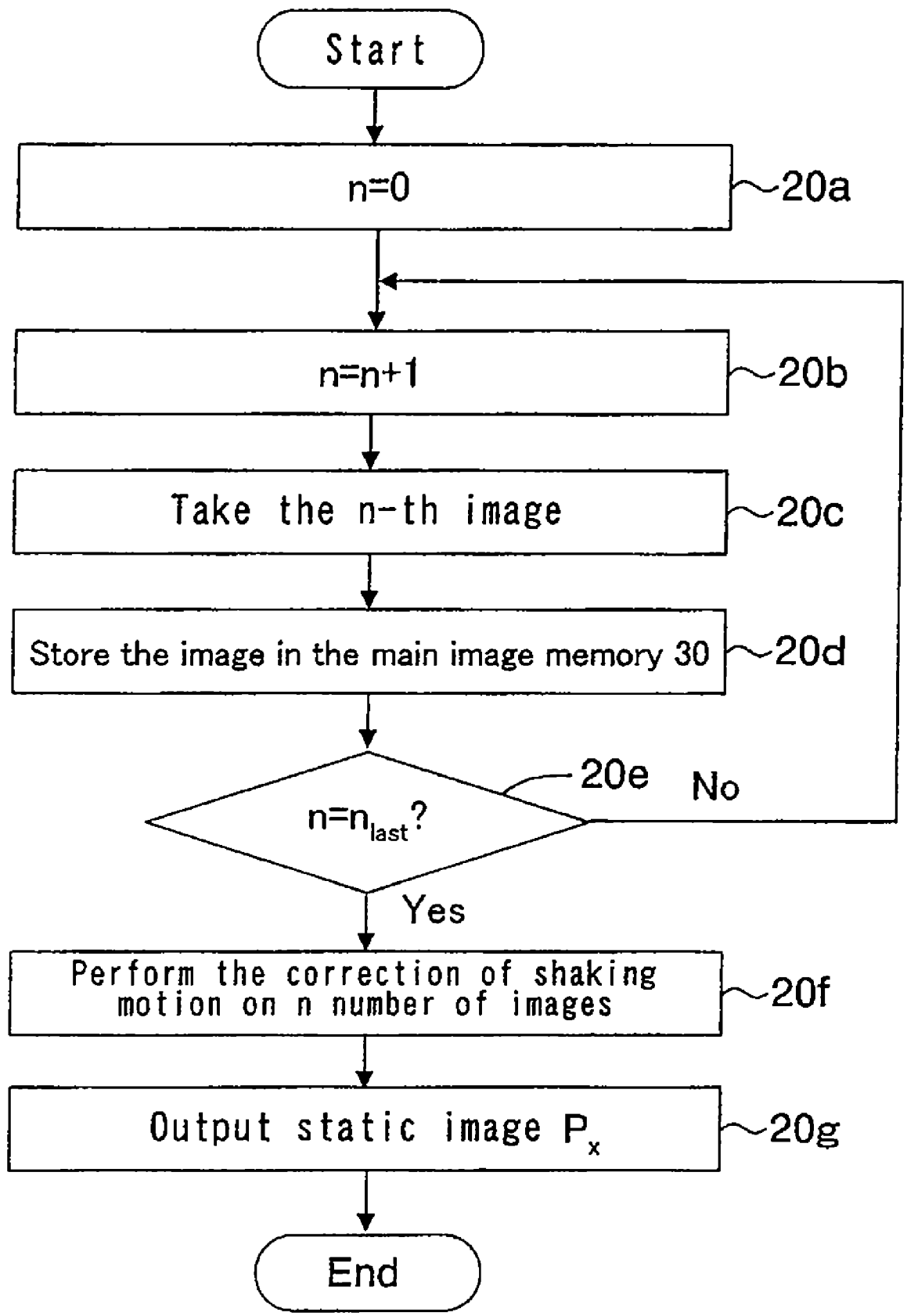
FIG. 12 is a flowchart showing a procedure of the simultaneous calculation process according to an embodiment of the present invention.

FIG. 12 shows a procedure of a simultaneous calculation process according to an embodiment of the present invention. In the procedure of the simultaneous calculation process, a plurality of image data (frame information) are simultaneously calculated, thereby generating static image information.

With reference to FIGS. 1 and 12, the procedure of the simultaneous calculation process after a preparation of taking a picture is completed (the process starting from step 51s in FIG. 9) will be described below step by step.

Step 20a: n is set to be 0 (n=0).

Step 20b: n is incremented by one (n=n+1).

Step 20c: The n-th image is taken.

Step 20d: The data indicating the n-th image is stored in the main image memory 30.

Step 20e: The calculating section 29 determines whether or not n is equal to $n_{last}$ (n=$n_{last}$ is satisfied), where $n_{last}$ denotes the last value for n.

If n=$n_{last}$ is satisfied (Yes), then the process proceeds to step 20f. If n=$n_{last}$ is not satisfied (No), the process proceeds to the step 20b in order to take another image data.

Step 20f: The n number of images are subjected to the correction of the shaking motion. The respective pixels of the n number of images subject to the correction of the shaking motion are integrated so as to generate image data $P_x$ indicating one static image.

Step 20g: The generated image data $P_x$ is output to the recording section 13.

After the generated image data $P_x$ is output to the recording section 13, the process is completed.

Thus, according to the procedure of simultaneous calculation process, a plurality of image data (frame information) is simultaneously calculated to generate static image information. Therefore, it is possible to reduce the load of the calculating section 29.

As described in the chapter titled (6. Image pickup method 1 (sequential calculation)), the image data can be appropriately multiplied by m and 1/s by the sub-calculating section 29a. Accordingly, it is possible to obtain a single still picture having a desired brightness.

8. Image Pickup Method 2

Figure 13:
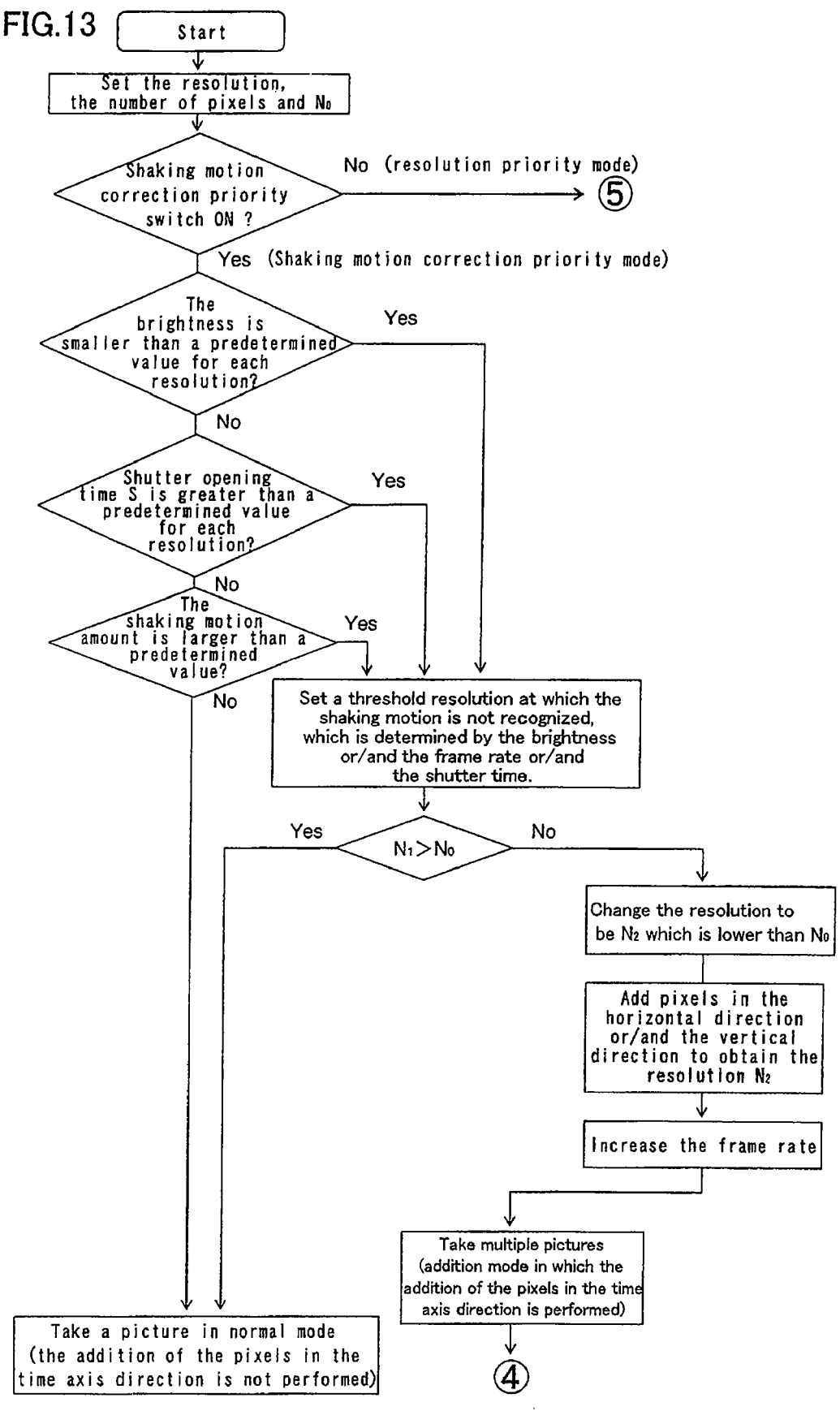
FIG. 13 is a flowchart showing a procedure of a process for correcting the shaking motion by integrating a plurality of images (divided images) in accordance with a shutter speed (exposure time) and a brightness in the place where a picture is to be taken.

FIG. 13 shows a procedure of a process for correcting the shaking motion by integrating a plurality of images (divided images) in accordance with a shutter speed (exposure time) and a brightness in the place where a picture is to be taken.

The procedure of this process will be described below step by step.

Step 99a: The resolution, the number of pixels and the number of divided images are set, respectively.

Step 99b: It is determined whether or not the shaking motion correction priority switch is turned ON.

If the shaking motion correction priority switch is not turned ON (No: resolution priority mode), then the process proceeds to step 80C (see FIG. 19 described later), for example. If the shaking motion correction priority switch is turned ON (Yes: shaking motion correction priority mode), then the process proceeds to step 99c.

Step 99c: It is determined whether or not a brightness in the place where a picture is to be taken is smaller than a predetermined value defined in accordance with a resolution.

If the brightness is smaller than the predetermined value (Yes), then the process proceeds to step 99f. If the brightness is greater than or equal to the predetermined value (No), then the process proceeds to step 99d.

Step 99d: It is determined whether or not a shutter opening time (exposure time) S is greater than a predetermined value defined in accordance with the resolution.

If the shutter opening time S is greater than the predetermined value (Yes), then the process proceeds to step 99f. If the shutter opening time S is smaller than or equal to the predetermined value (No), then the process proceeds to step 99e.

Step 99e: It is determined whether or not the amount of shaking motion is larger than a predetermined value.

If the amount of shaking motion is larger than the predetermined value (Yes), then the process proceeds to step 99f. If the amount of shaking motion is smaller than or equal to the predetermined value (No), then an normal process for taking a picture (a process for taking a picture without adding pixels in the time axis direction) is performed (step 99m).

Step 99f: A resolution (a threshold resolution) $N_1$ at which the shaking motion is not conspicuous is set in accordance with at least one of the brightness in the place where a picture is to be taken, the shutter opening time (exposure time) and the frame rate.

After the resolution is set, the process proceeds to step 99g.

Step 99g: It is determined whether or not the resolution $N_1$ is greater than an initial resolution $N_0$.

If the resolution $N_1$ is greater than the initial resolution No (Yes), then a normal process for taking a picture (a process for taking a picture without adding pixels in the time axis direction) is performed (step 99m). If the resolution $N_1$ is smaller than or equal to the initial resolution $N_0$, then the process proceeds to step 99h.

Step 99h: The resolution $N_1$ is changed to a resolution $N_2$ which is smaller than the initial resolution $N_0$.

Step 99i: The resolution is set to be $N_2$ by performing at least one of adding pixels in a horizontal direction (a horizontal addition process) and adding pixels in a vertical direction (a vertical addition process). The details of the horizontal addition process and the vertical addition process will be described later.

Step 99j: The frame rate is increased.

Step 99k: Multiple exposure is performed in an overlapped manner (time axis direction, a pixel addition mode). Next, the process proceeds to step 51y (see FIG. 9), for example.

9. Change of Resolution

Figure 14:
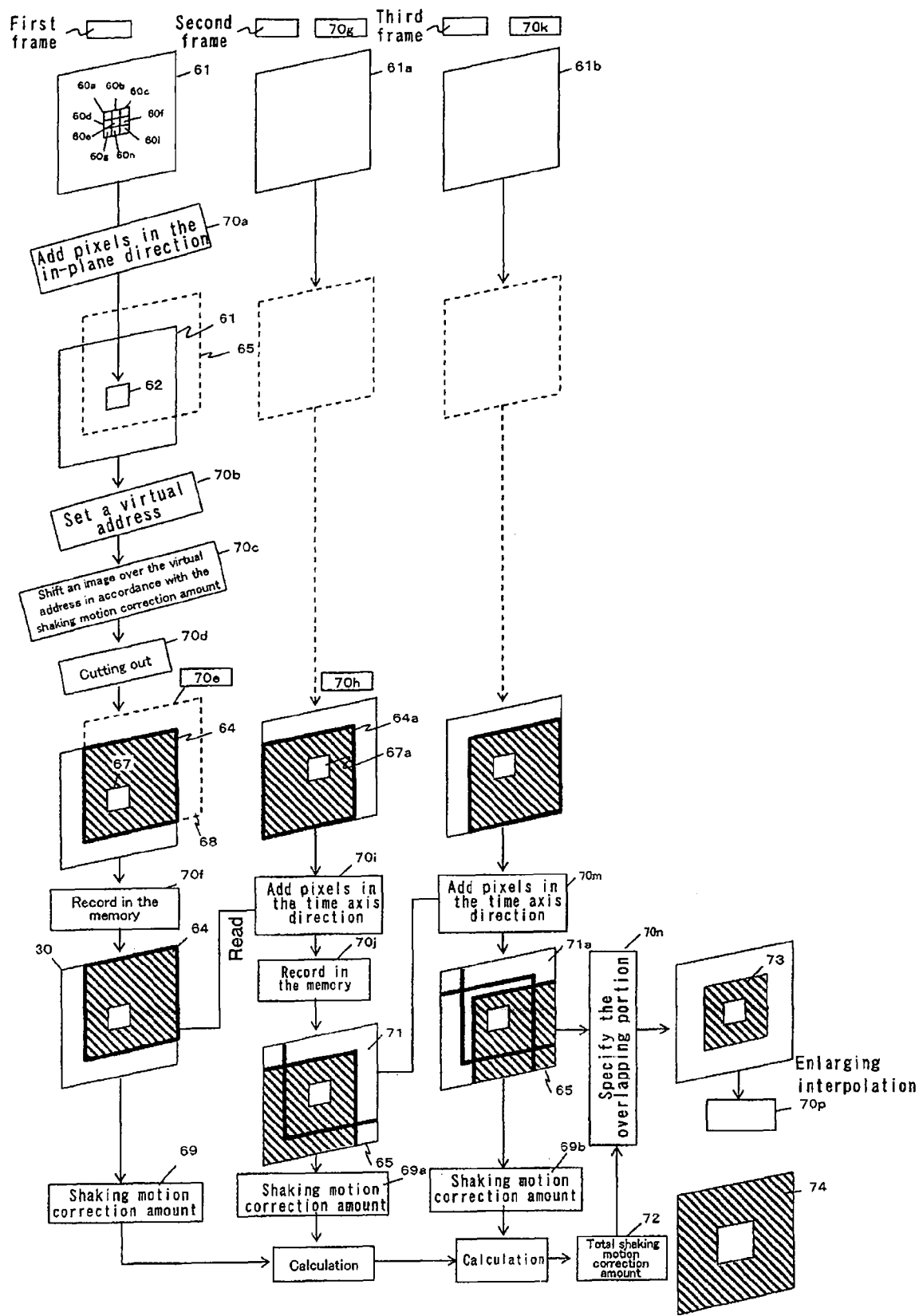
FIG. 14 is a flowchart showing a procedure of a process for changing a resolution by adding pixels in an in-plane direction and adding pixels in the time axis direction.

FIG. 14 shows a procedure of a process for changing a resolution by adding pixels in the in-plane direction and adding pixels in the time axis direction.

With reference to FIG. 14, the procedure of the process for changing a resolution by adding pixels in the in-plane direction and adding pixels in the time axis direction will be described below step by step.

Step 70a: The data indicating nine pixels (pixels 60a to 60l) within the image pickup element are added in the in-plane direction so as to generate data indicating one pixel 62.

Step 70b: Virtual addresses are set such that the number of the virtual addresses is greater than the number of actual addresses (virtual addresses axe set by increasing the amount of the actual addresses). A virtual cutout part 65 is set in accordance with information for correcting the shaking motion (shaking motion information).

Step 70c: The data indicating image 61 is shifted over the virtual addresses in accordance with the information for correcting the shaking motion. In this case, data indicating a new pixel 66 is generated based on data indicating the original pixel 62 and data indicating surrounding pixels.

Figure 15:
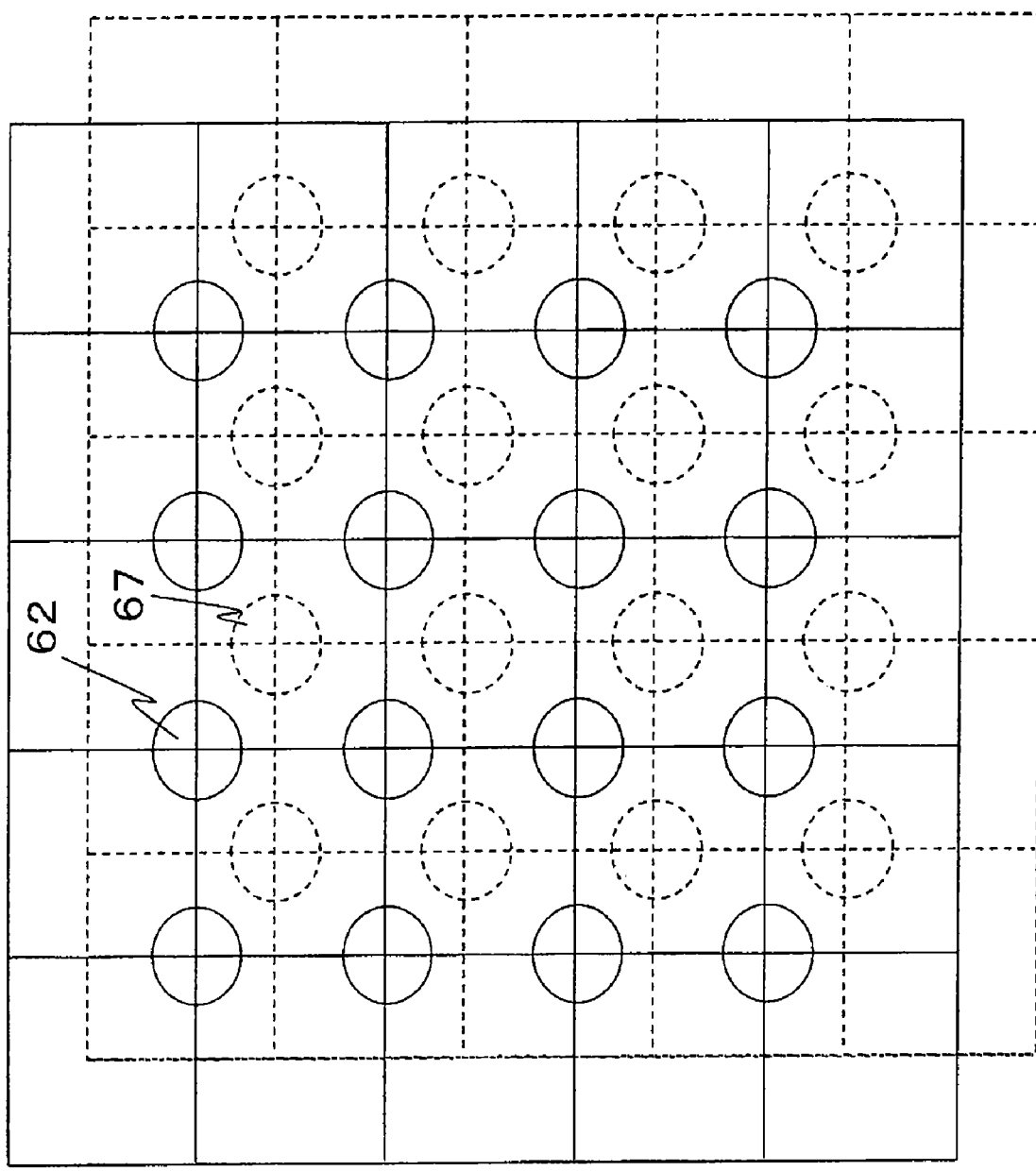
FIG. 15 is a view showing a principle for correcting the shaking motion, by setting the number of pixels which is larger than the number of actual pixels according to an embodiment of the present invention.

FIG. 15 shows a principle for correcting the shaking motion by setting the number of pixels which is larger than the number of actual pixels according to an embodiment of the present invention. The amount of shaking motion correction has a resolution of 1/10 of the pixel. In order to precisely perform the correction, virtual pixels 67 are generated by dividing the pixel 62 into 10 parts and the virtual pixels 67 are shifted.

After the virtual pixels 67 are shifted over a virtual space, the process proceeds to step 70d.

Step 70d: An image is cut out.

Step 70e: The data indicating a cutout image 64 is obtained. The data indicating a protruded part 68 is discarded.

Step 70f: The data indicating the cutout image 64 is stored in the main image memory 30. The amount of the correction of the shaking motion is stored in the main image memory 30.

Step 70g: When data indicating a new image 61a is input, the same process of steps 70a to 70d is performed.

Step 70h: The data indicating the cutout image 64a is obtained based on the amount of the correction of the shaking motion.

Step 70i: The data indicating a synthetic image 71 is obtained by adding (or integrating) data indicating pixels of the cutout image 64 and data indicating pixels of the cutout image 64a in the time axis direction.

Step 70j: The data indicating the synthetic image 71 is stored in the main image memory 30.

Step 70k: When data indicating a new image 61b is input, the same process of steps 70a to 70e is performed. Data indicating a cutout image 64b is obtained.

Step 70m: The data indicating a synthetic image 71a is obtained by adding data indicating pixels of the synthetic image 71 and data indicating pixels of the cutout image 64b in the time axis direction.

Step 70n: A shaking motion correction amount 72 is generated by calculating a first shaking motion correction amount 69, a second shaking motion correction amount 69a and a third shaking motion correction amount 69b. An overlapping region 73 in which three images are added in an overlapped manner is specified from the synthetic image 71a based on the shaking motion correction amount 72.

Step 70p: An enlarging interpolation is performed by performing a zooming calculation on the data indicating the overlapping region 73. As a result, data indicating an enlarged image 74 is obtained. The details of the enlarging interpolation and the reducing interpolation will be described later.

The data indicating the static image 74 subjected to the correction of the shaking motion is obtained and the process is completed.

In the embodiment described with reference to FIG. 14, three images are integrated. However, the number of the images to be integrated is not limited to be three. For example, the longer the exposure time is, the larger number of images are integrated. By integrating the larger number of images, it is possible to take a picture in a dark place.

FIG. 16 shows a method for adding pixels in the in-plane direction. The addition in the in-plane direction includes an addition in a vertical direction and an addition in a horizontal direction.

FIG. 16(a) shows a method for the addition in the vertical direction. When reading pixels in the vertical direction, a vertical addition process is performed on R (red) (m, n+1) and R (m, n) so as to generate R (m, n+1)+R (m, n).

FIG. 16(b) shows a method for the addition in the horizontal direction. Pixels for the same color are added to each other in the horizontal direction. For example, a horizontal addition process is performed on G (m, n+1)+G (m, n) and G (m+1, n+1)+G (m+1, n) so as to generate G (m, n+1)+G (m, n)+G (m+1, n+1)+G (m+1, n).

As described with reference to FIG. 16, it is possible to generate data indicating one pixel from data indicating four pixels by performing the addition in the in-plane direction.

As will be described below, it is possible to cut out an image more accurately by shifting the cutout position of the image in the process for adding pixels in the in-plane direction.

Figure 17:
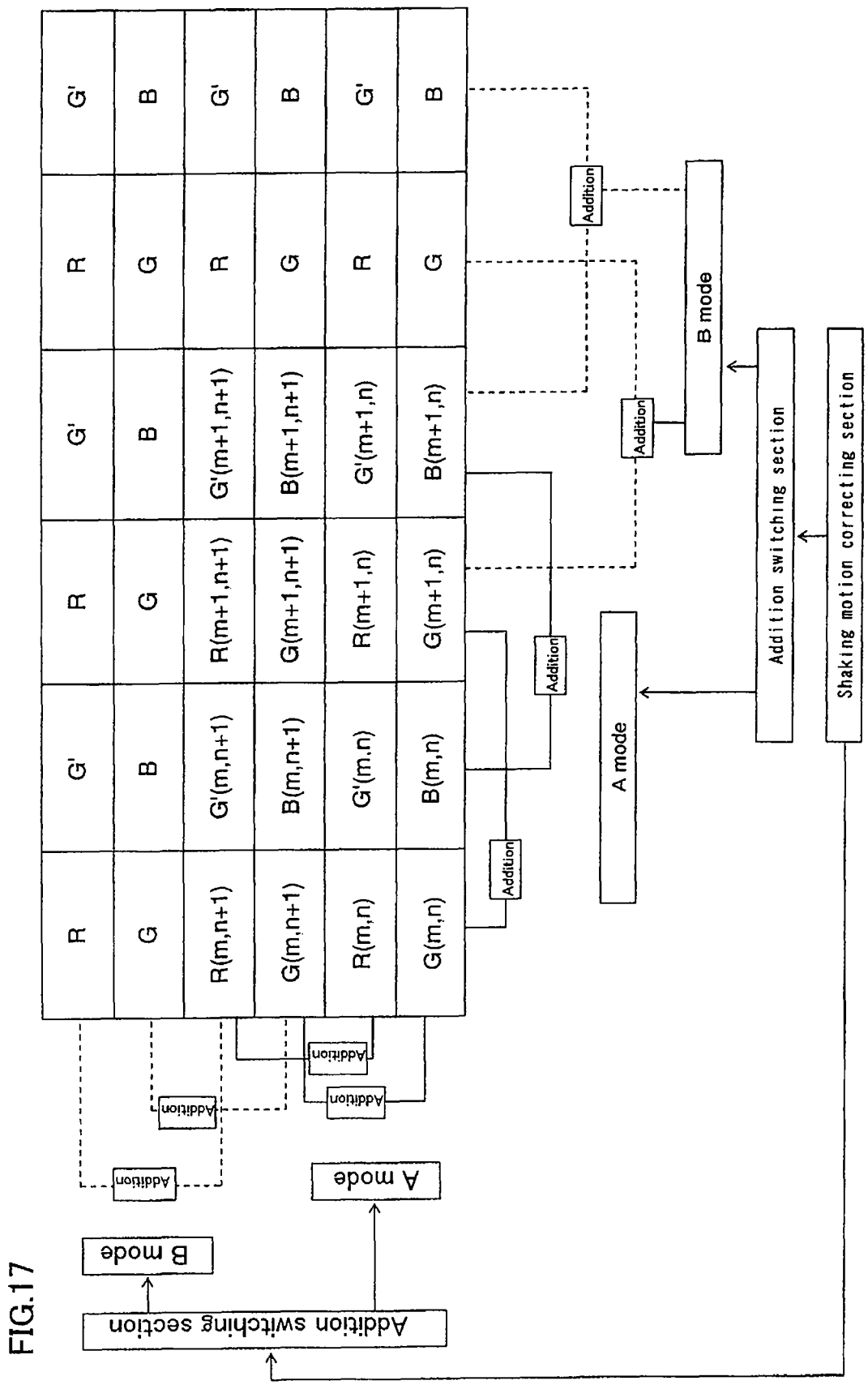
FIG. 17 is a diagram for explaining a shift of the cut-out position of an image.

FIG. 17 is a diagram for explaining a shift of the cutout position of an image.

The addition switching section 102a and the addition switching section 102b switch an addition mode between an A mode 103 and a B mode 104 in accordance with the correction signal or a detection signal (shaking motion information) output from the shaking motion detecting section 15 (see FIG. 1). Thus, in the process for adding pixels in the in-plane direction (see FIG. 16), it is possible to cut out an image more accurately by shifting the cutout position of the image by one pixel.

FIG. 18 shows a principle of a reducing interpolation, a principle of an enlarging interpolation and a principle of correcting the shaking motion with a high resolution. FIG. 18(a) shows the principle of the reducing interpolation. It is possible to obtain a plurality of (six) pixels as the result of the reducing interpolation from the original (eight) pixels. FIG. 18(b) shows the principle of the enlarging interpolation. It is possible to obtain a plurality of (eight) pixels as the result of the enlarging interpolation from the original (six) pixels. FIG. 18(c) shows the principle of correcting the shaking motion with a high resolution.

10. Removal of Image for which the Shaking Motion Fails to be Detected

Figure 19:
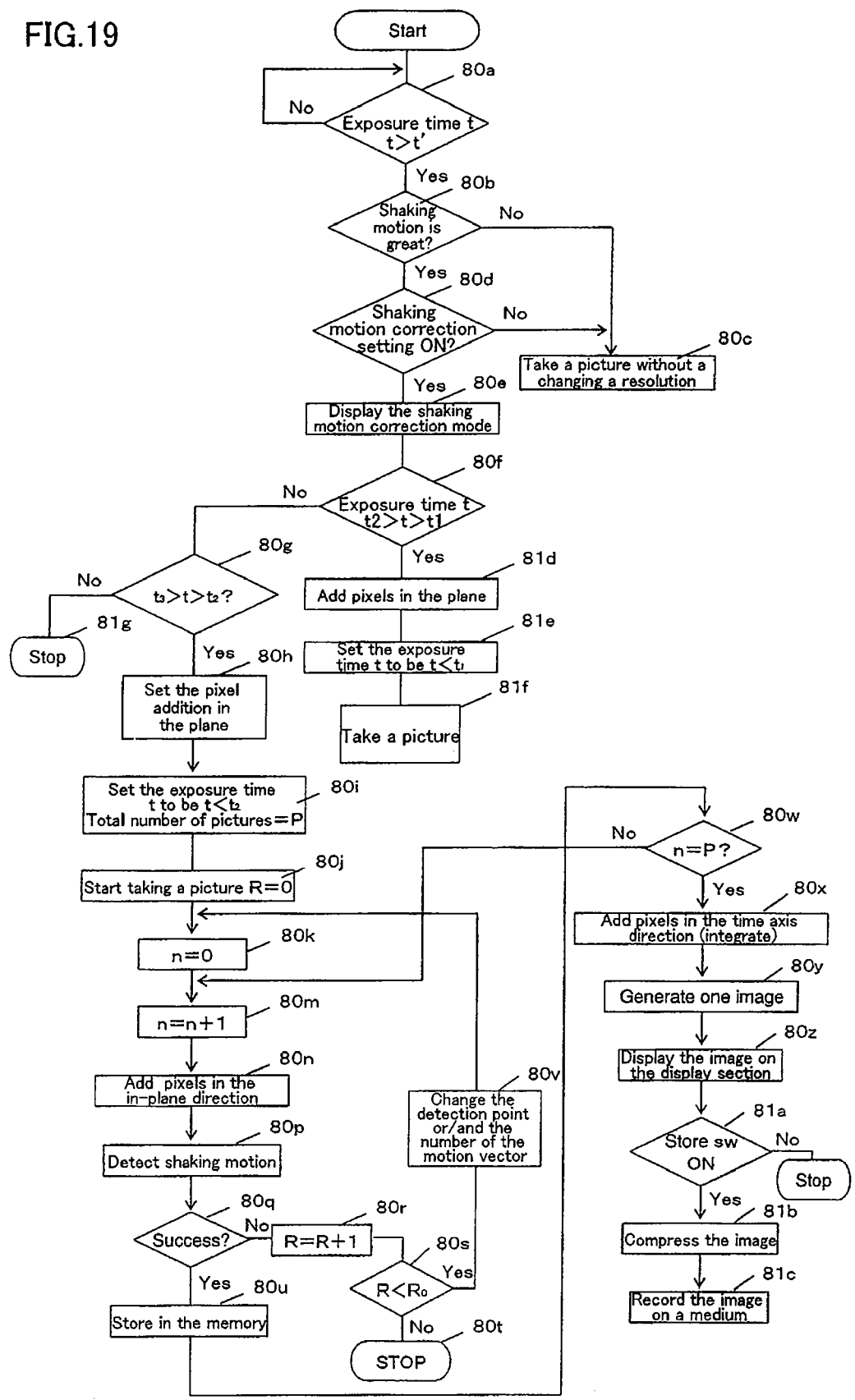
FIG. 19 is a flowchart showing a procedure of a process for removing an image for which the detection of the shaking motion fails.

FIG. 19 shows a procedure of a process for removing an image for which the detection of the shaking motion fails.

With reference to FIG. 19, the procedure for the process for removing an image for which the detection of the shaking motion fails will be described below step by step.

Step 80a: It is determined whether or not a shutter speed (exposure time) is longer than t'.

If the shutter speed (the exposure time) is longer than t' (Yes), then the process proceeds to step 80b.

Step 80b: It is determined whether or not the shaking motion occurs radically.

If the shaking motion does not occur radically (No), then the process proceeds to step 80c. If the shaking motion occurs radically (Yes), then the process proceeds to step 80d.

Step 80c: A picture is taken while the resolution is set to a resolution which is preset.

Step 80d: It is determined whether or not the correction of the shaking motion is performed with priority. If the setting for performing the correction of the shaking motion is turned ON (Yes), then the process proceeds to step 80e. If the setting for performing the correction of the shaking motion is not turned ON (No), then the process proceeds to step 80c.

Step 80e: A shaking motion correction mode is displayed.

Step 80f: It is determined whether or not the exposure time t is set to be $t_1 < t < t_2$.

If the exposure time t is set to be $t_1 < t < t_2$ (Yes), then the process proceeds to the step 81d. Then, the pixels are added in the in-plane direction (step 81*d*), the exposure time t is set to be t<$t_1$ (step 81*e*) and taking a picture is started (step 81*f*).

If the exposure time t is not set to be $t_1$<t<$t_2$ (No), then the process proceeds to the step 80*g* where it is determined whether or not the exposure time is set to be $t_2$<t<$t_3$. If the exposure time t is not set to be $t_2$<t<$t_3$ (No), then the process is stopped (step 81*g*). If the exposure time t is set to be $t_2$<t<$t_3$ (Yes), then the process proceeds to step 80*h*.

Step 80*h*: The setting for adding pixels in the in-plane direction is performed.

Step 80*i*: The exposure time t is set to be t<$t_2$ and the number of pixels P to be taken for the correction of the shaking motion is obtained.

Step 80*j*: Taking a picture is started. R is set to be 0 (R=0).

Step 80*k*: n is set to be 0 (n=0).

Step 80*m*: n is incremented by one (n=n+1).

Step 80*n*: The pixels in the n-th image are added in the in-plane direction.

Step 80*p*: The shaking motion is detected.

Step 80*q*: It is determined whether or not the shaking motion is successfully detected.

If the detection of the shaking motion fails (No), R=R+1 (Step 80*r*) and it is determined whether or not R<$R_0$ is satisfied (whether or not R is smaller than a set value $R_0$). If R<$R_0$ is not satisfied (No), then the process is stopped (step 80*t*). If R<$R_0$ is satisfied (Yes), then at least one of a detection point of a motion vector and the number of motion vector detections is changed (step 80*v*) and the process proceeds to step 80*k* in order to perform correction process again from the beginning.

If the detection of the shaking motion is successful (Yes), then the process proceeds to step 80*u*.

Step 80*u*: The corrected image is stored in the main image memory 30.

Step 80*w*: It is determined whether or not n is equal to P (whether or not n=P is satisfied).

If n=P is not satisfied (No), then the process proceeds to step 80*m*. If n=P is satisfied (Yes), then it is determined that a process for all images (all divided images) taken for correcting the shaking motion is completed. Then, the process proceeds to step 80*x*.

Step 80*x*: The corrected images stored in the main image memory 30 are added or integrated in the time axis direction.

Step 80*y*: Data indicating one image is generated.

Step 80*z*: A process such as a decimation process is performed on the generated data indicating one image, and the result is displayed on the display section 12.

Step 81*a*: An operator determines whether or not an image storage switch is turned ON.

Step 81*b*: A compression process (e.g. JPEG and the like) is performed on the image data indicating an image so as to reduce the amount of the image data.

Step 81*c*: The image data is recorded on the recording medium 14 (e.g. an IC card).

As described above with reference to FIG. 19, according to the embodiment of the present invention, it is possible to prevent the addition (integration) of the corrected image data for which the detection of the shaking motion fails. For example, in the case where it is difficult to detect the failure such as a failure to detect the addition (integration) of pixels in the time axis direction, it is possible to obtain an image subjected to the correction of the shaking motion. Further, it is possible to start the integration in the time axis direction from a next image to the image for which the detection of the shaking motion fails. Therefore, the use of time is more efficient.

11. Display of Shaking Motion Correction Amount

Figure 20:
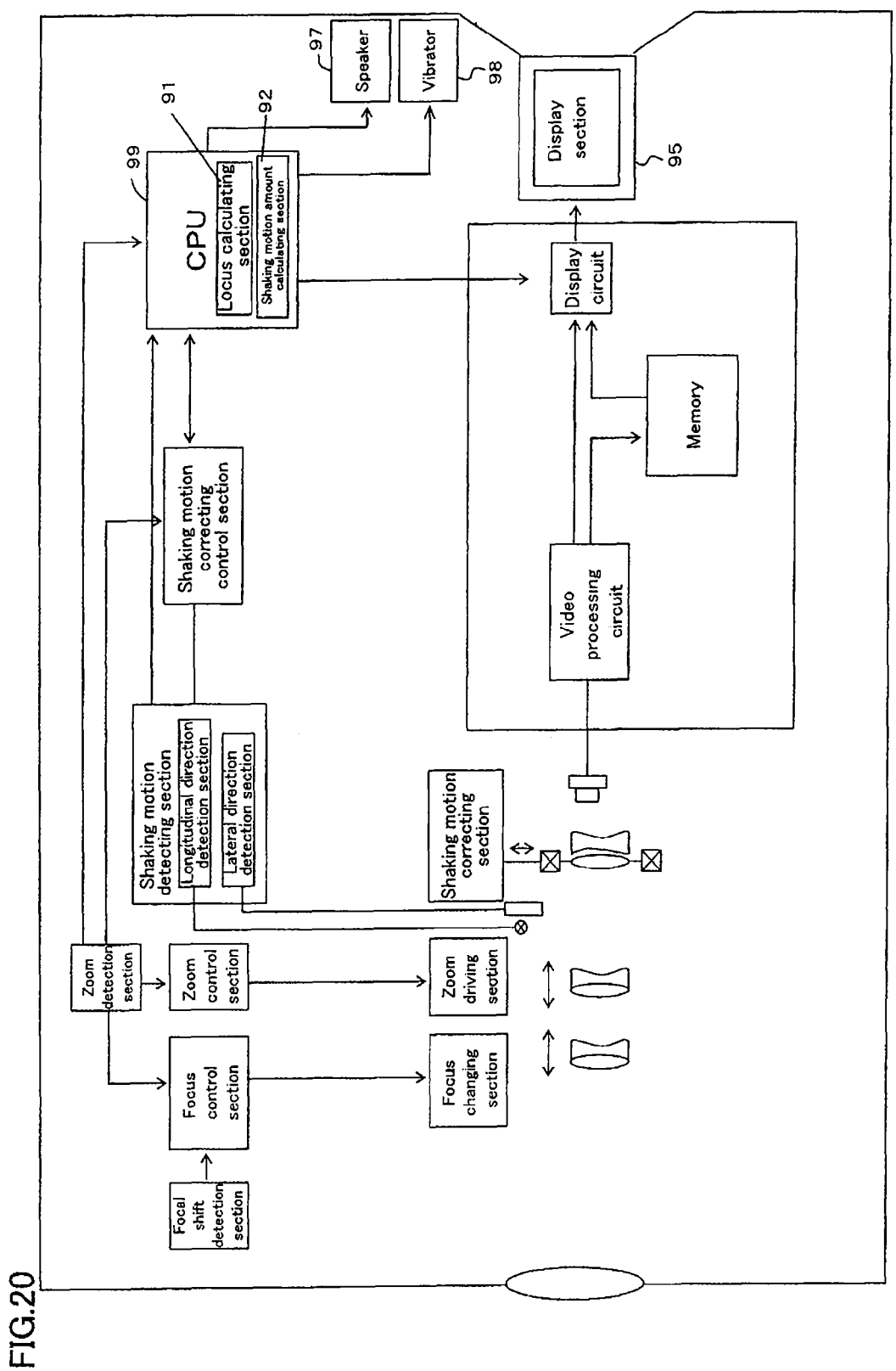
FIG. 20 is a diagram showing a structure of an image pickup apparatus 200 according to an embodiment of the present invention.

FIG. 20 shows a structure of an image pickup apparatus 200 according to an embodiment of the present invention.

The image pickup apparatus 200 can display an amount of the correction of the shaking motion in a similar manner as the image pickup apparatus 100. The image pickup apparatus 200 includes a shaking motion amount calculating section 92, a locus calculating section 91, a display section 95, a speaker 97, a vibrator 98, a CPU 99, an oscillating gyro 101*a*, and an oscillating gyro 101*b*.

The shaking motion amount calculating section 92 (the shaking motion detecting section 15: see FIG. 1) calculates a shaking motion amount and outputs the shaking motion amount to the display section 95 via a display circuit. The locus calculating section 91 calculates a locus of the shaking motion which cannot be perfectly corrected by the shaking motion correction and outputs the locus to the display section 95 via the display circuit.

The CPU 99 determines whether or not the shaking motion amount is larger than a predetermined value. If the shaking motion amount is larger than the predetermined value, then it instructs at least one of the display section 95, the speaker 97 and the vibrator 98 to output the determination result.

The display section 95 displays the determination result in accordance with the instruction from the CPU 99. The speaker 97 generates a warning sound in accordance with the instruction from the CPU 99. The vibrator 98 vibrates in accordance with the instruction from the CPU 99.

Figure 21:
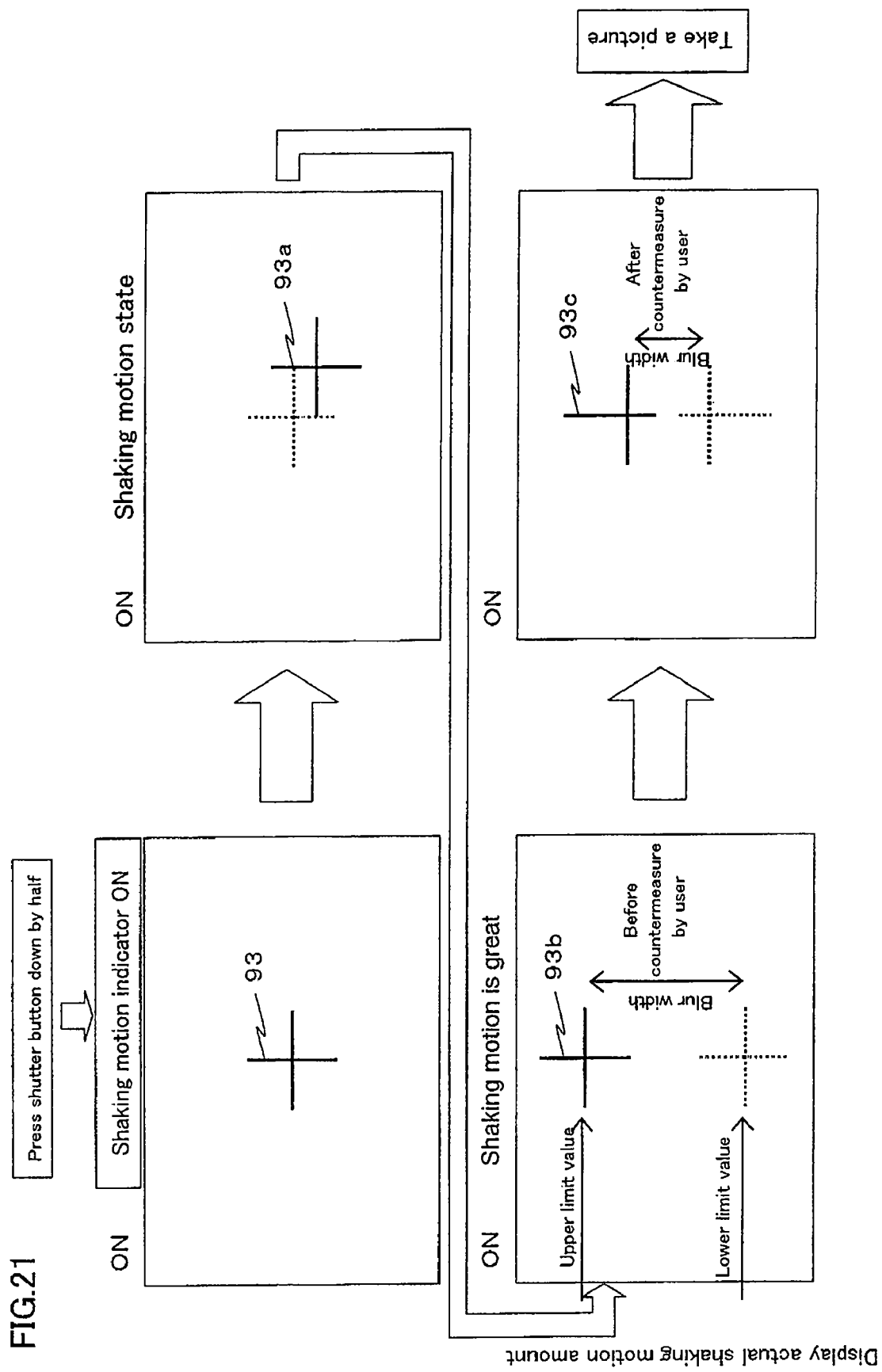
FIG. 21 is a diagram showing an example of the display section 95 included in the image pickup apparatus 200.

FIG. 21 shows an example of a display section 95 included in the image pickup apparatus 200.

In the display section 95, the shaking motion amount is displayed by indicators 93, 93*a*, 93*b* and 93*c*. By visually observing the display, a person who takes a picture can recognize a shaking motion amount and a shaking motion direction. By recognizing the shaking motion amount and the shaking motion direction, the person can change a method for fixing a camera. As a result, it is possible to obtain a static image containing shaking motion less than usual by the human operation.

Figure 22:
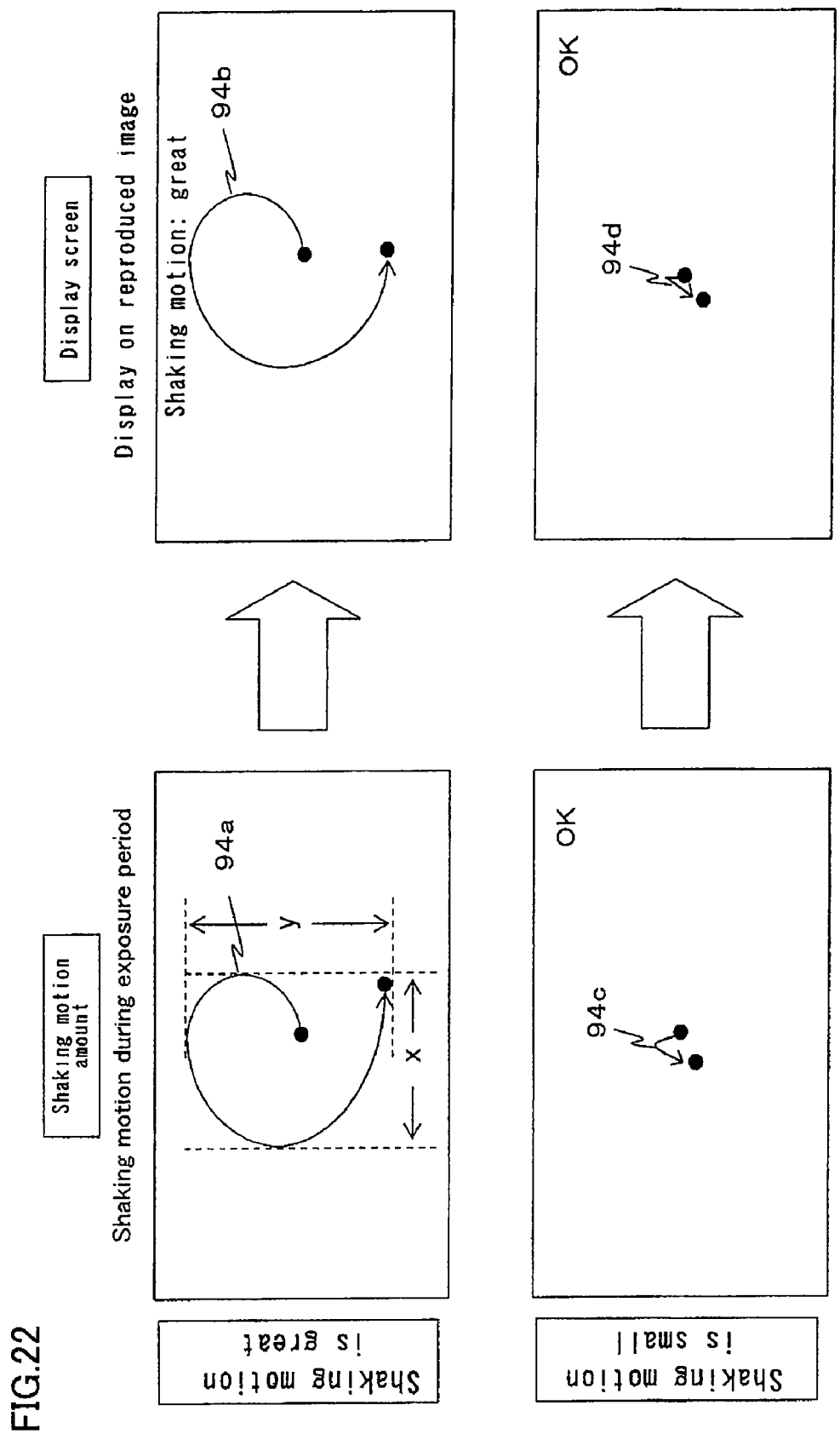
FIG. 22 is a diagram showing another example of the display section 95 included in the image pickup apparatus 200.

FIG. 22 shows another example of a display section 95 included in the image pickup apparatus 200.

In the display section 95, the locus of the shaking motion which cannot be perfectly corrected by the shaking motion correction is displayed, like a locus 94*b* and a locus 94*d*. By visually observing the display, a person who takes a picture can recognize the degree of a static image subjected to the shaking motion after taking a picture. The failure of the shaking motion correction can be confirmed by a small display section of the camera. Therefore, the person can check the failure of the shaking motion correction. In the case of a filming mode (e.g. panning or panoramic view), it is possible to check only the shaking motion in the longitudinal direction.

In the display section 95, if a shaking motion amount (x, y) is larger than a predetermined value ($x_0$, $y_0$) ((x>$x_0$ or y>$y_0$) or (x>$x_0$ and y>$y_0$)), then a warning may be displayed. Further, the speaker may output a warning sound. The predetermined value ($x_0$, $y_0$) is set, for example, in accordance with a zoom ratio.

Further, in the display section 95, if a shaking motion amount (x, y) is smaller than the predetermined value ($x_0$, $y_0$) ((x<$x_0$ or y<$y_0$) or (x<$x_0$ and y<$y_0$)), then a message (e.g. "OK") maybe displayed. Further, the speaker may output a sound. The predetermined value ($x_0$, $y_0$) is set, for example, in accordance with a zoom ratio.

FIG. 23 shows a display of a boundary indicator 97 for taking a picture in a panning manner or in a panoramic manner.

FIG. 23(a) shows a scene to be taken, which is divided into three frames.

FIG. 23(b) shows a frame 98a. FIG. 23(c) shows a frame 98b. FIG. 23(d) shows a frame 98c. FIG. 23(e) shows a frame 98d.

When the scene shown in FIG. 23(a) is to be taken in a panoramic manner in a rightward direction, the detection point 96a, among the detection points 96a, 96b and 96c (see FIG. 23(b)) which are representative points for detecting a motion vector for the shaking motion correction, is moved over the frames and reaches a left end of the frame 98b (see FIG. 23(c)). At this time, the shaking motion detecting section 15 for detecting a motion detects that a screen is shifted to the right by L1, and a boundary indicator 97a indicating a boundary of a right end of the frame in FIG. 23(b) is displayed at a position spaced apart from a right end of the frame by L1 (see FIG. 23(c)).

Similarly, the shaking motion detecting section 15 detects that the screen is shifted to the right by L2, and a boundary indicator 97b is displayed at a position spaced apart from the right end of the frame by L2 (see FIG. 23(d)).

Similarly, a boundary indicator 97c is displayed at the left end of the screen in FIG. 23(e). In this stage, the person who takes a picture can know that a current position reaches the next position where the next picture is to be taken. If necessary, it is possible to output a sound alert from the speaker 37 (see FIG. 1), thereby notifying the person of the sound alert. At this time, the person can take a picture of panoramic form almost perfectly by pressing down the shutter button.

The method has been described for setting a plurality of detection points over the screen and determining the movement of the person who takes a picture as a motion in the frame from the motion vector of the detection points.

In this method, the detection of a panning is performed by the shaking motion detecting section for correcting the shaking motion. However, as shown in FIG. 20, in the image pickup apparatus for detecting the shaking motion by using the oscillating gyro 101a and the oscillating gyro 101b, it is also possible to detect a panning rotation angle of the person by the oscillating gyros and to obtain a rotation angle $\theta_0$ required for the panning in a transverse direction for one frame in accordance with the zoom ratio of the zoom detecting section.

In the state shown in FIG. 23(b), the boundary indicator 97 is displayed at the right end. In this state, the person takes a picture for the first frame in the panoramic picture. Next, when the person performs the panning (i.e. rotation) of the camera by the rotation angle $\theta_0$ in the rightward direction, the person can know that a current position of the camera reaches a position where the person can take a picture for the second frame in the panoramic picture.

When the rotation angle reaches the rotation angle $\theta_0$, the boundary indicator 97c is displayed at the left end (see FIG. 23(e)). At this time, the person is notified that the rotation angle reaches the rotation angle $\theta_0$ via the speaker or the display. As a result of the person pressing the shutter button at this time, it is possible to obtain a panoramic picture which is accurate in the transverse direction.

By displaying, on the display section 12, boundary indicators 99a and 99b in the vertical direction in addition to the transverse direction, it is possible for the person to easily obtain a panoramic picture which is accurate in both of the directions (see FIG. 23(b)). In this case, by displaying an accurate panning direction using an arrow on the display screen, the person can easily take pictures in a panoramic manner by only directing the camera in the direction indicated by the arrow. In general, since the person holds the camera with their hand when taking a picture, the person cannot accurately determine the direction in which the picture is to be taken. However, by automatically adjusting the left, right, upper and lower ends of the screen using the shaking motion correcting function of the camera, it is possible to take pictures in a panoramic manner very accurately.

Even if the left, right, upper and lower ends of the screen are automatically adjusted using the shaking motion correcting function of the camera, an error occurs between a panoramic scene which has actually been captured and the most ideal panoramic scene which can be captured. By additionally recording the error in the attribute data (Exif and the like) indicating the attribute of the state in which the picture is taken, it is possible to align the left, right, upper and lower ends of the screen more accurately when synthesizing a plurality of images into a single panoramic image. This is because the error can be modified based on the error information.

The function described above can be also realized in a similar manner when the shaking motion detecting method is an electronic detecting method.

Figure 24:
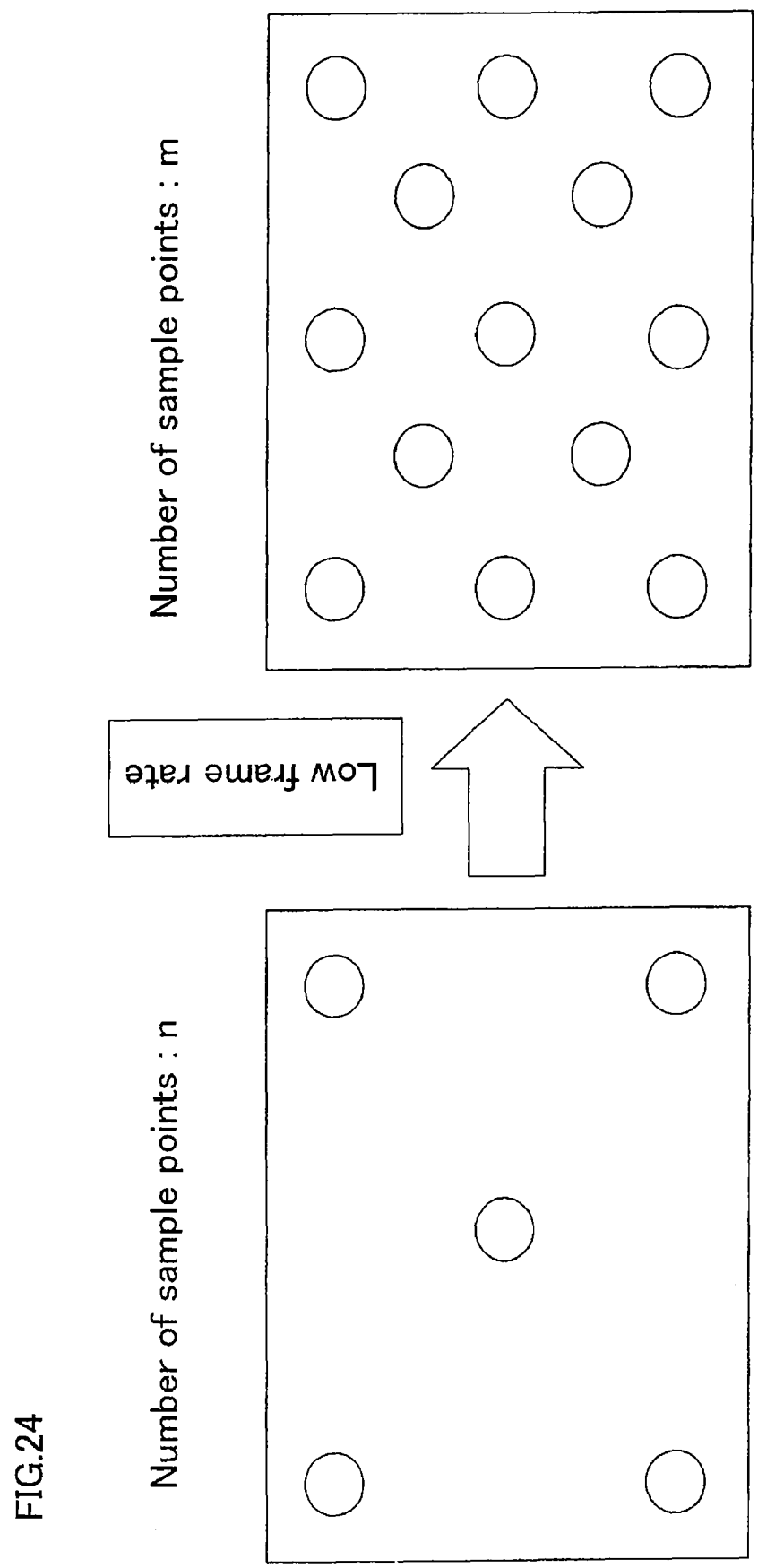
FIG. 24 is a diagram showing a detection point for detecting the shaking motion within a frame.

FIG. 24 shows a detection point for detecting the shaking motion within a frame. When the detection of the shaking motion fails frequently or the frame rate is low, it is possible to increase a success rate of the detection of the shaking motion by changing the respective positions of the detection points 96 within the frame 98 or by increasing the number of the detection points 96 within the frame 98.

Thus, according to the image pickup apparatus of the present invention, a person who takes a picture can recognize the extent of the shaking motion. By recognizing the degree of the shaking motion, the person can change a method for fixing a camera. As a result, it is possible to obtain a static image having shaking motion which is less than that which would be usually observed by a human operation.

As described above, in the chapter titled (11. Display of shaking motion amount), the exemplary embodiment of the present invention has been described with reference to FIG. 1 and FIGS. 20 to 23.

For example, in the embodiment shown in FIG. 1 and FIGS. 20 to 23, the shaking motion detecting section 15 (the shaking motion amount calculating section 92) corresponds to "the shaking motion amount detecting section for detecting an amount of shaking motion between a plurality of frames representing a static image taken", the CPU 99 corresponds to "the determining section for determining whether or not the amount of the shaking motion is larger than a predetermined value", and the display section 95, the speaker 97 and the vibrator 98 correspond to "the output section for outputting a result of the determination".

However, the image pickup apparatus of the present invention is not limited to the embodiment shown in FIG. 1 and FIGS. 20 to 23. Each of the components included in the image pickup apparatus can have an arbitral configuration as long as the image pickup apparatus has each of the functions of "the shaking motion amount detecting section for detecting an amount of shaking motion between a plurality of frames representing a static image taken", "the determining section for determining whether or not the amount of the shaking motion is larger than a predetermined value", and "the output section for outputting a result of the determination".

12. The Operations of the Locus Calculating Section

The operations of the locus calculating section 91 according to the present invention will be described in detail with reference to FIG. 25.

The shaking motions of the image pickup apparatus (camera) 1 caused by hand movements are detected by, for example, the angle velocity detecting sections 101a and 101b. The angle velocity detecting sections 101a and 101b output shaking motion detection signals indicating the shaking motions of the image pickup apparatus 1.

The angle velocity detecting sections 101a and 101b may be, for example, angle velocity sensors. The angle velocity sensors may be, for example, shaking motion gyroscopes respectively having a plurality of vibration frequencies which are different from each other.

The shaking motion detection signals output from the angle velocity detecting sections 101a and 101b are sampled by the sampling circuit 102 at a sample frequency $f_s$ generated by the sample frequency generation section 104. As a result, the analog data indicating the angle velocity is converted into digital data.

Thus, the angle velocity detecting sections 101a and 101b function as a shaking motion detecting section for detecting the shaking motion of the image pickup apparatus 1 and for outputting a shaking motion detection signal indicating the shaking motion of the image pickup apparatus 1. It should be noted, however, that the angle velocity detecting sections 101a and 101b are merely an example of the shaking motion detecting section. The shaking motion detecting section may have any configuration as long as it has functions for detecting the shaking motion of the image pickup apparatus 1 and for outputting a shaking motion detection signal indicating the shaking motion of the image pickup apparatus 1.

The locus calculating section 91 obtains locus information indicating the locus of the shaking motion of the image pickup apparatus 1, based on at least the shaking motion detection signal output by the shaking motion detecting section (e.g., the angle velocity detecting sections 101a and 101b). For example, the locus calculating section 91 may obtain, as the locus information, information indicating a change in the shaking motion detection signal during a predetermined period of time. For example, in the case where the shaking motion detecting section includes an angle velocity sensor, the locus calculating section 91 may obtain angle information by integrating the output from the angle velocity sensor and may obtain, as the locus information, information indicating a change in the angle information during a predetermined period of time.

The shaking motion correction section 115 functions as an electronic shaking motion correcting section for performing a calculation processing on the image information which is output from the image pickup section 5 and is stored in the image memory 120 and the locus information, so as to obtain corrected image information which is subjected to the correction of the shaking motion.

Instead of the electronic shaking motion correcting section, it is possible to provide a mechanical shaking motion correcting section for mechanically correcting the shaking motion of the image pickup apparatus 1 in accordance with the shaking motion detection signal output from the shaking motion detecting section (e.g., the angle velocity detecting sections 101a and 101b), so as to obtain corrected image information which is subjected to the correction of the shaking motion by an actual shaking motion correction amount. In this case, the locus calculating section 91 obtains, as the locus information, information indicating the change during a predetermined period of time in the difference between the shaking motion detection signal and the actual shaking motion correction amount, for example.

Alternatively, it is possible to provide an electronic shaking motion correcting section which obtains second corrected image information which is subjected to the correction of the shaking motion in the first corrected image information by a second shaking motion correction amount, in addition to the mechanical shaking motion correcting section which obtains first corrected image information which is subjected to the correction of the shaking motion in the image information by a first shaking motion correction amount. In this case, the locus calculating section 91 obtains, as the locus information, information indicating the change in the remaining shaking motion amount during a predetermined period of time, the remaining shaking motion amount indicating the difference between the actual shaking motion correction amount and the first shaking motion correction amount, for example.

It is possible to integrate, on a single semiconductor chip, a partial configuration or the entire configuration of the image pickup apparatus 1 shown in FIG. 25 and FIG. 30 through FIG. 33. For example, it is also possible to integrate, on a single semiconductor chip (a semiconductor integrated circuits, at least one of the locus calculating section 91, the shaking motion correction section 115 (the electronic shaking motion correcting section), and the shaking motion correction control section 141 (the mechanical shaking motion correcting section).

12.1 Optimal Sampling and Compression

Figure 26:
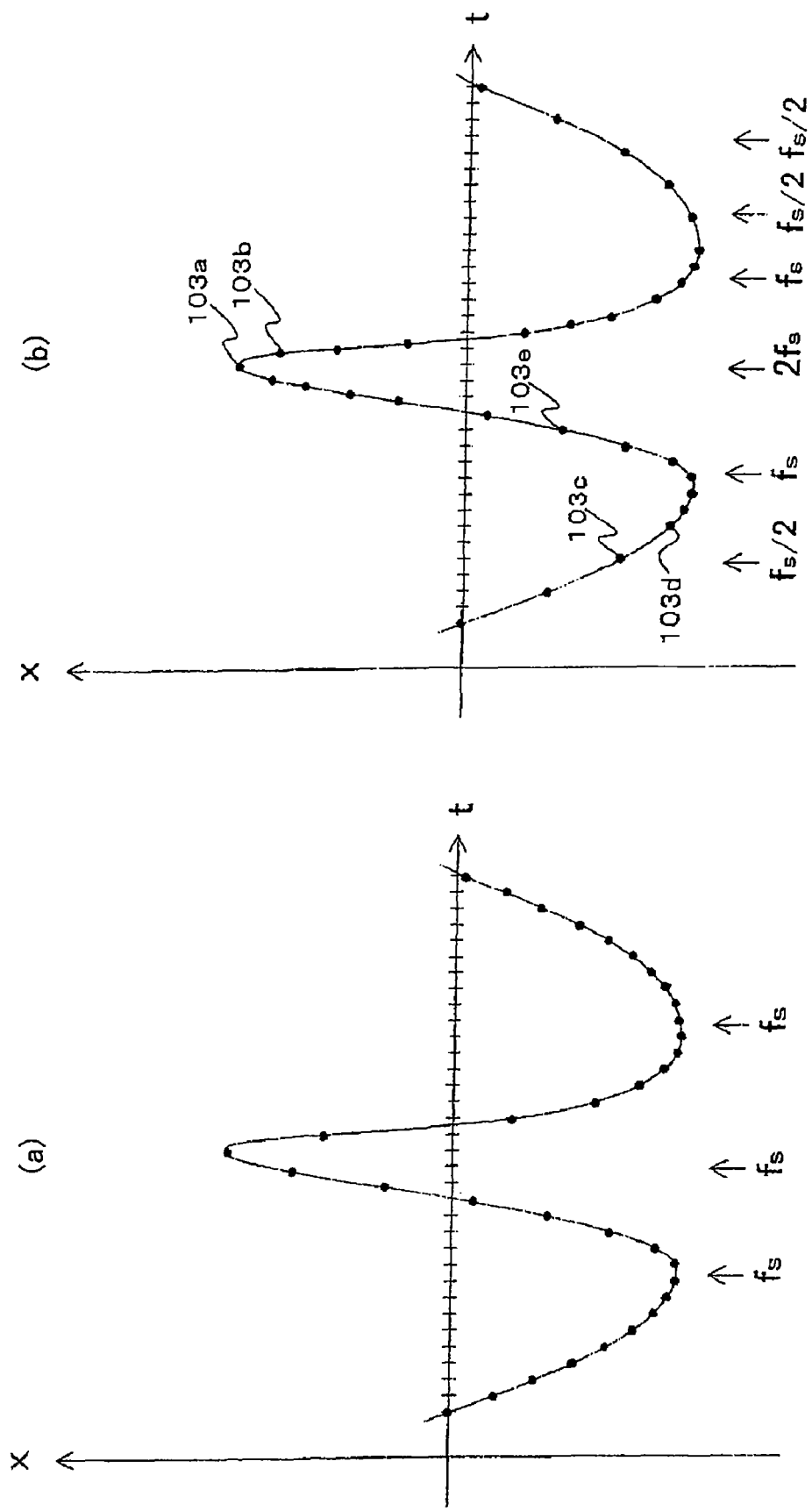
FIG. 26 is a diagram showing sampling of shaking motion detection signals according to an embodiment of the present invention.

FIG. 26(a) shows a case where all samples are obtained at a normal uniform time interval (i.e., a predetermined sample frequency $f_s$). When the zoom ratio of the zoom section 6 is large or during a period in which the shaking motion of the camera is large, in other words, during a period in which the temporal change amount in the output values of the angle velocity detecting sections 101a and 101b is large, a sampling process is performed more finely at a double frequency of the sample frequency, namely at $2f_s$, as shown with the points 103a and 103b in FIG. 26(b). Conversely, during a period in which the temporal change amount is small, a sampling process is performed more roughly at a half frequency of the sample frequency, namely at $f_s/2$, as shown with the points 103c and 103d. In a normal period, a sampling process is performed in a standard fashion, at the frequency $f_s$, as shown with the point 103e.

As shown in FIG. 26(b), the sample frequency generated by the sample frequency generation section 104 is changed in accordance with the zoom ratio, the angle velocity amount, or how large the amount of change in the angle velocity is. With this arrangement, it is possible to perform the optimal sampling. As a result, it is possible to obtain the locus data required for the shaking motion correction of the locus, without increasing the amount of information. In the case where the locus data 113 is recorded onto an external storage medium 105, it is possible to make the volume of the stored data smallest. In addition, there is no need to increase the sample frequency for the entire period, thereby reducing the power consumption.

As another method, it is possible to set the sample frequency at a highest speed, and to perform a digital conversion by sampling the shaking motion detection amount, wherein the number of samples may be increased or decreased in accordance with the amount of changes in the shaking motion, by way of an internal processing of the locus calculating section 91. With this method, it is also possible to compress the locus data.

12.2 Addition of Image Pickup Information

The data compression section 105 compresses the locus data output from the locus calculating section 91. The method of compression is the same as the method of compression described above. The image pickup information addition section 106 adds data indicating a file format of the image pickup information, such as Exif data 107, to the locus data compressed by the data compression section 105. The output data generation section 110 generates output data by adding the data output from the image pickup information addition section 106 to the image P, which is subjected to the correction of the shaking motion, output from the corrected image output section 108 or the image data P', which is not subjected to the correction of the shaking motion, directly output from the switching section 109.

The shaking motion amount measurement section 111 measures the shaking motion amount and generates a control signal for switching the switching section 109 in accordance with the measured shaking motion amount. The locus calculating section 91 includes a processing amount calculating section 116 for calculating a processing amount in the shaking motion correction section 115 and for generating a control signal for switching the switching section 109 in accordance with the calculated processing amount.

The switching section 109 switches between out-putting the image data from the image pickup section 5 to the shaking motion correction section 115 and outputting the image data from the image pickup section 5 to the output data generation section 110, in accordance with at least one of the control signal from the shaking motion amount measurement section 111 and the control signal from the processing amount calculating section 116.

In the case where the shaking motion amount measured by the shaking motion amount measurement section 111 is larger than a predetermined amount, the shaking motion amount measurement section 111 switches the switching section 109 such that the image data from the image pickup section 5 is directly output to the output data generation section 110, by bypassing the shaking motion correction section 115. For example, in the case where the processing amount in the shaking motion correction section 115 which has been calculated by the processing amount calculating section 116 is larger than a predetermined processing amount (i.e., in the case where the processing amount in the shaking motion correction section 115 exceeds the processing capability of the shaking motion correction section 115), the processing amount calculating section 116 switches the switching section 109 such that the image data from the image pickup section 5 is directly output to the output data generation section 110, by bypassing the shaking motion correction section 115. In this case, the output data generation section 110 generates the output data by adding the data output from the image pickup information addition section 106 (e.g. Exif data 107 including the locus data 113 for the shaking motion such as a Point Spread Function (PSF) or the like) to the image P', which is not subjected to the correction of the shaking motion, output from the switching section 109.

In the case where the image data from the image pickup section 5 is output to the shaking motion correction section 115, the output data generation section 110 generates the output data by adding the data output from the image pickup information addition section 106 (e.g. Exif data 107 including the shaking motion locus data 113 such as a Point Spread Function (PSF) or the like) to the image P, which is subjected to the correction of the shaking motion, output from the corrected image output section 108.

The output data is recorded onto the external storage medium 114 by the output data output section. The recorded image data and the locus data 113 for the shaking motion can be processed in a personal computer which is provided on the outside of the camera 1 and which has a higher processing capability. As a result, it is possible to perform the post-processing of the shaking motion correction process even if the image data has a large amount of shaking motion and the amount of correction processing is large.

The operations of the image pickup apparatus (camera) 1 will be described with reference to FIG. 25.

The light incident to the camera 1 goes through the lens section 2, the zoom section 2a, and the focus section 2b, so as to form an image on the image pickup section 5. When the shutter button 119 is pressed, the shutter 117 is temporarily closed by the shutter-open period control section 118 and is then opened again when the image pickup process is started. When the exposure is completed, the shutter 117 is closed again. When the image pickup data is obtained, the shutter is opened again. The image pickup data is temporarily stored into the image memory 120. The switching section 109 performs the switching as described above.

It is assumed that the limit processing capability of the camera is expressed as $h_1$, whereas the limit processing capability of the data processing method is expressed as $h_2$. In the case where the shaking motion amount h satisfies $h_1 < h < h_2$, the shaking motion correction section 115 included in the camera cannot process the data. Thus, the data is directly sent to the output data generation section 110. In the case where $h_2 < h$ is satisfied, it is not possible to correct the shaking motion even if a high-speed CPU is used. Thus, the image data is sent to the output data generation section 110, and an alarm sound or an alarm display indicating "take an image once again" is sent from the alarm section 145 to the speaker 37 or to the display section 12. Thus, it is possible to reduce failures due to shaking motion, by the operator taking an image once again.

A correctable amount of shaking motion is denoted by $h_1$. In the case where $h_1 < h$ is satisfied, it is possible to perform the correcting process within the camera. Accordingly, the image data is sent to the shaking motion correction section 115. In the shaking motion correction section 115, the image P, which is subjected to the correction of the shaking motion, is obtained as a result of a Fourier inverse transform performed by the Fourier inverse transform section 121, using the weighted locus data 113 for shaking motion and the image P' in which the shaking motion are present.

The maximum shaking motion amount calculating section 122 calculates the maximum shaking motion amounts $x_1$ and $x_2$ in the x-direction, and the maximum shaking motion amounts $y_1$ and Y2 in the y-direction, based on the pickup images 112, 112a, and 112b (see FIG. 27(b)).

The trimming section 123 generates a trimmed image 129 by trimming the perimeter part of the pickup image 112 by the size of $x_1$, $x_2$, $y_1$, and $y_2$, based on the maximum shaking motion amounts $x_1$ and $x_2$ in the x-direction, and the maximum shaking motion amounts $y_1$ and $y_2$ in the y-direction (see FIG. 27(c)). The number of pixels in the trimmed image 129 is smaller than the number of pixels in the pickup image 112.

The enlarging section 122 performs an enlarging processing so as to enlarge the image up to a predetermined number of pixels (FIG. 27(d)).

The center 126a in the original image 112 shown in FIG. 27(a) does not coincide with the center 126 in the trimmed image 129 shown in FIG. 27(c). In the example shown in FIG. 27(c), the center is shifted by $(x_3, y_3)$. In the case where the operator has set the switch to select the center 126a in the original image 112, the trimmed image 129 is converted into the trimmed image 129a (FIG. 27(e)) such that the center 126a in the original image 112 shown in FIG. 27(a) coincides with the center 126a in the trimmed image 129a shown in FIG. 27 (e). The trimmed image 129a shown in FIG. 27 (e) is enlarged so as to become an output image 147 shown in FIG. 27(d). As a result, a corrected image having the center 126b which coincides with the center 126a in the original image 112 is obtained.

The image subjected to the correction of the shaking motion in this way is sent to the output data generation section 110 via the corrected image output section 108. It is also sent to the switching section 124.

The switching section 124 switches between out-putting the image P', which is not subjected to the correction of the shaking motion to the reducing section 125, and outputting the image P, which is subjected to the correction of the shaking motion, output from the corrected image output section 108 to the reducing section 125.

The reducing section 125 reduces the image P' or the image P by decreasing the number of pixels in the image P' or the image P output from the switching section 124, and displays the reduced image P' or the reduced image P on the display section 12. It is possible to display the locus of the shaking motion generated by the locus display section 126 in such a manner that the locus is overlapped with the image P' or the image P on the display section 12.

For example, the switching section 124 operates such that the reduced image P' is displayed on the display section 12 immediately after the image is captured and that the reduced image P is displayed on the display section 12 when a predetermined period of time has elapsed after the image is captured and the correction of the shaking motion is completed. With this arrangement, it is possible for the operator to see the captured image immediately after capturing the image. Without such a switching, it is impossible for the operator to see the captured image during a several seconds until the correction of the shaking motion is completed.

12.3 Method of Displaying Images

Figure 28:
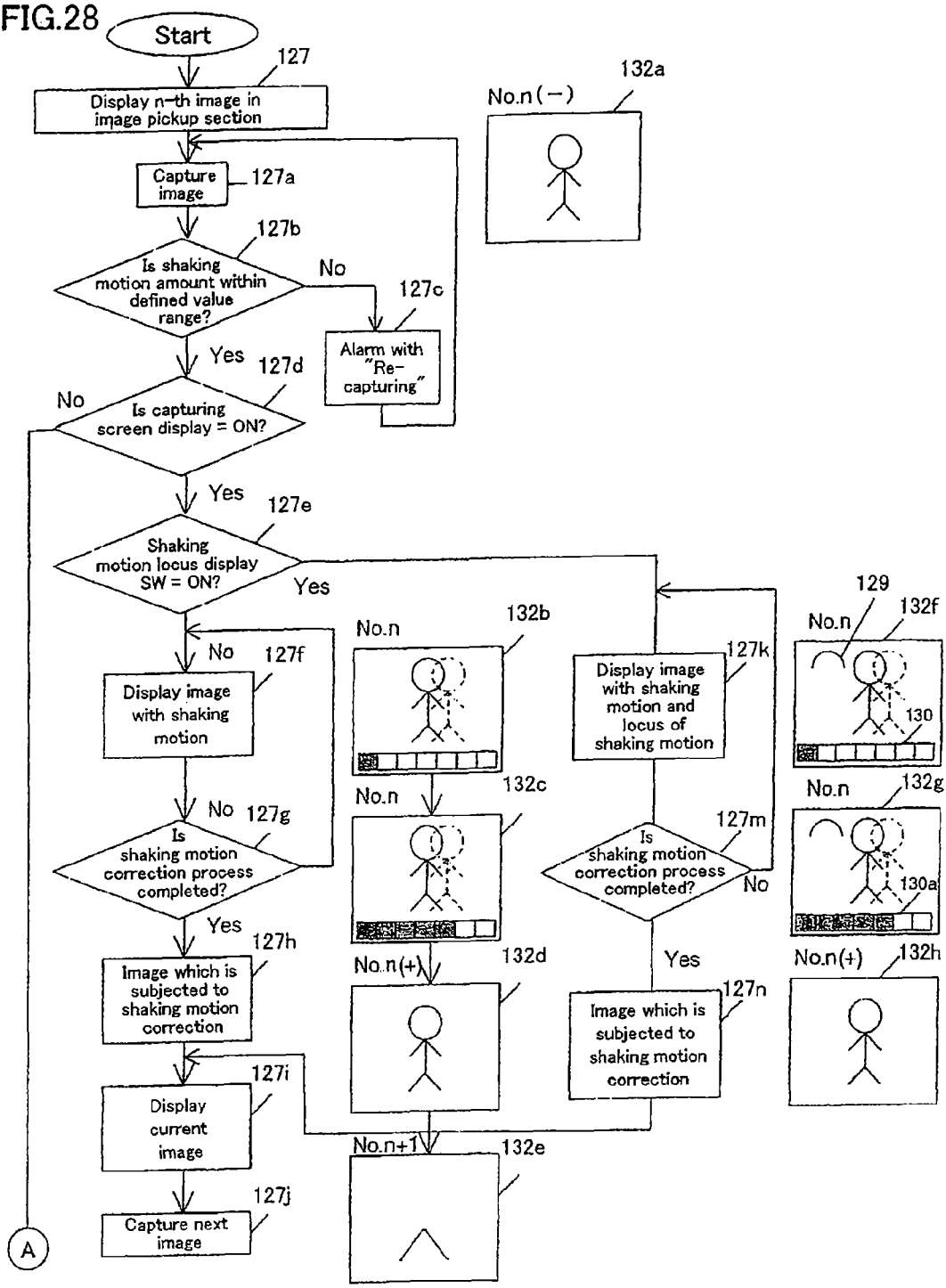
FIG. 28 is a flowchart showing a procedure of the image pickup process (steps 127 to 127j) according to an embodiment of the present invention.

The procedure for displaying images will be described with reference to FIGS. 28 and 29.

In step 127, the n-th image is displayed. In step 127a, the n-th image is captured. In step 127b, the processing amount calculating section 116 calculates the time $t_p$ required for performing the shaking motion correction calculation. In the case where $t_p$ exceeds a reference value indicating that the processing is possible, the process proceeds to step 127c, where an alarm indicating "take an image once again" is issued. In step 127a, the operator takes an image once again, and the process proceeds to step 127b. In the case where the shaking motion amount is smaller than or equal to a defined value, the process proceeds to step 127d. In the case where the capture image display switch is ON, the process proceeds to step 127k, where the captured image before the correction of the shaking motion and the locus 129 of the shaking motion which occurs during the period of capturing the image are displayed on the display section 12. At this time, a processing status indicator 130 is also displayed. The processing status indicator 130 displays an elapsed period of time from the start of the correcting processing, by expressing the full scale of the processing status indicator 130 as $t_f$, where $t_f$ is the estimated processing period obtained by the processing amount calculating section 116. Immediately after the processing is started, the processing status indicator is displayed as indicated by the reference numeral 130, and near the end of the processing, the indicator is displayed as indicated by the reference numeral 130a. Thus, it is possible for the user to find out how soon the processing will be finished. With this arrangement, it is possible to satisfy the user's desire that the user wants to know how long it takes until the processing is finished.

Figure 25:
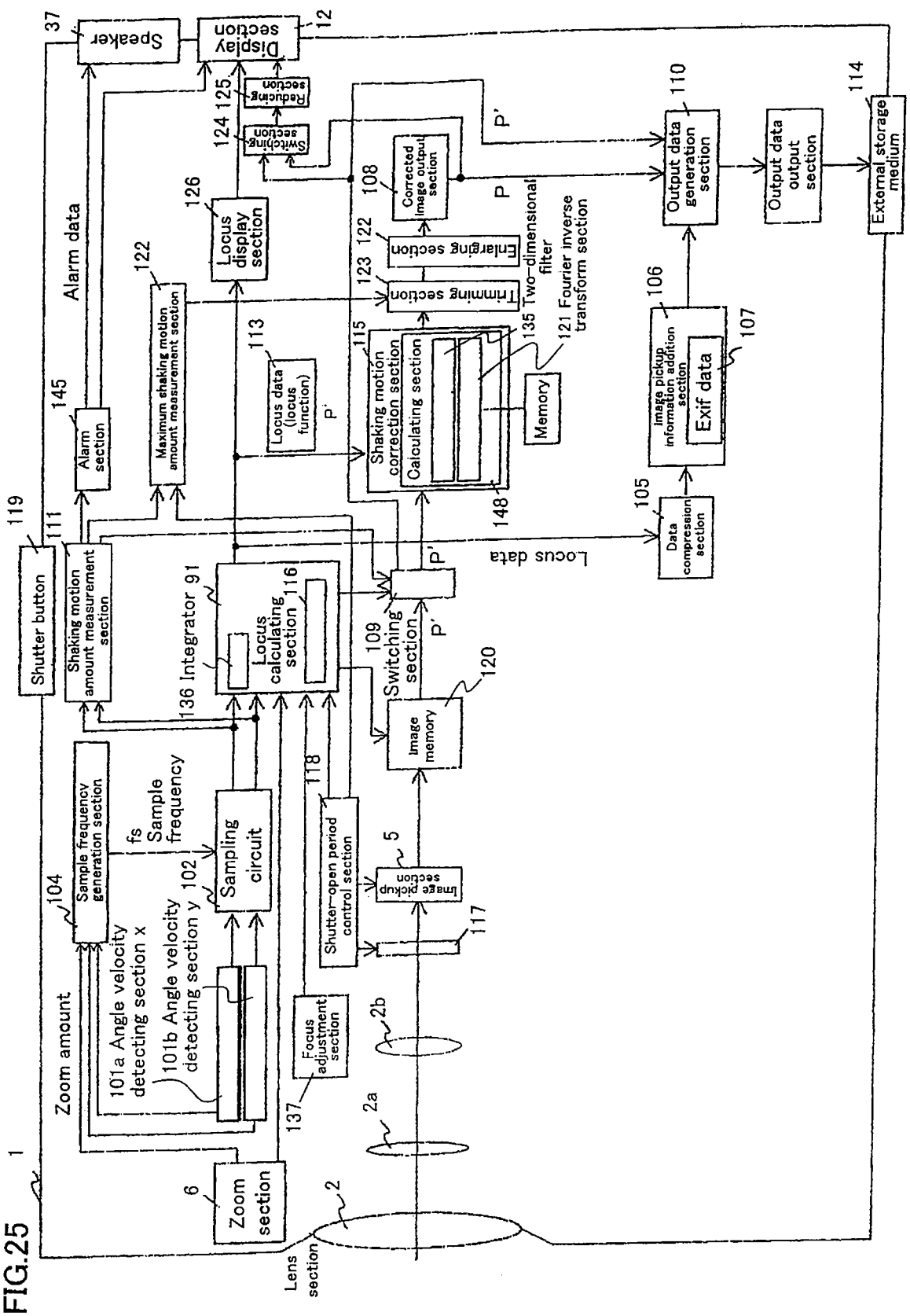
FIG. 25 is a diagram showing an image pickup apparatus 1 according to an embodiment of the present invention.

In step 127m, when the correction of the shaking motion is completed, in step 127n, the image P', which is not subjected to the correction of the shaking motion, is switched to the image P, which is subjected to the correction of the shaking motion, by the switching section 124 shown in FIG. 25, and the switched image is displayed on the display section 12.

In step 127e, in the case where the shaking motion locus display switch is OFF, the image with shaking motion is displayed in step 127f. In this case, the shaking motion locus is not displayed. Steps 127g and 127h are the same as steps 127m and 127n described above, and therefore the description thereof will be omitted. In step 127i, an image from the image pickup section is reduced by the reducing section 125, and the reduced image is displayed on the display section 12. In step 127j, the image pickup apparatus is ready to capture the next image.

Figure 29:
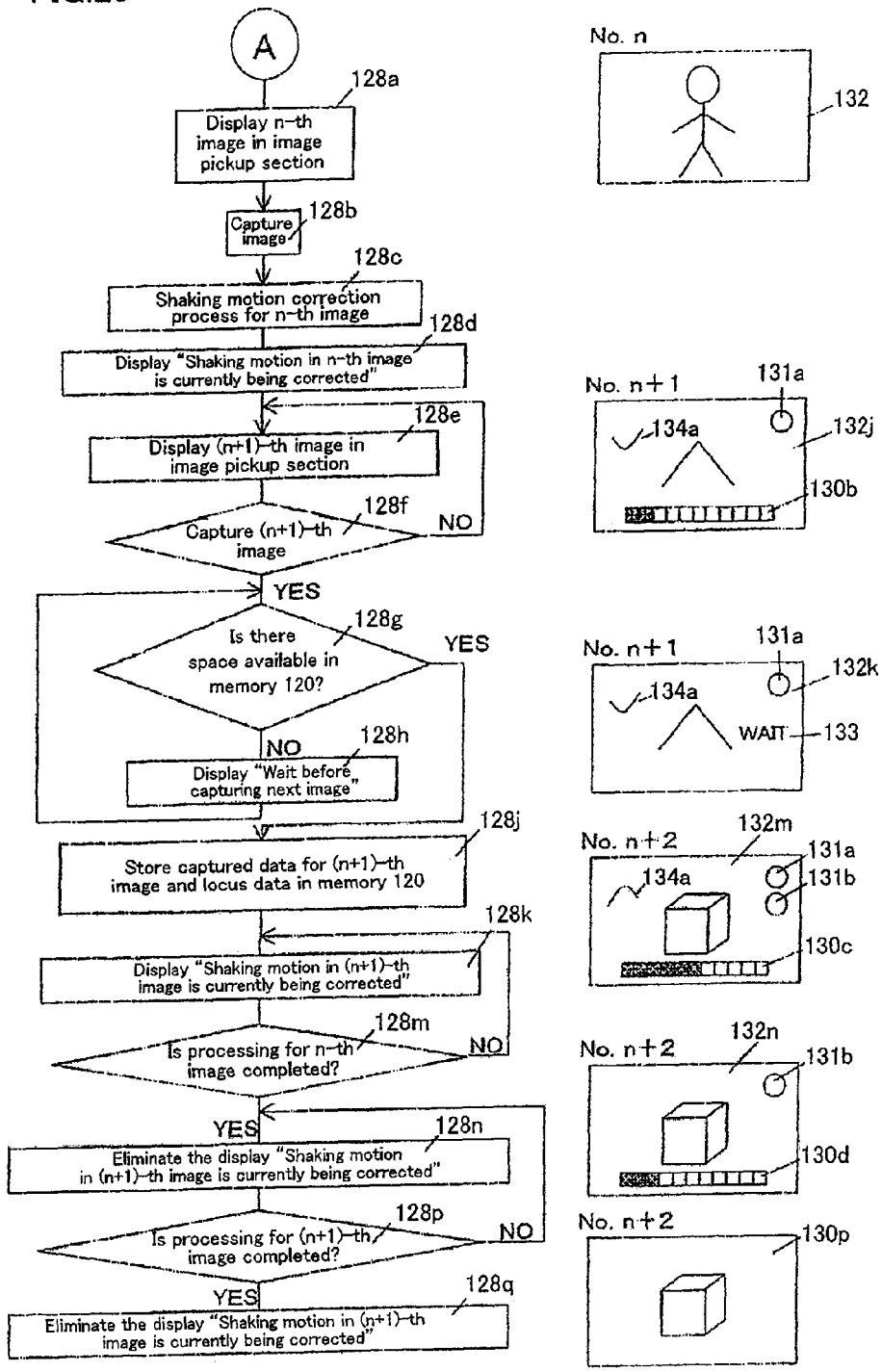
FIG. 29 is a flowchart showing a procedure of the image pickup process (steps 128a to 128g) according to an embodiment of the present invention.

Referring back to step 127d, in the case where the capture screen display switch is OFF, the process proceeds to step 128a in FIG. 29. In step 128a, the n-th image in the image pickup section is displayed. In step 128b, when the shutter button is pressed, an image is captured. In step 128c, the correction of the shaking motion in the n-th image is started. In step 128d, the mark 131a indicating that "the correction of the shaking motion in the n-th image is being performed" is displayed on the display screen 132j. In step 128e, the (n+1)-th image in the image pickup section is displayed on the display screen 132j, and the processing status indicator 130b is also displayed. In step 128f, when (n+1)-th image is captured in the case where the correction of the shaking motion in the n-th image has not yet completed, in step 128g, it is checked whether there is space available in the image memory 120. In the case where there is no space available in the image memory 120, the mark 133 indicating that "WAIT" is displayed in step 128h, as shown in display screen 132k, so that the user is stopped to capture the next image. In the case where there is space available in the image memory 120 in step 128g, the process proceeds to step 128j, where the locus data for the shaking motion is stored in the image memory 120. In step 128k, the mark 131b indicating that "the correction of the shaking motion in the (n+1)-th image is being performed" and the (n+2)-th image are displayed, as shown in display screen 132m. In step 128m, when the correction process for the n-th image is completed, in step 128n, the mark 131a indicating that "the correction of the shaking motion in the n-th image is being performed" is eliminated as shown in display screen 132n. In step 128p, when the correction process for the (n+1)-th image is completed, in step 128q, the mark 131b indicating that "the correction of the shaking motion in the (n+1)-th image is being performed" is eliminated as shown in display screen 132P. Then, the image pickup apparatus is ready to capture the (n+2)-th image.

In order for the shaking motion correction section 115 shown in FIG. 25 to perform the correcting process properly, it is important that the locus information for the shaking motion should be accurate. By tracking the path of the locus data, the data from the angle velocity detecting sections 101a and 101b such as vibration gyroscopes are integrated by the integrator 136, so that an integrated angle θ is obtained. The zoom ratio information is obtained from the zoom section 6, and the focus data is obtained form the focus adjustment section 137. A focus f is calculated, and f×tan θ is obtained, and a locus calculation is performed. As described with reference to FIG. 26(b), it is possible to obtain data accurately by changing the number of samples in accordance with the change in the angle θ. It is most preferable to convert the locus information into a function.

Figure 35:
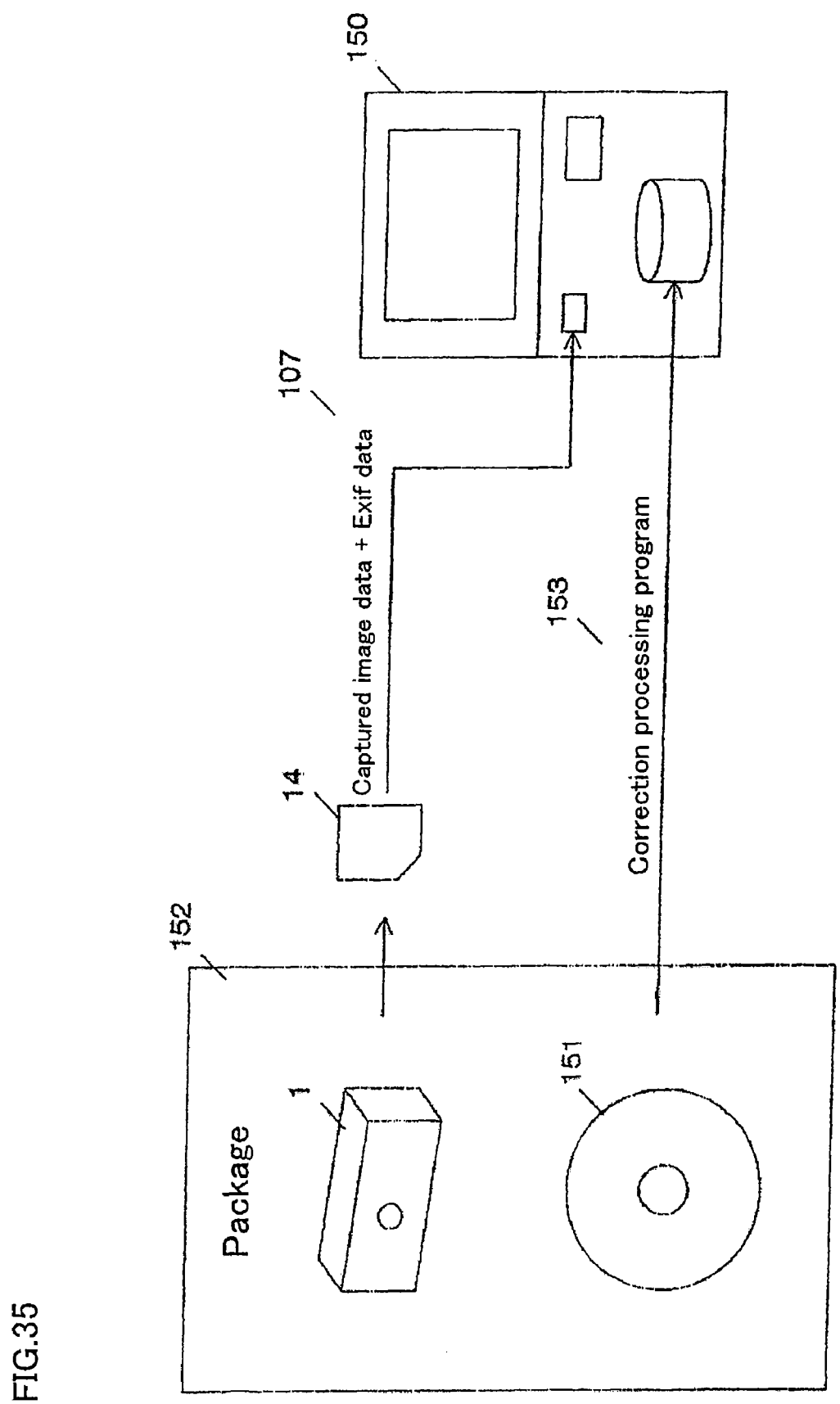
FIG. 35 is a diagram showing a combination of the image pickup apparatus according to an embodiment of the present invention and a correction processing program, and a computer for the correction processing.

In the shaking motion correction section 115, corrected original image P is obtained using this locus data, by applying the image P' having the shaking motion to a function obtained by performing a Fourier inverse transform on the locus function. This calculation may be performed using a two-dimensional filter 137. According to the method of the present invention, it is possible to accurately obtain the locus data for the shaking motion by the use of the vibration gyroscopes or the like. As a result, it is possible to precisely correct the shaking motion. When the correction of the shaking motion is not performed within the camera 1, an image obtained by adding the locus information for the shaking motion to the captured data such as Exif data is outputted. As shown in FIG. 35, the package 152 of the camera 1 contains the image pickup apparatus 1 and a recording medium 151, such as a CD-ROM. The shaking motion correction processing program 153 is recorded in the recording medium 151. The user mounts the recording medium 151 into the computer 150 such that the correction processing program is installed from the recording medium 151 to the computer 150. The captured image data and the Exif data including the locus information for the shaking motion are obtained from the camera 1, so that these data are calculated to correct the shaking motion. It should be noted that, in this case, the format of the image capturing information is not limited to the Exif format. It is possible to achieve the similar effect by the use of any other format for the image capturing information.

The period of time required for the correction of the shaking motion is estimated by the processing amount calculating section 116. Accordingly, it is possible to determine, in advance, whether or not the process can be performed within the camera itself. As a result, it is possible to display the time required for the correction process on the display section, and to improve the interface with the user by displaying the degree of the progress of the processing.

12.4 Locus of the Remaining Shaking Motion After the Correction of the Shaking Motion With reference to FIG. 30, a method for outputting the remaining shaking motion after the correction of the shaking motion, as Exif data, in a camera includes an shaking motion correction section for performing an optical correcting process or the like along the two axes (e.g., an x-axis and a y-axis) will be described.

Figure 30:
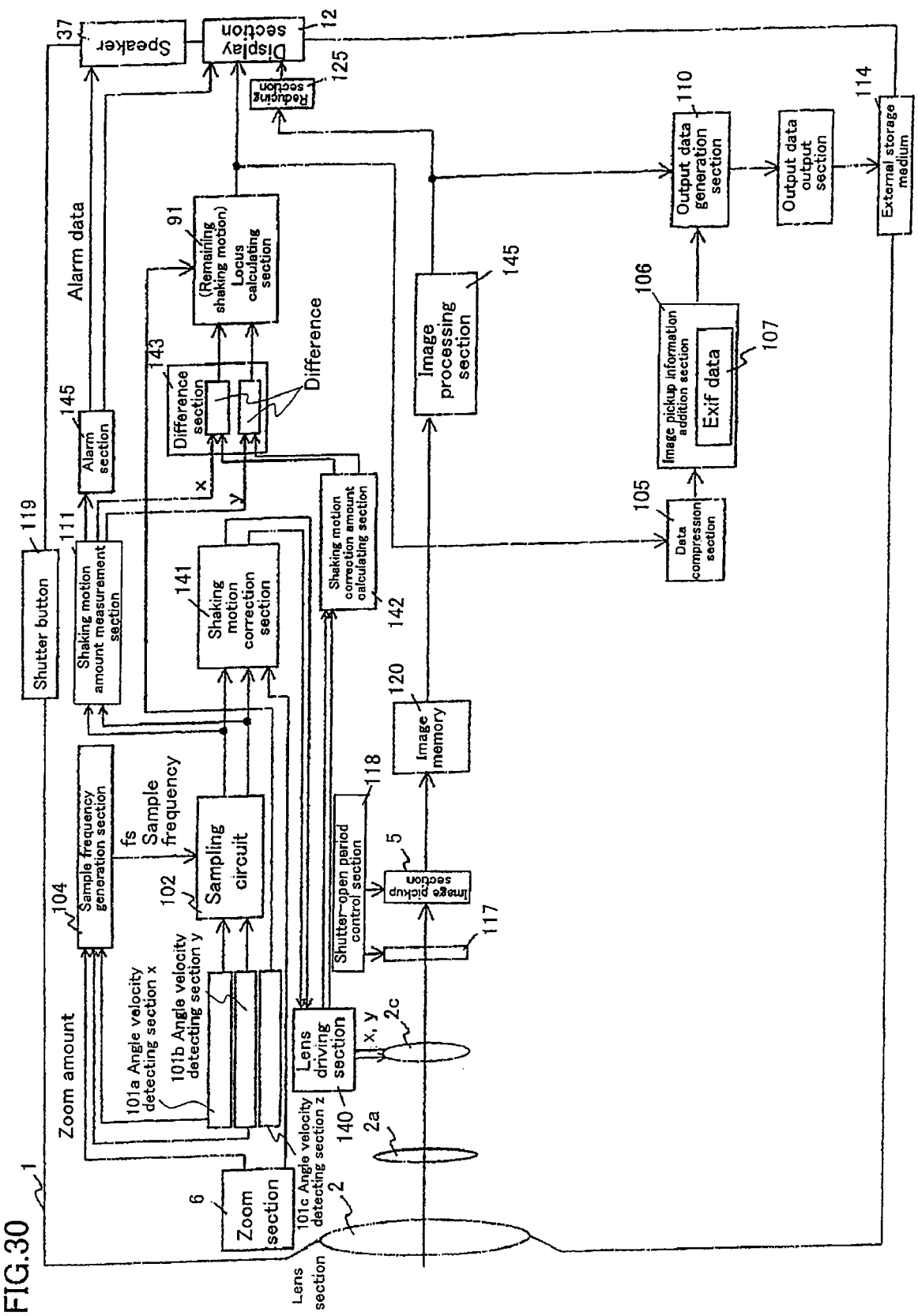
FIG. 30 is a diagram showing an image pickup apparatus 1 according to an embodiment of the present invention.
Figure 31:
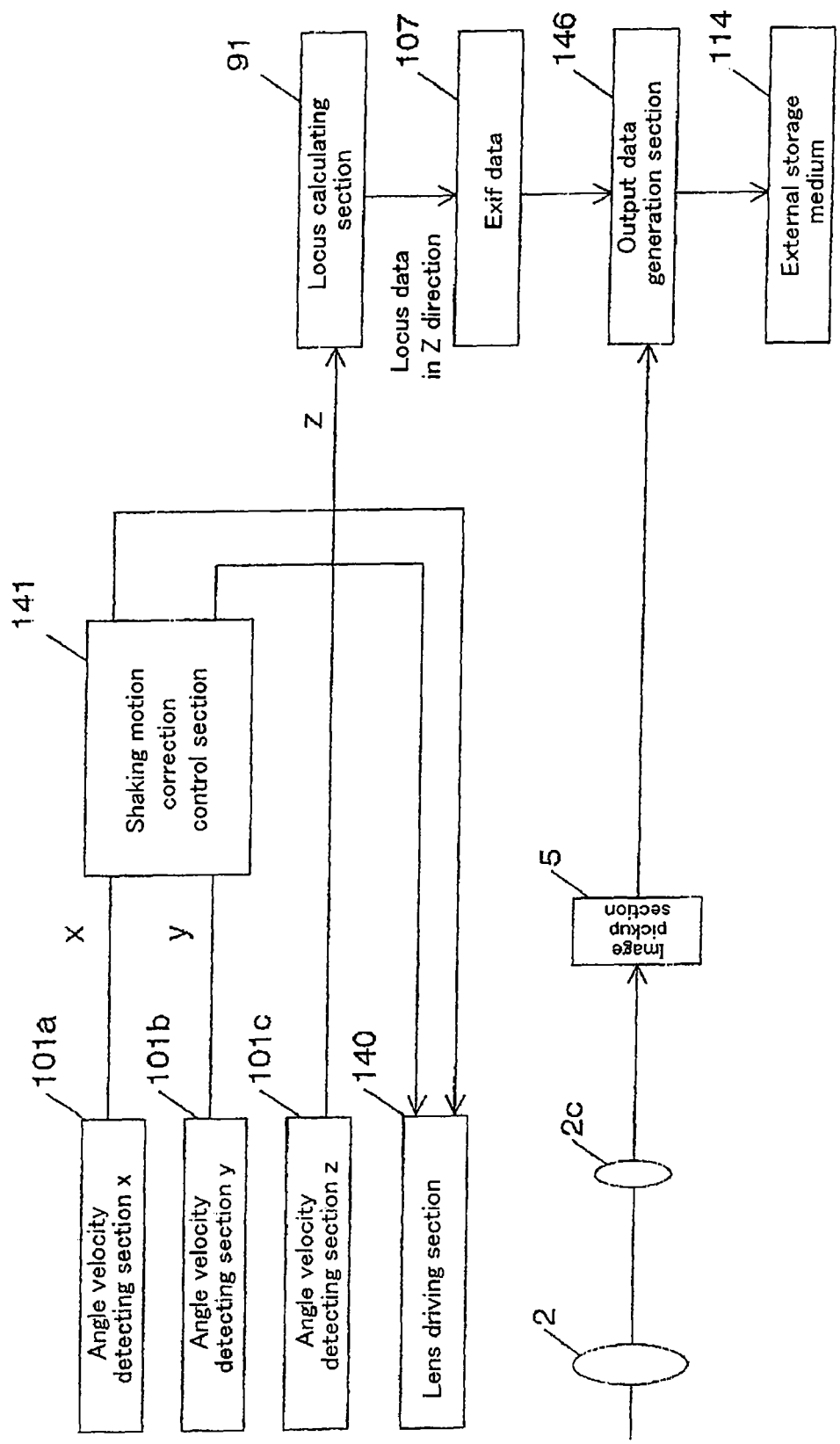
FIG. 31 is a diagram showing an image pickup apparatus 1 which outputs the locus data in the z direction according to an embodiment of the present invention.

The shaking motion correction control section 141 outputs an shaking motion correction signal in accordance with the shaking motion data which has been detected in FIG. 30. The lens driving section 140 drives the correcting lens 2c in the x direction and in the y direction such that the shaking motion is corrected.

Actually, this control system has a frequency response characteristic. Accordingly, the shaking motion is not corrected completely, and the remaining shaking motion still exists after the correction of the shaking motion. Further, when a common optical correcting method or a common CCD driving method is used, it is possible to perform the correction only in the x direction and in the y direction, and it is not possible to perform the correction in the z direction (the roll direction). In order to calculate the remaining shaking motion after the correction of the shaking motion, it is required that the shaking motion correction amount calculating section 142 obtains an actual correction amount from the lens driving section 140, and then the actual correction amount is input to the difference sections 143a and 143b included in the difference section 143. The angle velocity detecting section 101 includes an angle velocity detecting section 101C for the z direction (the roll direction). The component in the x direction and the component in the y direction obtained by the angle velocity detecting section 101 are input to the difference section 143.

For the x direction and the y direction, the remaining shaking motion after the correction of the shaking motion can be calculated using an expression "(the actual shaking motion amount)−(the actual shaking motion correction amount)=the remaining shaking motion after the correction of the shaking motion". By inputting the remaining shaking motions in the x and y directions and the angle information in the z direction to the locus calculating section 144, the locus information of the remaining shaking motions in the x and y directions is obtained. The data from the angle velocity detecting section 101c for the z direction is integrated without calculating the difference and sent to the locus calculating section 91 so that locus information is obtained. The locus information 113 is displayed on the display section 12 in such a manner that the locus information 113 is overlaid over the captured image. At the same time, the locus information is sent to the data compression section 105 so that the data is compressed. The compressed data is added to the image data to generate output data as Exif data 107 by the image pickup information addition section 106. The generated output data is recorded onto the external storage medium 114, such as an IC card, by the data output section 146.

The Exif data includes the remaining shaking motion after the correction of the shaking motion in the x and y directions and the locus information for the shaking motion in the z direction. Thus, it is possible to correct the shaking motions in the three axes, i.e., x, y, and z (yaw, pitch, and roll) axes by way of data processing, by a computer performing a Fourier inverse transform using the locus information 113, the image data and the locus information. In an optical correcting process, a frequency response characteristic is present. Shaking motion is not so conspicuous in a normal photo size, but it is conspicuous in a large-size photo. According to the post-processing of the method described above, it is possible to correct the shaking motion almost completely. This is a remarkable effect.

When the processing capability of the semiconductor becomes high, it is possible to implement the correction of the shaking motion in the x, y, and z directions by software within the camera 1. However, it is not realistic for a while to perform the correction of the shaking motion in the three axes within the camera, since a higher calculation processing capability is required to do so. There are some possible methods to be considered along the course of time. A first method includes calculating the locus data x, y, and z of the shaking motion within a camera and outputting the locus data as an Exif file such that the correction processing is performed in an external computer by way of data processing (see FIG. 30). A second method includes performing an optical correcting process in the x and y directions by the use of the shaking motion correction control section 141 in a camera having a function of correcting an optical shaking motion, calculating the locus data in the z direction (the roll direction) by the use of the locus calculating section 144, and attaching the locus data as Exif data 107 to the image data (see FIG. 31). In view of the difficultly for performing the optical correcting process in the z direction, by performing the correction of the shaking motion in the z direction by software within an external computer, it is possible to perform the correction of the shaking motion in the z direction without increasing the number of parts of the camera. Thus, it is possible to perform the correction of the shaking motion along all of the three axes.

Figure 32:
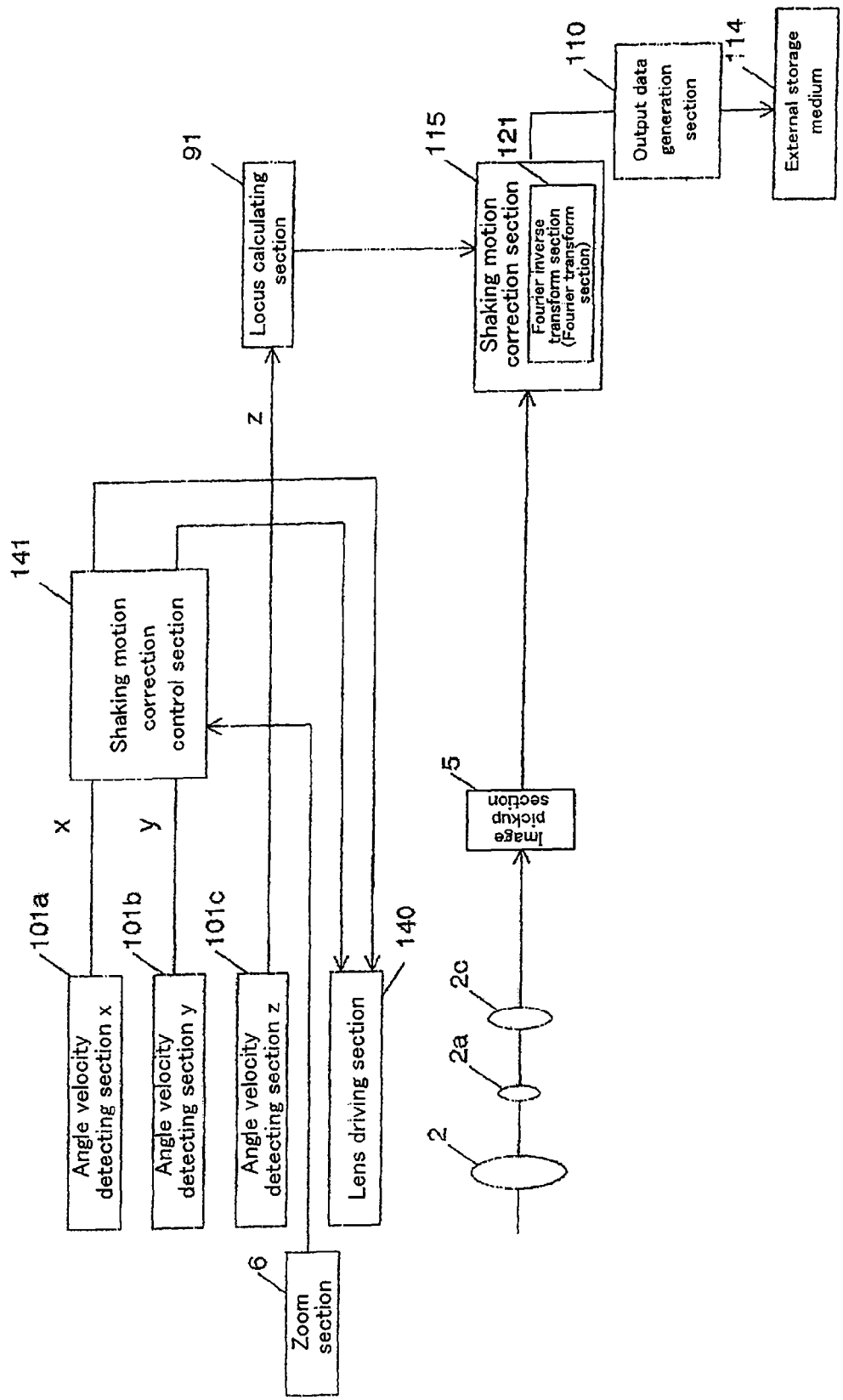
FIG. 32 is a diagram showing an image pickup apparatus 1 which performs the correction of the shaking motion in the z direction according to an embodiment of the present invention.
Figure 33:
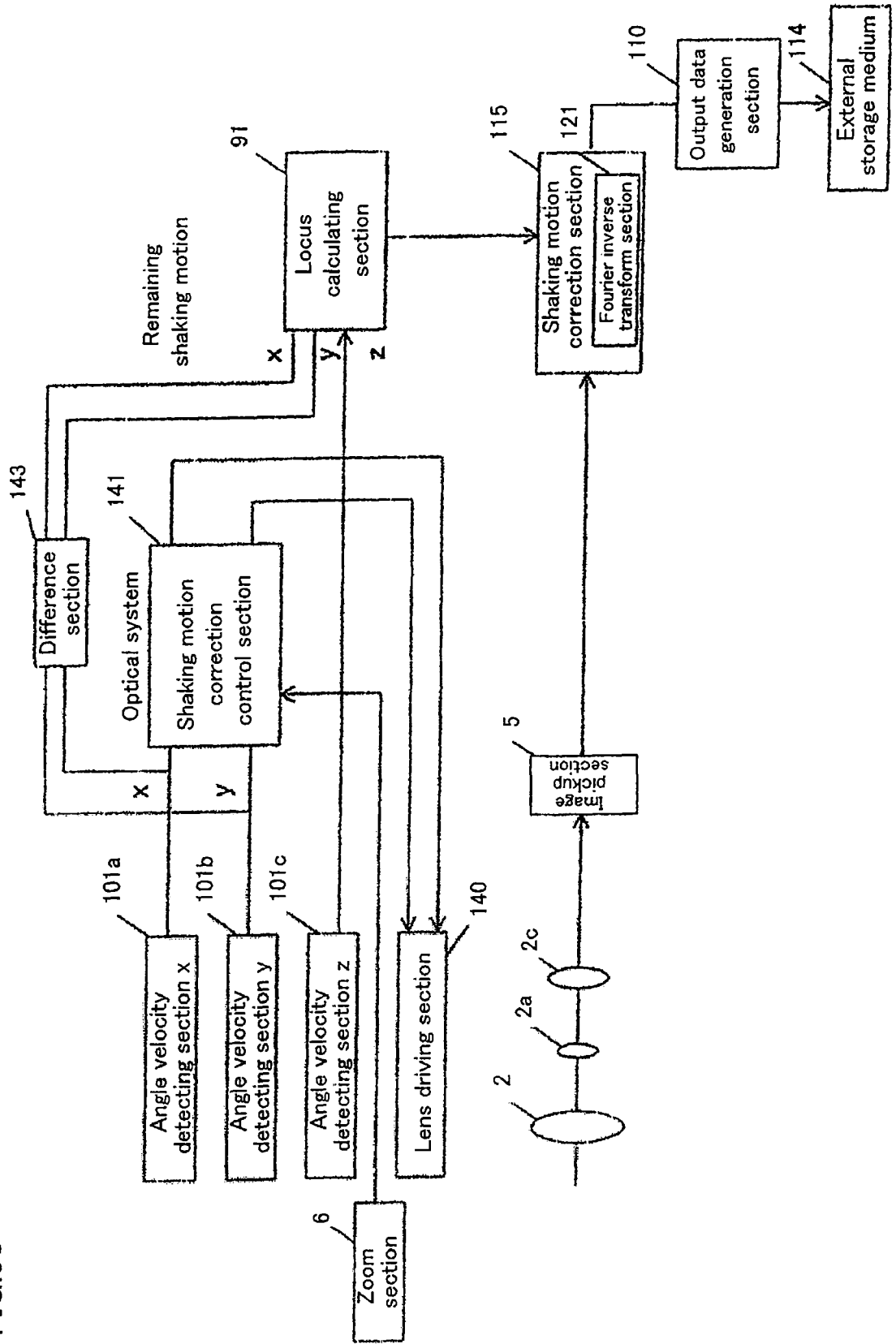
FIG. 33 is a diagram showing an image pickup apparatus 1 which performs the optical correction and the data processing correction according to an embodiment of the present invention.

A third method includes performing an optical correcting process in the x and y directions, calculating the locus data in the z direction (the roll direction) based on the data output from the angle velocity detecting section 101c by the use of the locus calculating section 144, performing the correction of the shaking motion in the z direction by the use of the shaking motion correction section 115 including the Fourier inverse transform section 121 or a Fourier transform section, such that the resultant data is recorded on an external storage medium 114 (see FIG. 32). In the present specification, the use of the Fourier inverse transform section is described. However, it is needless to say that a similar effect can be obtained by the use of a Fourier transform section. The shaking motions in the x and y directions may cause intense motions since they are enlarged by the zoom. On the contrary, the shaking motion in the z direction (the roll direction) causes gentle motion and is more stable. Accordingly, it is possible to perform the correction of the shaking motion in the z direction by the use of a CPU having a low processing capability. As the third method, it is realistic to perform the correction of the shaking motion only the z direction by way of data processing.

A fourth method includes performing an optical correcting process in the x and y directions, calculating the locus data for the remaining shaking motion which cannot be corrected, and adding the locus data as an Exif data to the captured image (see FIG. 30). In this case, the components of the shaking motion in the higher frequency band is eliminated by the optical correcting process, and the locus data for the remaining shaking motion after the correction of the shaking motion corresponds to only the components of the shaking motion in the lower frequency band. As a result, it becomes easier to perform the correction of the shaking motion by way of calculation processing.

A fifth method is directed to performing all of the correction of the shaking motion by way of data processing within a camera (see FIG. 25). However, it is not possible to correct intense shaking motion by way of data processing. Accordingly, it is preferable to perform an optical correcting process or the like in the x and y directions by the use of shaking motion correction control section 141, calculate the remaining shaking motion by the use of the difference section 143 in the similar manner described above with reference to FIG. 30, calculate the locus data of the remaining shaking motion by the use of the locus calculating section 91, correct the shaking motion in the x, y, and z directions by way of data processing, using the locus data and the image data which is subjected to the optical correcting process in the x and y directions by the use of the shaking motion correction section 115 (see FIG. 33). As a result, it is possible to perform the correction of the shaking motion in all of the three axes within the camera. According to this method, the components of the shaking motion in the higher frequency band is eliminated by the optical correcting process. As a result, it becomes easier to perform the correction of the remaining shaking motion by way of data processing. Further, it is possible to realize the correction of the shaking motion in the z direction (the roll direction), while it is difficult to do so by the use of the optical correcting process.

Figure 34:
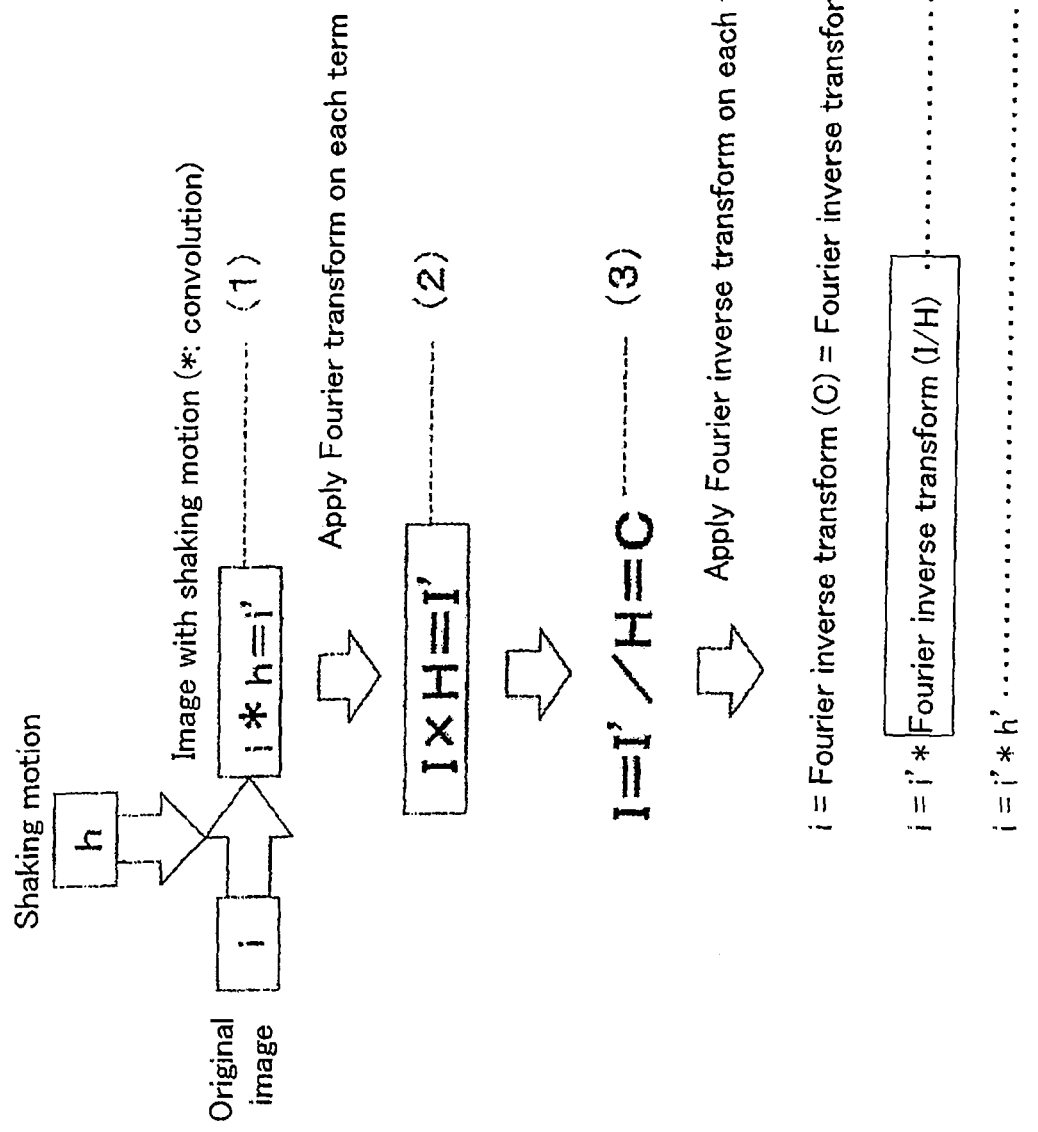
FIG. 34 is a diagram showing a calculation for the correction of the shaking motion according to an embodiment of the present invention.

Herein, the calculation in correcting the shaking motion will be described. As shown in FIG. 34, it is assumed that the original image is denoted by i and a locus function of the locus information of the shaking motion is denoted by h. The image i', which is subjected to the shaking motion, is denoted by i convolution h (i.e., i*h=i'). When a Fourier transform is applied to each of the terms, I×H=I' is obtained. Therefore, I=I'/H, which is defined as C. When a Fourier inverse transform is applied to each of the terms, i is equal to a Fourier inverse transform (C), and i is also equal to a Fourier inverse transform (I'/H) (see Expression (4) shown in FIG. 34). Since i is equal to i' convolution (a Fourier inverse transform (I/H)) (i.e., i=i'*(a Fourier inverse transform (I/H))), under the assumption that the Fourier inverse transform (I/H) is defined as h', i=i' convolution h' (i.e., i=i'*h') is obtained. When such calculations are performed every time, it takes a long period of time to perform the calculations, and it becomes difficult to capture the next image. This is because the processing capability of the calculator included in the image pickup apparatus for still images such as a digital camera is low. In order to avoid that it becomes impossible to capture the next image, the image memory 120 is provided. The captured image is sequentially input to the image memory 120, where a plurality of captured images are stored. However, it is not preferable for the operator that the operator cannot check the captured images for a long period of time. In order to address this problem, as described in the embodiment above, when an image is captured, the captured image, which is not subjected to the correction of the shaking motion, is displayed on the display section 12. This makes it possible for the operator to roughly check the captured image. When a predetermined period of time has elapsed after displaying the captured image, in particular, when the calculation for the correction of the shaking motion is completed, a corrected image, which is subjected to the correction of the shaking motion, is displayed on the display section 12. Thus, it is possible for the operator to check the n-th captured image, immediately after the n-th image is captured, and then it is possible to check the corrected n-th image which is subjected to the correction of the shaking motion. Thus, the operator can visually check the captured image in a seamless manner without any interruption. In the case where the (n+1)-th image and the images thereafter are captured before the calculation for the correction of the n-th image is completed, the (n+1)-th image and the images thereafter are stored into the image memory 120 as shown in FIG. 25 or the like, and the (n+1)-th image and the images thereafter which have been captured most recently are displayed on the display section one after another.

Herein, a method for shortening the period of time required for performing the calculation will be described. As shown in Expressions (3) and (4) of FIG. 34, the calculation for a Fourier transform is required to reconstruct the original image. However, in order to perform the calculation for a Fourier transform within a digital camera, it is necessary to extremely increase the speed of the calculation. It may take many years before such a CPU is realized. For this reason, as shown in Expression (6) of FIG. 34, a Fourier inverse transform h' is prepared in advance, where the Fourier inverse transform h' is an reciprocal of the Fourier transform H of the PSF (point spread function) h which is weighted locus of the locus information. This h' is selected in accordance with the shaking motion. In the calculating section 148, a convolution on h' and the image i', which is subjected to the shaking motion, is performed so as to obtain the original image i. By preparing h' in advance, it is possible to reduce the period of time required for the calculation processing. Thus, it is possible to incorporate a calculating circuit into the image pickup apparatus.

Figure 36:
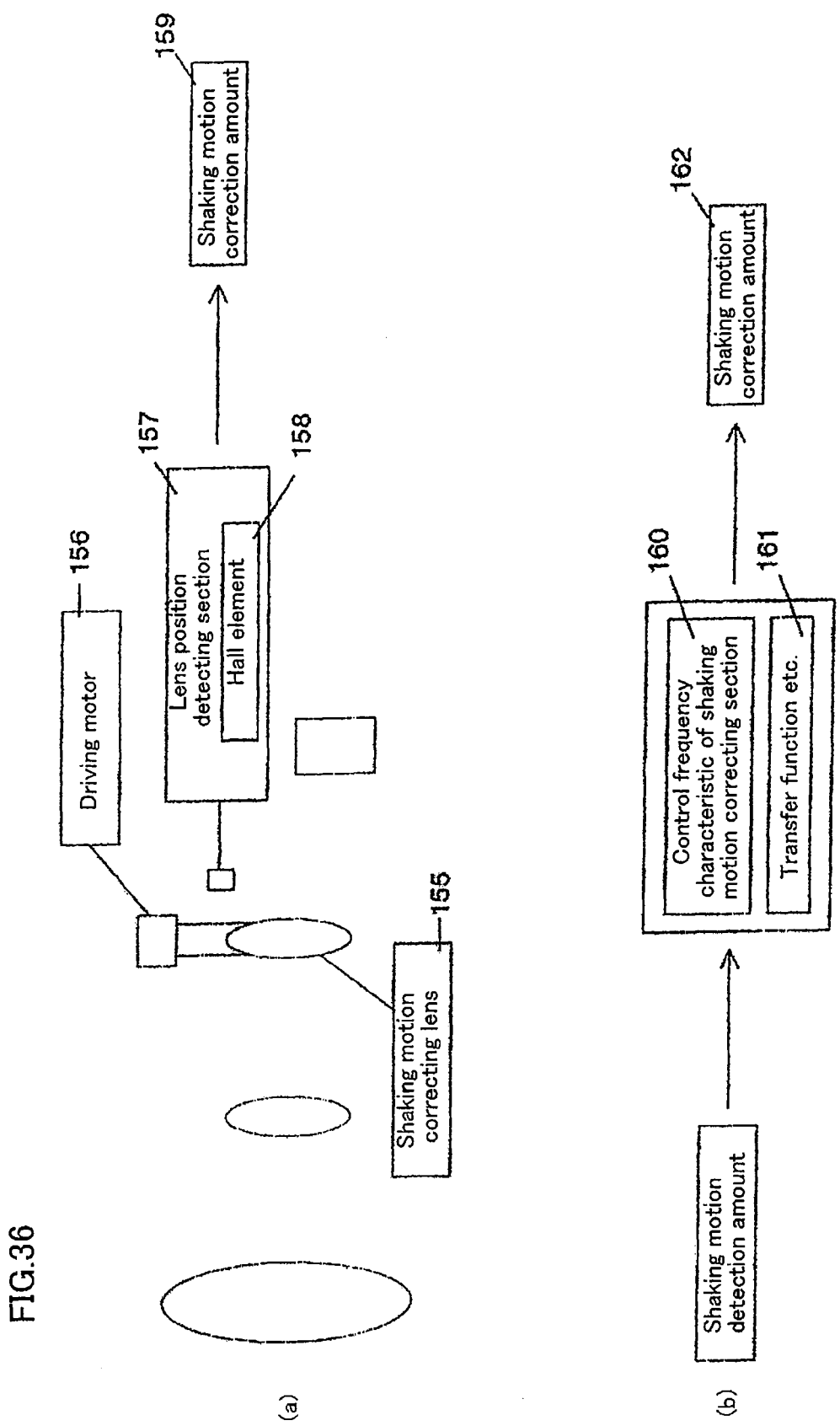
FIG. 36 is a diagram showing a structure of a correction amount detecting section included in the image pickup apparatus according to an embodiment of the present invention.

Herein, a method for detecting the shaking motion correction amount will be described. As shown in FIG. 36(a), the shaking motion correcting lens 155 is driven by a driving motor 156. A hall element 158 is provided as a lens position detecting section 157 in the vicinity of the shaking motion correcting lens 155, such that the position of the shaking motion correcting lens 155 is magnetically detected, and then the shaking motion correction amount 159 is obtained. As another method, as shown in FIG. 36(*b*), the control frequency characteristic 160 or a transfer function 161 of the shaking motion correcting section is calculated in advance. By inputting the shaking motion amount to this system, it is possible to electrically calculate the shaking motion correction amount 162. In this case, it is possible to reduce the cost and simplify the configuration, since the shaking motion correction amount can be calculated by the use of only the electronic circuit, without using a mechanical system.

In the case where a plurality of vibration gyroscopes are used to detect the shaking motion, it is preferable to separate the frequencies of the respective vibration gyroscopes from each other by the frequency band of the shaking motion correction characteristic. In this case, it is possible to detect the shaking motion more stably.

The advantage of the use of the package 152 shown in FIG. 35 will be described. In the case where the correction of the shaking motion is performed by way of data processing, the locus function for the shaking motion varies for every lens of a camera. Accordingly, H and h' shown in FIG. 34 vary. As a first method, H and h' may be output, as Exif data, from the camera, together with the captured image. This method has a high degree of certainty, but the volume of the Exif data attached to each image is large, and involves a lot of waste. As a second method, information regarding the locus function, H and h', which are specific to each camera, are recorded on the recording medium 151, which is packaged together with the camera. In this case, it is possible to record the locus information, H and h', which are specific to each camera, onto an external computer. Thus, when the computer performs the correction of the shaking motion, it is possible to perform the optimal correction of the shaking motion without fail.

As described above, the present invention is exemplified by the use of its preferred embodiments. However, the present invention should not be interpreted solely based on the embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

Industrial Applicability

The present invention is useful to provide an image pickup apparatus capable of obtaining the locus information required for the correction of the shaking motion, a product package including the image pickup apparatus and a recording medium having a program recorded thereon, and a semiconductor integrated circuit or the like. The locus information may be output to a device external to the image pickup apparatus (e.g., a computer). With this arrangement, it is possible to perform the correction of the shaking motion, which requires a large amount of processing, in the device external to the image pickup apparatus (e.g., a computer).

The invention claimed is:

1. An image pickup apparatus comprising;
a shaking motion detecting section for detecting a shaking motion of the image pickup apparatus and for outputting a shaking motion detection signal indicating the shaking motion of the image pickup apparatus;
an image forming section for forming an optical image by focusing light incident to the image pickup apparatus;
an image pickup section for converting the optical image formed by the image forming section into electric video information; and
a locus calculating section for obtaining locus information indicating a locus of the shaking motion of the image pickup apparatus based on at least the shaking motion detection signal output from the shaking motion detecting section, wherein the locus calculating section determines whether or not an amount of temporal change in the shaking motion of the image pickup apparatus is larger than a predetermined threshold value, and determines a number of samples in accordance with the determination result.

2. The image pickup apparatus according to claim 1, wherein
the locus calculating section obtains, as the locus information, information indicating a change in the shaking motion detection signal during a predetermined period of time.

3. The image pickup apparatus according to claim 1, wherein
the shaking motion detecting section includes an angle velocity sensor, and
the locus calculating section obtains angle information by integrating an output from the angle velocity sensor, and obtains, as the locus information, information indicating a change in the angle information during a predetermined period of time.

4. The image pickup apparatus according to claim 3, wherein
the angle velocity sensor is a vibration gyroscope having a plurality of vibration frequencies which are different from each other.

5. The image pickup apparatus according to claim 1, wherein
the locus calculating section obtains, as the locus information, information indicating a locus weighted by the shaking motion of the image pickup apparatus, 6. The image pickup apparatus according to claim 1, wherein
the locus calculating section obtains, as the locus information, a point spread function PSF.

7. The image pickup apparatus according to claim 1, further comprising:
an output section for generating data in an Exif format by adding the locus information to the video in-formation, and for outputting the data in the Exif format.

8. The image pickup apparatus according to claim 1, wherein
the locus calculating section obtains the locus information based on at least focus information, zoom information, and the shaking motion detection signal.

9. The image pickup apparatus according to claim 1, further comprising:
an electronic shaking motion correcting section for performing a calculation processing on the locus information and the video information, so as to obtain corrected video information which is subjected to the correction of the shaking motion.

10. The image pickup apparatus according to claim 9, wherein
the electronic shaking motion correcting section determines whether or not the shaking motion detection signal is larger than a predetermined threshold value, and when it is determined that the shaking motion detection signal is larger than the predetermined threshold value, the electronic shaking motion correcting section does not correct the shaking motion in the video information.

11. The image pickup apparatus according to claim 9, wherein the calculation processing includes a Fourier transform, a Fourier inverse transform, or a processing using a two-dimensional filter.

12. The image pickup apparatus according to claim 9, wherein the locus information includes a locus function h, and the calculation processing includes a calculation of a Fourier transform of h or a calculation using a result of the Fourier transform of h, or the calculation processing includes a calculation of a Fourier inverse transform which is a reciprocal of the Fourier transform of h or a calculation using a result of the Fourier inverse transform which is the reciprocal of the Fourier transform of h.

13. The image pickup apparatus according to claim 9, further comprising:

a processing amount calculating section for calculating a calculation processing amount required for correcting the shaking motion in the video information.

14. The image pickup apparatus according to claim 13, wherein when the calculation processing amount or a shaking motion amount exceeds a predetermined value, a display indicating an exceeding situation is made on a display section and/or a sound indicating an exceeding situation is generated from a speaker.

15. The image pickup apparatus according to claim 13, wherein when the calculation processing amount exceeds a predetermined value, the video information which is not subjected to the correction of the shaking motion is output, and when the calculation processing amount is within a predetermined range, corrected video information which is subjected to the correction of the shaking motion in the video information is output.

16. The image pickup apparatus according to claim 9, wherein at a specific time after displaying the video information on a display section, the corrected video information is displayed on the display section.

17. The image pickup apparatus according to claim 16, wherein time at which the calculation processing for the correction of the shaking motion in the electronic shaking motion correcting section is completed is used as the specific time.

18. The image pickup apparatus according to claim 9, further comprising:

a maximum shaking motion amount calculating section for receiving the corrected video information from the shaking motion correcting section, and for calculating a maximum shaking motion amount of the shaking motion in each direction; and a trimming section for trimming the corrected video information in accordance with the maximum shaking motion amount, so as to generate trimmed corrected video information.

19. The image pickup apparatus according to claim 18, further comprising:

a setting section capable of setting a first trimming mode or a second trimming mode, wherein in the first trimming mode, the trimming section trims the corrected video information in accordance with the maximum shaking motion amount, so as to generate a first trimmed corrected video information, and in the second trimming mode, the trimming section trims the first trimmed corrected video information, as a center of a pixel corresponding to a center pixel of the first trimmed corrected video information, so as to generate a second trimmed corrected video information, the center pixel being a pixel located at a center of the video information in each direction.

20. The image pickup apparatus according to claim 1, further comprising:

a mechanical shaking motion correcting section for mechanically correcting the shaking motion of the image pickup apparatus in accordance with the shaking motion detection signal, so as to obtain corrected video information which is subjected to the correction of the shaking motion in the video information by an actual shaking motion correction amount, wherein the locus calculating section obtains, as the locus information, information indicating a change during a predetermined period of time in a difference between the shaking motion detection signal and the actual shaking motion correction amount.

21. The image pickup apparatus according to claim 20, wherein the locus information is in an Exif format.

22. The image pickup apparatus according to claim 20, wherein the mechanical shaking motion correcting section mechanically corrects the shaking motion of the image pickup apparatus in accordance with the shaking motion detection signal, so as to obtain a first corrected video information which is subjected to the correction of the shaking motion in the video information by a first shaking motion correction amount, the locus calculating section obtains, as the locus information, information indicating a change in a remaining shaking motion amount during a predetermined period of time, the remaining shaking motion amount indicating a difference between the actual shaking motion correction amount and the first shaking motion correction amount, and the image pickup apparatus further comprises:

an electronic shaking motion correcting section for performing a calculation processing on the locus information and the first corrected video information, so as to obtain a second corrected video information which is subjected to the correction of the shaking motion in the first corrected video information by a second shaking motion correction amount.

23. The image pickup apparatus according to claim 22, wherein the calculation processing includes a Fourier transform, a Fourier inverse transform, or a processing using a two-dimensional filter.

24. The image pickup apparatus according to claim 22, wherein the locus information includes a locus function h, and the calculation processing includes a calculation of a Fourier transform of h or a calculation using a result of the Fourier transform of h, or the calculation processing includes a calculation of a Fourier inverse transform which is a reciprocal of the Fourier transform of h or a calculation using a result of the Fourier inverse transform which is the reciprocal of the Fourier transform of h.

25. The image pickup apparatus according to claim 20, wherein
the mechanical shaking motion correcting section calculates the first shaking motion correction amount based on positional information of a lens which is a part of the image forming section.

26. The image pickup apparatus according to claim 20, wherein
the mechanical shaking motion correcting section calculates the first shaking motion correction amount based on the shaking motion detection signal and a shaking motion control characteristic of the mechanical shaking motion correcting section.

27. The image pickup apparatus according to claim 1, wherein
the shaking motion detecting section includes: a first shaking motion detecting section for detecting a shaking motion in a pitch direction and a shaking motion in a yaw direction among the shaking motions of the image pickup apparatus; and a second shaking motion detecting section for detecting a shaking motion in a roll direction among the shaking motions of the image pickup apparatus,
the locus calculating section obtains, as the locus information, information indicating a change during a predetermined period of time in a detection signal output from the second shaking motion detecting section, and
the image pickup apparatus further comprises:
a mechanical shaking motion correcting section for obtaining a first corrected video information which is subjected to the correction of the shaking motion in the pitch direction and the correction of the shaking motion in the yaw direction in accordance with a detection signal output from the first shaking motion detecting section.

28. The image pickup apparatus according to claim 27, further comprising:
a section for adding the locus information to the corrected video information for output, or for recording the locus information onto a recording medium.

29. The image pickup apparatus according to claim 28, wherein
the locus information is in an Exif format or a format similar to the Exif format.

30. The image pickup apparatus according to claim 27, further comprising:
an electronic shaking motion correcting section for obtaining a second corrected video information, which is subjected to the correction of the shaking motion in the first corrected video information, by performing a calculation processing on locus information in the roll direction and the first corrected video information.

31. The image pickup apparatus according to claim 30, wherein
the calculation processing includes a Fourier transform, a Fourier inverse transform, or a processing using a two-dimensional filter.

32. The image pickup apparatus according to claim 30, wherein
the locus information includes a locus function h, and
the calculation processing includes a calculation of a Fourier transform of h or a calculation using a result of the Fourier transform of h, or
the calculation processing includes a calculation of a Fourier inverse transform which is a reciprocal of the Fourier transform of h or a calculation using a result of the Fourier inverse transform which is the reciprocal of the Fourier transform of h.

33. A product package comprising an image pickup apparatus and a recording medium, wherein
the image pickup apparatus includes:
a shaking motion detecting section for detecting a shaking motion of the image pickup apparatus and for outputting a shaking motion detection signal indicating the shaking motion of the image pickup apparatus;
an image forming section for forming an optical image by focusing light incident to the image pickup apparatus;
an image pickup section for converting the optical image formed by the image forming section into electric video information;
a locus calculating section for obtaining locus information indicating a locus of the shaking motion of the image pickup apparatus based on at least the shaking motion detection signal output from the shaking motion detecting section; and
an outputting section for adding the locus information to the video information to output image information, and
the recording medium has a program recorded therein, the program is for causing a computer to execute a processing, the processing includes:
receiving the image information;
separating the image information into the locus information and the video information; and
obtaining corrected video information, which is subjected to the correction of the shaking motion in the video information, by performing a calculation processing on the locus information and the video information.

34. The product package according to claim 33, wherein the locus information is in an Exif format.

35. The product package according to claim 33, wherein the calculation processing includes a Fourier transform, a Fourier inverse transform, or a processing using a two-dimensional filter.

36. The product package according to claim 33, wherein the locus information includes a locus function h, and
the calculation processing includes a calculation of a Fourier transform of h or a calculation using a result of the Fourier transform of h, or
the calculation processing includes a calculation of a Fourier inverse transform which is a reciprocal of the Fourier transform of h or a calculation using a result of the Fourier inverse transform which is the reciprocal of the Fourier transform of h.

37. The product package according to claim 33, wherein the locus information is a weighted locus or a point spread function.

38. A product package comprising an image pickup apparatus and a recording medium, wherein
the image pickup apparatus includes:
a shaking motion detecting section for detecting a shaking motion of the image pickup apparatus and for outputting a shaking motion detection signal indicating the shaking motion of the image pickup apparatus;
an image forming section for forming an optical image by focusing light incident to the image pickup apparatus;
an image pickup section for converting the optical image formed by the image forming section into electric video information;
a locus calculating section for obtaining locus information indicating a locus of the shaking motion of the image pickup apparatus based on at least the shaking motion detection signal output from the shaking motion detecting section;

a mechanical shaking motion correcting section for mechanically correcting the shaking motion of the image pickup apparatus in accordance with the shaking motion detection signal, so as to obtain corrected video information which is subjected to the correction of the shaking motion in the video information by an actual shaking motion correction amount; and an outputting section for adding the locus information to the video information to output image information, the locus calculating section obtains, as the locus information, information indicating a change during a predetermined period of time in a difference between the shaking motion detection signal and the actual shaking motion correction amount, and the recording medium has a program recorded therein, the program is for causing a computer to execute a processing, the processing includes:

receiving the image information;

separating the image information into the locus information and the video information; and obtaining corrected video information which is subjected to the correction of the shaking motion in the video information, by performing a calculation processing on the locus information and the video information.

39. The product package according to claim 38, wherein the locus information is in an Exif format.

40. The product package according to claim 38, wherein the calculation processing includes a Fourier transform, a Fourier inverse transform, or a processing using a two-dimensional filter.

41. The product package according to claim 38, wherein the locus information is a weighted locus or a point spread function.

42. A semiconductor integrated circuit comprising:

a locus calculating section for obtaining locus information indicating a locus of a shaking motion of an image pickup apparatus based on at least a shaking motion detection signal output from a shaking motion detecting section for detecting the shaking motion of the image pickup apparatus, wherein the locus calculating section determines whether or not an amount of temporal change in the shaking motion of the image pickup apparatus is larger than a predetermined threshold value, and determines a number of samples in accordance with the determination result.

43. The semiconductor integrated circuit according to claim 42, further comprising:

an electronic shaking motion correcting section for obtaining corrected video information which is subjected to the correction of the shaking motion in the video information, by performing a calculation processing on the locus information and the video information.

44. The semiconductor integrated circuit according to claim 42, further comprising:

a mechanical shaking motion correcting section for mechanically correcting the shaking motion of the image pickup apparatus in accordance with the shaking motion detection signal, so as to obtain corrected video information which is subjected to the correction of the shaking motion in the video information by an actual shaking motion amount, wherein the locus calculating section obtains, as the locus information, information indicating a change during a predetermined period of time in a difference between the shaking motion detection signal and the actual shaking motion correction amount.

45. The semiconductor integrated circuit according to claim 42, wherein the shaking motion detecting section includes: a first shaking motion detecting section for detecting a shaking motion in a pitch direction and a shaking motion in a yaw direction among the shaking motions of the image pickup apparatus; and a second shaking motion detecting section for detecting a shaking motion in a roll direction among the shaking motions of the image pickup apparatus, the locus calculating section obtains, as the locus information, information indicating a change during a predetermined period of time in a detection signal output from the second shaking motion detecting section, and the semiconductor integrated circuit further comprises:

a mechanical shaking motion correcting section for obtaining a first corrected video information which is subjected to the correction of the shaking motion in the pitch direction and the correction of the shaking motion in the yaw direction in accordance with a detection signal output from the first shaking motion detecting section.

* * * * *